United States Patent
Shan et al.

(10) Patent No.: US 10,438,080 B2
(45) Date of Patent: Oct. 8, 2019

(54) HANDWRITING RECOGNITION METHOD AND APPARATUS

(71) Applicant: Samsung Electronics Co., Ltd., Gyeonggi-do (KR)

(72) Inventors: Yuxiang Shan, Beijing (CN); Chuanxiao Liu, Beijing (CN); Youxin Chen, Beijing (CN)

(73) Assignee: Samsung Electronics Co., Ltd (KR)

( * ) Notice: Subject to any disclaimer, the term of this patent is extended or adjusted under 35 U.S.C. 154(b) by 45 days.

(21) Appl. No.: 15/550,974

(22) PCT Filed: Feb. 11, 2016

(86) PCT No.: PCT/KR2016/001396
§ 371 (c)(1),
(2) Date: Aug. 14, 2017

(87) PCT Pub. No.: WO2016/129934
PCT Pub. Date: Aug. 18, 2016

(65) Prior Publication Data
US 2018/0025248 A1      Jan. 25, 2018

(30) Foreign Application Priority Data
Feb. 12, 2015    (CN) .......................... 2015 1 0075362

(51) Int. Cl.
*G06K 9/00*     (2006.01)
*G06K 9/22*     (2006.01)
(Continued)

(52) U.S. Cl.
CPC .............. *G06K 9/222* (2013.01); *G06F 3/011* (2013.01); *G06F 3/012* (2013.01); *G06F 3/013* (2013.01);
(Continued)

(58) Field of Classification Search
CPC ............... G06K 9/222; G06K 9/00429; G06K 9/00416; G06K 2209/015; G06F 3/03545;
(Continued)

(56) References Cited

U.S. PATENT DOCUMENTS 6,044,165 A     3/2000   Perona et al.
6,229,919 B1 *  5/2001   Hirayama ........... G06F 3/04883
                                            382/187
(Continued)

FOREIGN PATENT DOCUMENTS

CN    101317148    12/2008
CN    103871276    6/2014
(Continued)

OTHER PUBLICATIONS

European Search Report dated Nov. 10, 2017 issued in counterpart application No. 16749474.9-1972, 10 pages.
(Continued)

*Primary Examiner* — Amir Alavi
(74) *Attorney, Agent, or Firm* — The Farrell Law Firm, P.C.

(57) ABSTRACT

A method of generating handwriting information about handwriting of a user includes determining a first writing focus and a second writing focus; sequentially shooting a first local writing area, which is within a predetermined range from a first writing focus, and a second local writing area, which is within a predetermined range from a second writing focus; obtaining first handwriting from the first local writing area and second handwriting from the second local writing area; combining the first handwriting with the second handwriting; and generating the handwriting information, based on a result of the combining.

18 Claims, 48 Drawing Sheets

(51) Int. Cl.
*G06F 3/01* (2006.01)
*G06K 9/20* (2006.01)
*G06F 3/0354* (2013.01)
*G06F 3/16* (2006.01)

(52) U.S. Cl.
CPC .......... *G06F 3/017* (2013.01); *G06F 3/03545* (2013.01); *G06F 3/167* (2013.01); *G06K 9/00416* (2013.01); *G06K 9/00429* (2013.01); *G06K 9/2081* (2013.01); *G06K 9/00671* (2013.01); *G06K 2209/015* (2013.01)

(58) Field of Classification Search
CPC .......... G06F 3/167; G06F 3/017; G06F 3/013; G06F 3/012
See application file for complete search history.

(56) References Cited

U.S. PATENT DOCUMENTS

| | | | |
|---|---|---|---|
| 6,456,740 B1 * | 9/2002 | Carini | G06K 9/2054 178/18.01 |
| 6,633,671 B2 | 10/2003 | Munich et al. | |
| 7,330,590 B2 | 2/2008 | Seto et al. | |
| 7,889,928 B2 | 2/2011 | Shieh | |
| 8,787,706 B2 | 7/2014 | Cohen et al. | |
| 8,930,360 B2 | 1/2015 | Ying et al. | |
| 2005/0111735 A1 | 5/2005 | Sheinin | |
| 2007/0005849 A1 | 1/2007 | Oliver | |
| 2007/0273674 A1 | 11/2007 | Cohen et al. | |
| 2009/0161959 A1 * | 6/2009 | Markiewicz | G06F 3/04883 382/187 |
| 2010/0045785 A1 | 2/2010 | Carl | |
| 2011/0298709 A1 | 12/2011 | Vaganov | |
| 2012/0082964 A1 * | 4/2012 | Weitzman | G06K 9/00416 434/155 |
| 2012/0098772 A1 | 4/2012 | Eun et al. | |
| 2012/0171656 A1 | 7/2012 | Shen | |
| 2013/0222381 A1 | 8/2013 | Di Censo et al. | |
| 2013/0321356 A1 | 12/2013 | Al-Sharif et al. | |
| 2014/0016811 A1 * | 1/2014 | Fang | G06F 3/039 381/334 |
| 2017/0017385 A1 * | 1/2017 | Zhang | G06F 3/04883 |
| 2018/0101296 A1 * | 4/2018 | Yao | G06F 3/017 |

FOREIGN PATENT DOCUMENTS

| | | |
|---|---|---|
| JP | 2013-125487 | 6/2013 |
| KR | 1020120040970 | 4/2012 |
| KR | 1020120087868 | 8/2012 |
| KR | 10-1372837 | 3/2014 |
| KR | 1020140112814 | 9/2014 |
| WO | WO 2007/077070 | 7/2007 |

OTHER PUBLICATIONS

International Search Report dated May 18, 2016 issued in counterpart application No. PCT/KR2016/001396, 19 pages.
Chinese Office Action dated Apr. 4, 2018 issued in counterpart application No. 201510075362.1, 20 pages.
Chinese Office Action dated Nov. 30, 2018 issued in counterpart application No. 201510075362.1, 13 pages.

* cited by examiner

EXTERNAL CONTROLLER

IMAGE WITHIN LOCAL WRITING AREA     RETRIEVED LOCAL HANDWRITING

IMAGE WITHIN LOCAL WRITING AREA     RETRIEVED LOCAL HANDWRITING

FIG. 1T

Today

FIG. 1U

*Dear*

FIG. 1V

Today's weather is very good

FIG. 1W

*Dear Sir or Madame*

HANDWRITING RECOGNITION METHOD AND APPARATUS

PRIORITY

This application is a National Phase Entry of PCT International Application No. PCT/KR2016/001396, which was filed on Feb. 11, 2016, and claims priority to Chinese Patent Application No. 201510075362.1, which was filed on Feb. 12, 2015, the contents of each of which are incorporated herein by reference.

TECHNICAL FIELD

The present invention relates to terminal techniques, and more particularly, to a method and an apparatus for recognizing handwriting.

BACKGROUND ART

As a new wearable device, intelligent glasses have recently attracted people's attention. In general, intelligent devices, such as intelligent glasses, are not equipped with inputting devices, such as keyboards or touch screens. Therefore, people can only use intelligent devices through voice or gestures. This makes it inconvenient to input text information using the intelligent glasses.

The related art provides a method of retrieving handwriting that a user performs on a writing surface by using a writing tool. In the related art, the tip of the writing tool is traced via a camera, and the handwriting is determined according to a moving trajectory of the tip.

However, in practice, a vertical movement of the tip of the writing tool with respect to the writing surface due to a pen-up action during writing of the user is usually very small. It is hard to capture the pen-up action by using a camera. During a pen-up state of the user, the movement of the tip does not generate any handwriting. Therefore, handwriting retrieved according to the related-art method is inaccurate.

In addition, when an intelligent device such as a smartphone recognizes handwriting, the accuracy is also not high.

Therefore, there is a need to provide a solution for accurately retrieving the handwriting of a user.

DETAILED DESCRIPTION OF THE INVENTION

Technical Problem

The present invention provides a method of accurately recognizing handwriting.

Technical Solution

According to an aspect of the present invention, there is provided a method of generating handwriting information by accurately recognizing and detecting handwriting by using an intelligent device.

Advantageous Effects

According to the present invention, handwriting of a user can be accurately recognized, and handwriting information can be generated based on the recognized handwriting.

DESCRIPTION OF THE DRAWINGS

FIGS. 1O and 1P are schematic diagrams illustrating combination of handwritings.

FIGS. 1T, 1U, 1V, and 1W are schematic diagrams illustrating overall handwriting according to some embodiments.

BEST MODE

Figure 1A:
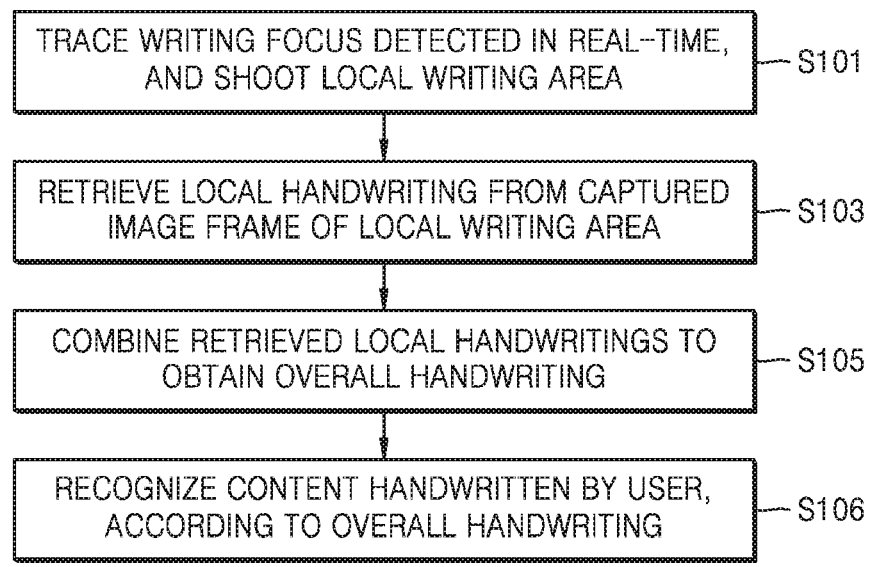
FIG. 1A is a flowchart of a method of recognizing handwriting information, according to some embodiments.

To address the above-described technical problems, the present disclosure provides a method and an apparatus for increasing the accuracy of recognition of handwriting information and generating handwriting information based on the recognized handwriting.

According to an embodiment, a method of generating handwriting information about handwriting of a user includes determining a first writing focus and a second writing focus; sequentially shooting a first local writing area, which is within a predetermined range from a first writing focus, and a second local writing area, which is within a predetermined range from a second writing focus; obtaining first handwriting from the first local writing area and second handwriting from the second local writing area; combining the first handwriting with the second handwriting; and generating the handwriting information, based on a result of the combining.

The determining of the first writing focus and the second writing focus may include tracing a visual focus of the user; and determining the first writing focus and the second writing focus, based on the traced visual focus.

The determining of the first writing focus and the second writing focus may include tracing a tip of a writing tool; determining a position of the tip of the writing tool; and determining the first writing focus and the second writing focus, based on the determined position of the tip of the writing tool.

The determining of the position of the tip of the writing tool may include obtaining information about a shape of the tip of the writing tool from the user, detecting a tip of the writing tool from at least one image frame captured by shooting the first local writing area and the second local writing area, and determining the position of the tip of the writing tool, based on a result of the detecting.

The obtaining of the first handwriting from the first local writing area and the second handwriting from the second local writing area may include obtaining the first handwriting from the first local writing area and the second handwriting from the second local writing area, based on information about a color of handwriting input by the user.

The obtaining of the first handwriting from the first local writing area and the second handwriting from the second local writing area may include obtaining the first handwriting from the first local writing area and the second handwriting from the second local writing area, based on a difference between a handwriting color and a color of a writing background.

The combining of the first handwriting with the second handwriting may include comparing the first handwriting with the second handwriting, determining changed handwriting between the captured image frame of the first local writing area and the captured image frame of the second local writing area, based on a result of the comparison, and Combining the changed handwriting, based on a result of the determination.

The handwriting information may include at least one of time sequence information of local handwriting and layout information, and the handwriting information may be stored in at least one format from among a document format, an image format, and a video format.

The layout information may include line break information and identifier information of at least one of a deleting identifier, a replacement identifier, a repeat characteristic identifier, an insertion identifier, a position adjusting identifier, and an emphasis identifier.

The method may further include obtaining audio data generated while the first local writing area and the second local writing area are being sequentially shot, and The generating of the handwriting information may include generating the handwriting information such that the obtained audio data corresponds to the first handwriting and the second handwriting.

The generating the handwriting information such that the obtained audio data corresponds to the first handwriting and the second handwriting may include generating the handwriting information such that audio data received between a shooting time of the first local area and a shooting time of the second local area corresponds to changed handwriting between a captured image frame of the first local writing area and a captured image frame of the second local writing area.

The method may further include the operations of: determining whether a pause signal is detected; and stopping the handwriting obtaining and the handwriting combining, and performing monitoring.

The determining of whether the pause signal is detected may be performed based on whether the changed handwriting between the captured image frame of the first local writing area and the captured image frame of the second local writing area or the tip of the writing tool is detected, whether a changing angle of the head posture of the user exceeds a predetermined value, whether a distance between the visual focus of the user and the writing focus exceeds a predetermined value, and whether a pause instruction was received.

The method may further include the operations of: determining whether a restore signal is detected as a result of the monitoring, and restore the handwriting obtaining and the handwriting combination, based on a result of the determination.

The method may further include determining whether an ending signal is detected; and ending the handwriting obtaining, the handwriting combining, and the generating of the handwriting information, based on a result of the determining.

The determining of whether the ending signal is detected may be performed based on based on whether a predetermined time has lapsed after the pause signal is detected or whether an ending instruction was received.

The obtaining of the first handwriting from the first local writing area and the second handwriting from the second local writing area may further include applying an enhancement process to the obtained first handwriting and the obtained second handwriting.

The enhancement process is applicable when light brightness or definition during shooting does not meet a pre-defined requirement, when a thickness of the obtained first or second handwriting is smaller than a pre-defined value, or when a difference between the color of the handwriting in a captured image and the color of a background is smaller than a predefined value.

The applying of the enhancement process may include removing a stroke whose confidence evaluation value is lower than a threshold from among at least one stroke included in the first handwriting and the second handwriting.

The confidence evaluation value of a stroke included in the first or second handwriting may be determined according to a length of the stroke, a width of the stroke, a curvature of the stroke, a color of the stroke, a relative position and continuity of the stroke with respect to other strokes, and a matching degree between the stroke and a moving trajectory of the tip of the writing tool.

To address the above-described technical problems, the present disclosure provides a non-transitory computer-readable recording medium having recorded thereon a computer program, which, when executed by a computer, performs the method.

To address the above-described technical problems, an embodiment of the present disclosure provides a device for generating handwriting information about handwriting of a user, the device including a user interface configured to receive a user input; a signal obtainer configured to sequentially shoot a first local writing area, which is within a predetermined range from a first writing focus, and a second local writing area, which is within a predetermined range from a second writing focus; and a controller configured to determine the first writing focus and the second writing focus, obtain first handwriting from the first local writing area, obtain second handwriting from the second local writing area, combine the first handwriting with the second handwriting, and generate handwriting information, based on a result of the combining.

The signal obtainer may trace a visual focus of the user, and

The controller may determine the first writing focus and the second writing focus, based on the traced visual focus.

The signal obtainer may trace a tip of a writing tool, determine a position of the tip of the writing tool, and determine the first writing focus and the second writing focus based on the determined position of the tip of the writing tool.

The user interface may receive information about a shape of the tip of the writing tool from the user, and the controller may detect a tip of the writing tool from at least one image frame captured by shooting the first local writing area and the second local writing area, and determine the position of the tip of the writing tool, based on a result of the detection.

The user interface may receive information about a color of handwriting from the user, and the controller may obtain the first handwriting from the first local writing area and the second handwriting from the second local writing area, based on the information about the color of the handwriting.

The controller may obtain the first handwriting from the first local writing area and the second handwriting from the second local writing area, based on a difference between the handwriting color and a color of a writing background.

The controller may compare the first handwriting with the second handwriting, determine changed handwriting between a captured image frame of the first local writing area and a captured image frame of the second local writing area, based on a result of the comparing, and combine the changed handwriting, based on a result of the determining.

The handwriting information may include at least one of time sequence information of local handwriting and layout information, and the handwriting information may be stored in at least one format from among a document format, an image format, and a video format.

The layout information may include line break information and identifier information of at least one of a deleting identifier, a replacement identifier, a repeat characteristic identifier, an insertion identifier, a position adjusting identifier, and an emphasis identifier.

The signal obtainer may obtain audio data generated while the first local writing area and the second local writing area are being sequentially shot, and the controller may generate the handwriting information such that the obtained audio data corresponds to the first handwriting and the second handwriting.

The controller may generate the handwriting information such that audio data received between a shooting time of the first local area and a shooting time of the second local area corresponds to changed handwriting between a captured image frame of the first local writing area and a captured image frame of the second local writing area.

The controller may control the signal obtainer to determine whether a pause signal is detected, stop the handwriting obtaining and the handwriting combining, based on a result of the determining, and perform monitoring.

The controller may determine whether a pause signal is received, based on whether the changed handwriting between the captured image frame of the first local writing area and the captured image frame of the second local writing area or the tip of the writing tool is detected, whether a changing angle of the head posture of the user exceeds a predetermined value, whether a distance between the visual focus of the user and the writing focus exceeds a predetermined value, and whether a pause instruction was received.

The controller may determine whether a restore signal is detected as a result of the monitoring, and restore the handwriting obtaining and the handwriting combination, based on a result of the determination.

The controller may determine whether an ending signal is detected, and may end the handwriting obtaining, the handwriting combining, and the generating of the handwriting information, based on a result of the determining.

The controller may determine whether the ending signal is detected, based on whether a predetermined time has lapsed after the pause signal is detected or whether an ending instruction was received.

The controller may apply an enhancement process to the obtained first handwriting and the obtained second handwriting.

The enhancement process is applicable when light brightness or definition during shooting does not meet a pre-defined requirement, when a thickness of the obtained first or second handwriting is smaller than a pre-defined value, or when a difference between a color of handwriting in a captured image and a background color is smaller than a predefined value.

The enhancement process may remove a stroke whose confidence evaluation value is lower than a threshold from among at least one stroke included in the first handwriting and the second handwriting.

The confidence evaluation value of a stroke included in the first or second handwriting may be determined according to a length of the stroke, a width of the stroke, a curvature of the stroke, a color of the stroke, a relative position and continuity of the stroke with respect to other strokes, and a matching degree between the stroke and a moving trajectory of the tip of the writing tool.

MODE OF THE INVENTION

Although general terms widely used at present were selected for describing the present invention in consideration of the functions thereof, these general terms may vary according to intentions of one of ordinary skill in the art, case precedents, the advent of new technologies, and the like. Terms arbitrarily selected by the applicant of the present invention may also be used in a specific case. In this case, their meanings need to be given in the detailed description of the invention. Hence, the terms must be defined based on their meanings and the contents of the entire specification, not by simply stating the terms.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

The "terminal" and "intelligent device" used herein not only include devices with wireless signal receivers having no transmission functions, but also include devices including both receiving and transmitting hardware which may perform bidirectional reception and transmission via a bidirectional communication link. The terminal and the intelligent device may include: cellular or other communication devices including a single line display or multi-line display; a personal communications service (PCS) including voice, data processing, fax and/or data communication functions; personal digital assistant (PDA), a radio frequency (RF) receiver, a pager, Internet/Intranet visit device, a network browser, a notebook calendar, and/or a global positioning system (GPS) receiver; conventional laptop and/or palm computers or other devices, including conventional laptop and/or palm computers equipped with RF receivers; and head wearable devices (e.g., intelligent glasses, an intelligent helmet, etc.), smart bracelet, a smart watch, etc. The "terminal" and "intelligent device" used herein are portable and transportable, and can be provided in a vehicle (aviation, maritime and/or land), and are applicable to operate locally and/or operate in a distributed manner at any position of the earth and/or space. The "terminal" and "intelligent device" used herein may also refer to a communication terminal, an Internet terminal, and a music/video player terminal, e.g., a PDA, a mobile Internet device (MID), a mobile phone with a music/video playing function, intelligent glasses, a smart bracelet, and a smart watch.

The "server" used herein may refer to a single server, a group of servers, a cloud server, or the like, and may also refer to a service server that provides a service, such as a voice over Internet protocol (VOIP) service or a content providing service. However, embodiments are not limited thereto.

In the present disclosure, an intelligent device traces a writing focus detected in real-time, shoots a local writing area, and obtains local handwriting. After overall handwriting is obtained by combining the local handwriting, the intelligent device recognizes handwriting of a user according to the overall handwriting. Since retrieved handwriting is the handwriting of the user already written on a writing surface and thus is irrelevant to pen-up and pen-down movements of the user, the problem that handwriting retrieving according to the moving trajectory of the tip of a writing tool is inaccurate can be avoided, and the accuracy of recognizing the handwriting of the user increases.

In addition, since the intelligent device shoots a local writing area, retrieving of handwriting from a captured image frame becomes easy, and the problem in the related art that handwriting is thick and unclear when the handwriting is shot is avoided, and also the handwriting is clear on the captured image frame.

In the present disclosure, handwriting may include, but is not limited to, all contents, such as characters, numbers, lines, and dots written by a hand of a user. In other words, handwriting represents lines or a group of lines representing a certain length, a certain area, and a certain color created by a writing tool. The lines may be straight lines or curved lines.

In the present disclosure, local handwriting may mean a portion of overall handwriting and may include, but is not limited to, handwriting detected from a local writing area.

In the present disclosure, the overall handwriting may mean a combination of local handwritings. For example, the overall handwriting may include all contents written by a user on a writing surface or handwriting combined in predetermined units (for example, units of lines) by an intelligent device. However, embodiments are not limited thereto.

In the present disclosure, handwriting information may include data or information generated by an intelligent device, based on handwriting of a user. The handwriting information may include, but is not limited to, a document-format file (e.g., a word file), an image-format file, a video-format file, and an audio-format file.

Embodiments of the present disclosure will now be described in detail with reference to the accompanying drawings.

Embodiment 1

Embodiment 1 of the present disclosure provides a method of recognizing handwriting of a user. Embodiment 1 may be implemented by an intelligent device. As shown in FIG. 1A, Embodiment 1 may include the following operations.

In operation S101, the intelligent device may trace a writing focus detected in real-time, and may shoot a local writing area.

According to some embodiments, the intelligent device may continuously shoot a writing procedure of the user, after receiving a handwriting recognizing trigger instruction inputted by the user. In other words, local writing areas may be shot through the tracing of the writing focus detected in real-time.

The handwriting recognizing trigger instruction may be generated via various manners when the user starts to write. For example, the handwriting recognizing trigger instruction may be generated by using at least one of: a voice, a button, a gesture, a human-computer interaction interface (e.g., augmented reality), and an external controller (e.g., a device with a remote control function, such as a cellular phone, associated with the intelligent device).

If the handwriting recognizing trigger instruction is triggered by a voice, when the user emits a voice instruction "Start handwriting recognition.", the intelligent device receives the voice instruction, starts voice recognition according to the voice instruction in order to determine whether the voice instruction is a handwriting recognizing trigger instruction, and starts handwriting recognition. The voice instruction may include, but is not limited to, "start handwriting recognizing", "handwriting recognizing starts", "recognizing starts", and other instructions in Korean, in English, in Chinese, or in any other languages. A correspondence between the voice instruction and the handwriting recognizing trigger instruction may be stored in the intelligent device, in form of a correspondence table, to associate the voice instruction with the handwriting recognizing trigger instruction. However, embodiments are not limited thereto. The user and the intelligent device may use other methods to associate the voice instruction with the handwriting recognizing trigger instruction.

Figure 1B:
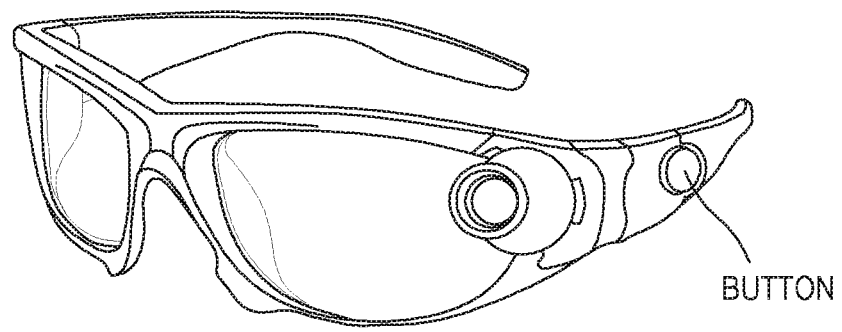
FIG. 1B is a schematic diagram illustrating a method of triggering handwriting recognition via a button, according to some embodiments.

The handwriting recognizing trigger instruction may be triggered via a button. According to some embodiments, the button may be a hardware button on the intelligent device, e.g., a home button, a sound adjustment button, a power button, a program adjustment button, a newly-added button, or a button as shown in FIG. 1B, or a software button implemented by software, or may be a user interface (UI) of the intelligent device. However, embodiments are not limited thereto. If the user presses the button according to a predefined manner, the intelligent device may determine that the handwriting recognizing trigger instruction has been received. The predefined manner may include, but is not limited to, short pressing, long pressing, short pressing for a predefined number of times, and alternate short and long presses.

If the handwriting recognizing trigger instruction is triggered by a gesture, the gesture may be implemented by one hand or by two hands. The gesture may include hand waving, drawing of a circle, drawing of a rectangle, drawing of a triangle, drawing of a star, etc. The intelligent device may detect and recognize the gesture using an existing gesture detecting device. The intelligent device may determine that the handwriting recognizing trigger instruction has been received, according to the recognized gesture.

Figure 1C:
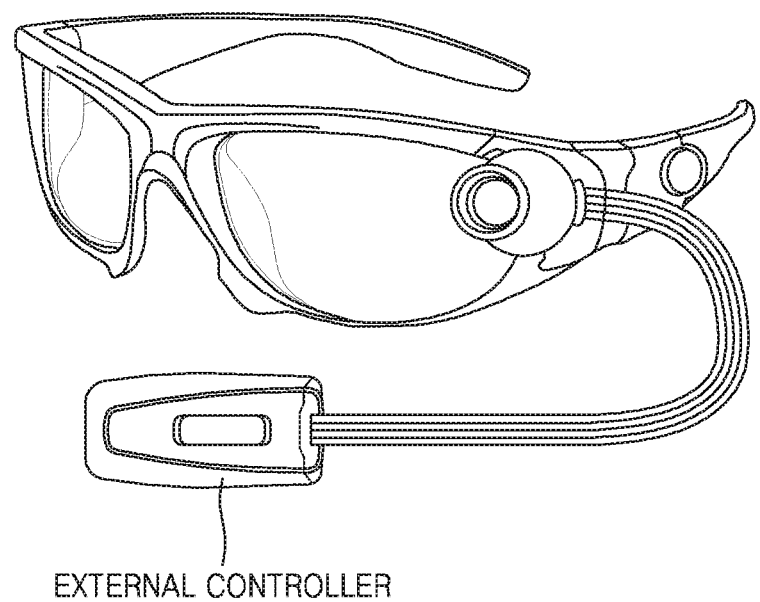
FIG. 1C is a schematic diagram illustrating a method of triggering handwriting recognition by using an external controller, according to some embodiments.

According to some embodiments, the handwriting recognizing trigger instruction for shooting a local writing area may be received from an external controller (e.g., from a cellular phone connected with the intelligent device). The connection between the intelligent device and the external controller may be a physical connection (as shown in FIG. 1C) or may be a wireless connection via at least one of a macro network, a Wireless Fidelity (WiFi) network, and a local area network (LAN), and embodiments are not limited thereto. An instruction of the external controller may be an infrared instruction, or a message transmitted by the cellular phone, and embodiments are not limited thereto.

According to some embodiments, the handwriting recognizing trigger instruction may not be used. For example, the intelligent device may be always in the state of recognizing handwriting.

According to some embodiments, a writing focus may be determined by any one of the following methods, and embodiments are not limited to the following methods.

In a first method, the writing focus may be traced by tracing a visual focus detected in real-time. The first method may be implemented by a head wearable device such as intelligent glasses, but embodiments are not limited thereto. The first method may be performed by any device capable of tracing the visual focus.

Figure 1D:
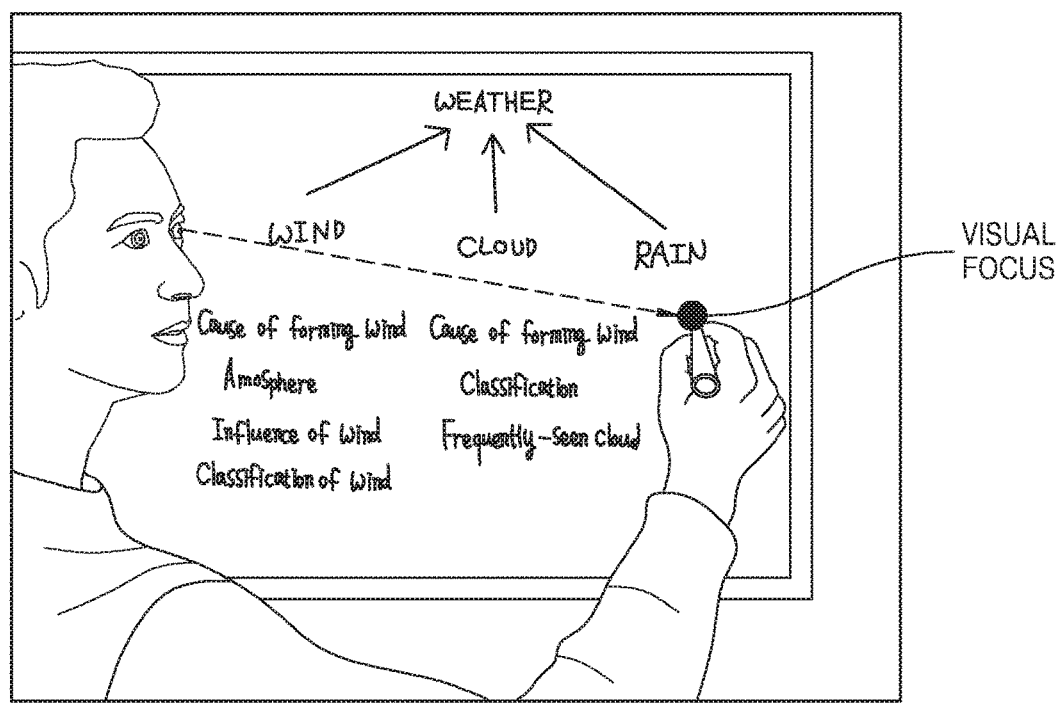
FIGS. 1D and 1E are schematic diagrams illustrating a method of determining a writing focus according to a visual focus, according to some embodiments.
Figure 1E:
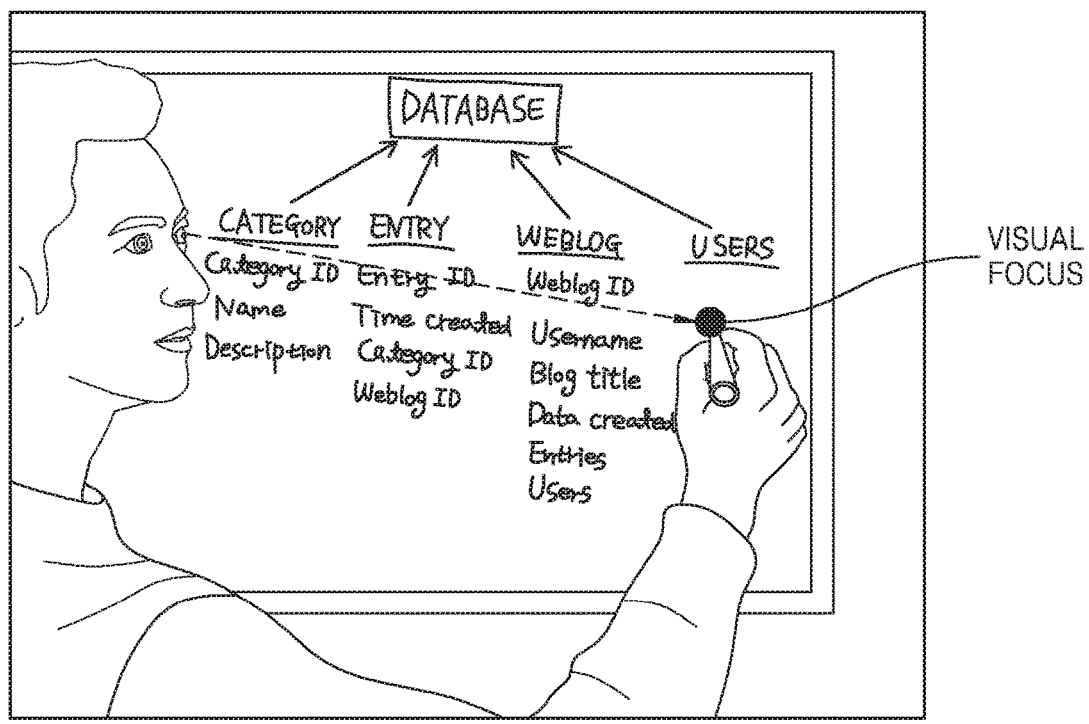

As shown in FIGS. 1D and 1E, during the writing procedure of the user, the visual focus generally moves with the writing focus. When the user writes, the sight may fall within a writing area. Therefore, the writing focus may be determined according to the visual focus of the user.

According to some embodiments, the visual focus may be detected by detecting a head posture of the user and/or by detecting an eyeball action of the user in real-time. According to some embodiments, the intelligent device may determine the visual focus, based on the detected head posture and/or the detected eyeball action. For example, an orientation of the user's face may be determined according to the detected head posture, and an orientation of the user's eyes may be determined according to the eyeball action of the user. The intelligent device may determine the visual focus of the user according to the orientation of the face and/or the orientation of the eyes. The head posture may be detected via a detecting device for detecting the head posture. The detecting device may be included in or separated from the intelligent device. The eyeball action may be detected by an eyeball action detecting device included in or separated from the intelligent device.

For example, while the user is writing 'Today's weather is very good', the intelligent glasses may detect that the visual focus of the user is at a character 'g', and may determine the writing focus to be the character 'g'.

In a second method, the writing focus may be traced by tracing the tip of a writing tool. The second method may be implemented by an intelligent device with a camera, but embodiments are not limited thereto. The second method may be performed by any device capable of tracing the tip of the writing tool.

Figure 1F:
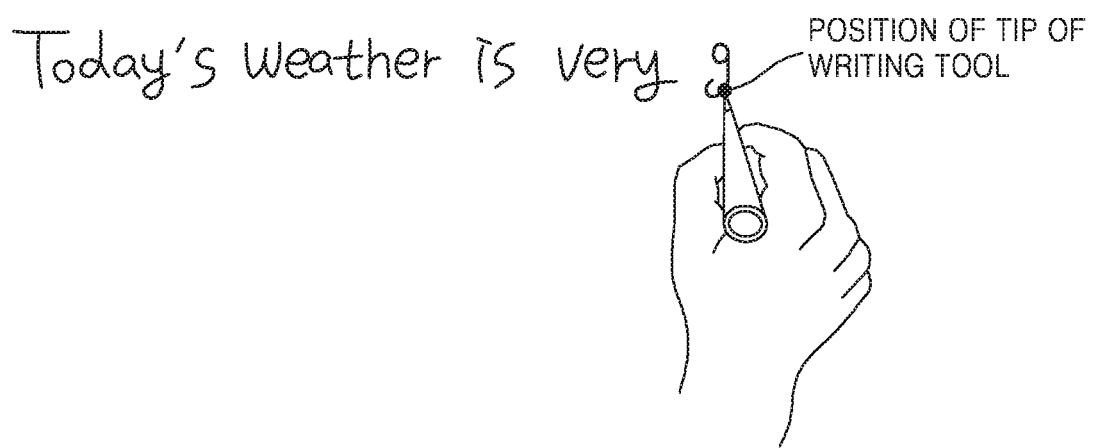
FIGS. 1F and 1G are schematic diagrams illustrating a method of determining a writing focus according to a position of the tip of a writing tool, according to some embodiments.
Figure 1G:
Figure 1H:
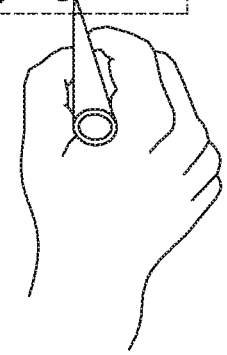
FIGS. 1H and 1I are schematic diagrams illustrating selection of a local writing area, according to some embodiments.

According to some embodiments, during the writing procedure of the use, the writing focus may move with the position of the tip of the writing tool. As shown in FIGS. 1F and 1H, during the writing procedure of the user, the tip of the writing tool may fall in a current local writing area. Therefore, the writing focus may be determined by detecting the position of the tip of the writing tool in real-time.

According to some embodiments, the intelligent device may detect the position of the tip of the writing tool by recognizing the tip of the writing tool from a captured image frame according to the shape of the tip of the writing tool registered in advance and then determining the position of the tip of the writing tool.

According to some embodiments, a posture of holding the writing tool by a hand may be used to determine the position of the tip of the writing tool. The intelligent device may determine a grip direction of fingers by detecting a human hand so as to assist the positioning of the tip of the writing tool, and may find the tip of the writing tool along the grip direction of the fingers. For example, the intelligent device may detect a writing tool gripping habit of user A whereby the top of the finger is at a distance of 3 cm from the tip of the writing tool and an angle between the writing tool and a writing surface is 60 degrees. After a position C of the finger of the user is detected, the intelligent device may determine the orientation of the finger top according to the orientation of the finger, and then may determine that the position of the tip of the writing tool is 1.5 cm from the position C.

According to some embodiments, the intelligent device may obtain a general habit of people holding a writing tool during a writing procedure, by collecting statistics, e.g., a range of a distance between the gripping position of the writing tool and the tip of the writing tool. The statistics may be used as a reference to determine a rough area of the tip of the writing tool during practical detection of the tip. The intelligent device may detect the shape of the tip of the writing tool within the determined rough area, thereby reducing the area that is to be checked to detect the tip of the writing tool and facilitating successful position-detection. According to some embodiments, the statistics may be obtained from a user input, an input by a server or any other devices, or data or information stored in the intelligent device.

In addition, a wearable device, such as a smart bracelet or a smart watch, may also use the above-described method of assisting the positioning. For example, a wearable device on the wrist of a user, such as a smart bracelet or a smart watch, may detect a writing tool gripping habit of user A whereby the position of the wearing device is at a distance of 8 cm from the tip of the writing tool and an angle between the writing tool and the wrist is 30 degrees. The wearable device may detect that, during a writing procedure, the wrist moves to the right. Thus, the position of the tip of the writing tool may be determined based on the position of the wearable device such as a smart bracelet or a smart watch. According to some embodiments, the position of the tip of the writing tool may be determined based on statistics including a general habit of people holding a writing tool during a writing procedure. For example, a distance between the wrist and the tip of the writing tool is generally 5 to 15 cm, and the range of the angle between the wrist and the writing surface may be 15 to 65 degrees. The distance between the wrist and the tip of the writing tool and the range of the angle between the wrist and the writing surface may be used as a reference to determine a rough area of the tip of the writing tool during practical detection of the tip of the writing tool. The intelligent device may detect the shape of the tip of the writing tool within the determined rough area, thereby reducing the area that is to be checked to detect the tip of the writing tool and facilitating successful position-detection.

After the writing focus of the user is detected in real time, a shooting focus of the camera may be adjusted according to a variation of the writing focus of the user detected in real-time. According to some embodiments, the position of the tip of the writing tool may be selected as the writing focus, and the writing focus may be selected as the shooting focus of the camera for shooting. According to some embodiments, an offset may be added to the position of the tip of the writing tool, the offset-added position may be selected as the writing focus, and the writing focus may be selected as the shooting focus of the camera for shooting. The offset may be manually set in advance. For example, according to a writing habit of the user, the offset may be set such that the writing focus is shifted to the left or to the right. If the user writes from left to right, the intelligent device may set the offset such that the writing focus is 1 cm shifted to the left. If the user writes from right to left, the intelligent device may set the offset such that the writing focus is 1 cm shifted to the right. The offset may be a time-variant. For example, the offset may be a function of the position of the visual focus detected by the intelligent device or a function of a head action of the user.

For example, it is supposed that the user is writing 'Today's weather is very good', and the intelligent device detects the tip of the writing tool from a character 'g'. In this case, the intelligent device may select the character 'g' as the shooting focus for shooting, or may select a character 'y' (y in the word 'very') 1 cm to the left of the character 'g' as the shooting focus for shooting.

According to some embodiments, a local writing area that is shot may have a reasonable size. If the shot local writing area is too large, handwriting of the user on a captured image frame may look thick compared with the resolution of the camera, which is not good for subsequent handwriting retrieval. If the shot local writing area is too small, this is not good for subsequent handwriting combination. The size of the local writing area may be defined in advance by a user input. Of course, the intelligent device may receive information used to set the size of the local writing area from a server, and embodiments are not limited thereto.

For example, the local writing area may be a rectangle taking the shooting focus as the center, wherein the length of a side of the rectangle may be 2 cm. Alternatively, the local writing area may be determined based on a function of a distance between the intelligent device, such as an intelligent head wearable device, and the writing surface, which varies in real time during the shooting procedure.

Figure 1I:
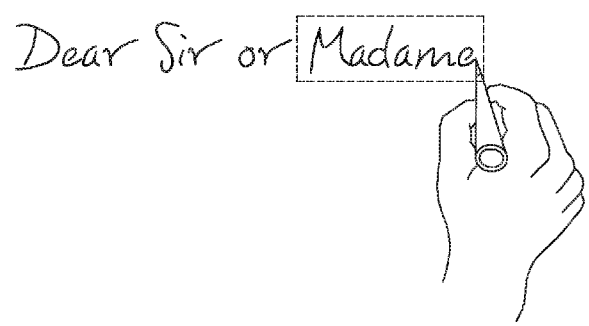

According to some embodiments, FIGS. 1H and 1I show selection of a local writing area. As shown in FIG. 1H, the tip of the writing tool of the user may be at the character 'g'. In order to clearly capture written content, the intelligent device may shift the position of the tip of the writing tool to the left to obtain a writing focus, and select a selected rectangular area as a local writing area for shooting. The method of FIG. 1I of selecting a local writing area is similar to that of FIG. 1H.

According to some embodiments, the user may write 'Today's weather is very good'. When it is determined that the shooting focus is at the character 'g', the intelligent device may shoot an area having a length of 2 cm and being centralized at the character 'g' to obtain an image frame of the local writing area containing 'very good'.

According to some embodiments, in order to capture the local writing area clearly, shooting parameters (e.g., a focus, a focal length, an aperture, magnification, and a white balance) of the camera may be adjusted self-adaptively in real time during a shooting procedure.

For example, during a shooting procedure, the shooting parameters of the camera may be adjusted dynamically and self-adaptively according to the light and focusing situations when the local writing area is shot. When the light is weak, the aperture of the camera is enlarged. If the writing surface is relatively far from the camera, the camera is adjusted to have a focus on the writing surface.

According to some embodiments, during shooting of the local writing area, the intelligent device may determine a current orientation of the camera and its position relative to the writing surface by detecting a changing angle of the head posture of the user, and then may adjust the shooting parameters of the camera according to the current orientation and the position of the camera. A head action of the user may be detected by a sensor built in a wearable device.

For example, if the user wears an intelligent device, such as intelligent glasses, since the orientation of the camera may be adjusted freely in 360 degrees and the camera is fixed to a spectacle frame, the orientation of the eyes/head of the user is consistent with the orientation of the camera. If the camera is fixed to the intelligent device during a writing procedure of the user and the intelligent device detects that the head of the user turns to the right for 30 degrees, the intelligent device may determine that a current orientation of the camera is turned to the right for 30 degrees. After the head turns, it is highly likely that a distance between the eyes and the writing surface is changed certainly. Thus, the intelligent device may estimate a new focus and a new focal length according to a focus and a focal length of the camera known before the angle change, and the turned angle of the head, such that the focus of the camera is near the writing focus.

According to some embodiments, during shooting, capturing time periods of image frames may be recorded via timestamps, and the captured image frames may be arranged according to the capturing time periods to form an image frame sequence. The captured image frames may be arranged using a sequence according to the capturing time periods. For example, when the recorded capturing time periods include 0.01 s, 0.02 s, 0.03 s, . . . , 2.95 s, and 3.00 s, sequences 1, 2, 3, 4, . . . , 295, and 300 may be utilized to arrange the captured image frames corresponding to the shooting time periods according to a time sequence of the shooting time periods. According to some embodiments, an online handwriting recognition method having a higher recognizing accuracy ratio than an offline recognition method may be used, and the intelligent device may reserve and store time sequence information of the handwriting of the user to use the online handwriting recognition method.

In operation S103, local handwriting is retrieved from a captured image frame of the local writing area.

Figure 1J:
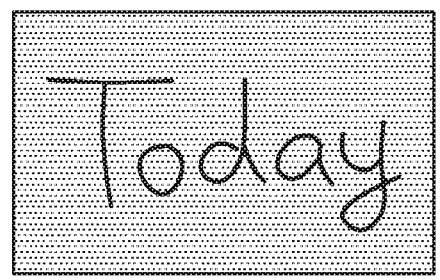
FIGS. 1J and 1K are schematic diagrams illustrating retrieval of a local writing area, according to some embodiments.
Figure 1K:
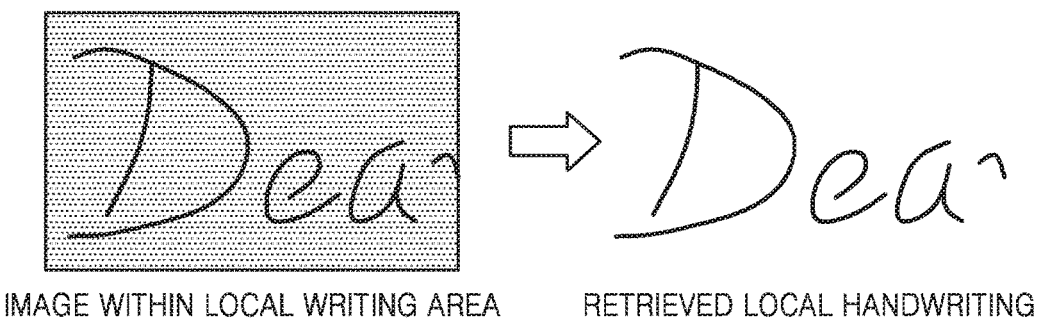

According to some embodiments, the local handwriting is retrieved from the captured image frame of the local writing area according to handwriting color information. As shown in FIGS. 1J and 1K, the captured image frame of the local writing area is the left figure. The intelligent device may retrieve local handwriting as shown in the right figure according to the handwriting color information.

The following two methods may be applied to retrieve the local handwriting from the captured image frame of the local writing area. However, according to embodiments, the other methods may be used.

In a first method, the local handwriting may be retrieved from the image frame of the local writing area according to handwriting color information of the writing tool registered in advance.

According to some embodiments, the intelligent device may retrieve content in the image frame of the local writing area having the same color as the handwriting color of the writing tool registered in advance, as the local handwriting. As described above, the content may include, but is not limited to, dots, lines, characters, and numbers.

For example, when the handwriting color of the writing tool registered in advance is red, the content in red in the image frame of the local writing area may be 'Today's weather is very good'. Accordingly, the intelligent device may recognize and retrieve 'Today's weather is very good' as local handwriting information.

According to some embodiments, a binarized manner may be used to retrieve the local handwriting from the image frame of the local writing area. The intelligent device may identify pixels in a current image frame having the same handwriting color information as the pre-registered handwriting color information of the writing tool as 1, and other pixels as 0. The intelligent device may retrieve all of the pixels identified as 1 in a binarized image of the current image frame and select the retrieved pixels as handwriting of the local writing area corresponding to the current image frame (i.e., the local handwriting of the current image frame).

For example, when the handwriting color of the writing tool registered in advance is red and the color of the writing surface is white, a red area in the image frame of the local writing area is content 'Today's weather is very good'. The intelligent device may identify the pixels in the red area of the current image frame as 1 and other pixels (i.e., pixels in white) as 0. The intelligent device may recognize and obtain handwriting 'Today's weather is very good' by detecting all of the pixels identified as 1.

In a second method, the local handwriting may be retrieved from the image frame of the local writing area according to a color difference between the handwriting color and the color of a writing background (writing surface).

According to some embodiments, binarized processing may be performed on the image frame of the local writing area according to the color difference between the handwriting and the writing surface. To obtain a binarized image frame, an area covered by one kind of color may be identified as 0, and an area covered by another kind of color may be identified as 1. A line-shaped image area is determined based on the binarized image frame. Since handwriting is usually line-shaped, a line-shaped image may be retrieved as the local handwriting.

For example, when the user writes 'Today's weather is very good' on a white paper by using a writing tool with black ink, the intelligent device identifies an area covered by white as 0. The area covered by white is the background, and is generally a slice-shaped area. The intelligent device may identify an area covered by black as 1. The area covered by black is the handwriting and is generally a line-shaped area. The line-shaped area is retrieved from the binarized image frame to obtain 'Today's weather is very good'. In other words, the intelligent device may retrieve a sentence 'Today's weather is very good' as the local handwriting.

According to some embodiments, after the handwriting is determined, all pixels in the handwriting area may be identified as 1, and other pixels may be identified as 0. Thus, in a finally obtained image frame, the pixels of the local handwriting are identified as 1, and background pixels are identified as 0.

According to some embodiments, there may be more than two colors in an image frame. In this case, the values of all of the pixels included in the image frame may be averaged, and the binarized processing may be performed on a current image frame according to a calculated average value to obtain a binarized image frame.

A method of performing the binarized processing on the image frame according to the calculated average value is as follows. For each pixel in the image frame, if the value of the pixel is smaller than the calculated average value, the intelligent device identifies the pixel as 0; otherwise, the intelligent device identifies the pixel as 1. Thus, the image frame is divided into an image area including pixels identified as 1, and an image area including pixels identified as 0 (i.e., a binarized image is obtained). Then, the shape of each image area is determined, and a line-shaped image area is determined as the local handwriting.

For example, the user may write 'Today's weather is very good' on a white paper by using a writing tool with black ink. The white paper has a yellow area, or may reflect yellow light because some area of the white paper shines. The intelligent device obtains an image frame after shooting content handwritten by the user. The image frame may include not only a white area on the white paper and an area showing black handwriting 'Today's weather is very good', but also a yellow area on the white paper. It is supposed that the pixels in yellow and white are smaller than the average value and the pixels in black are larger than the average value. The intelligent device identifies the areas covered by white and yellow as 0 and the areas covered by black as 1 to obtain the binarized image frame. In the binarized image frame, the area identified as 1 is a line-shaped area. The intelligent device may retrieve the line-shaped area to obtain a local handwriting sentence 'Today's weather is very good'.

According to some embodiments, since handwritten information is retrieved according to the handwriting information, if the handwriting of the user differs from the writing surface in terms of color, the user may use a general writing tool to write on any writing surface, and conveniently recognize the handwritten information. Thus, a user experience is improved.

In operation S105, the intelligent device combines retrieved local handwritings to obtain overall handwriting.

The retrieved local handwritings may be combined according to one of the following methods to obtain the overall handwriting. However, embodiments are not limited thereto.

In a first method, local handwriting retrieved from a current image frame and local handwriting retrieved from a previous image frame are compared to determine changed handwriting of the current image frame. Changed handwritings of all image frames are combined to obtain the overall handwriting. Changed handwriting may refer to handwriting which exists in a current image frame but does not exist in a previous image frame.

According to some embodiments, a process of comparing the local handwriting retrieved from the current image frame with the local handwriting received from the previous image frame to determine the changed handwriting of the current image frame includes the following operations performed by the intelligent device. The intelligent device may compare a binarized image frame of the local handwriting of the current image frame with a binarized image frame of the local handwriting of the previous image frame according to a handwriting overlapping part. The intelligent device may determine handwriting which exists in the current image frame but does not exist in the previous image frame, as changed handwriting relative to the previous image frame (i.e., the changed handwriting of the current image frame). The binarized image frame of the local handwriting may be obtained according to one of the binarized processing manners described above with reference to operation S103.

Figure 1L:
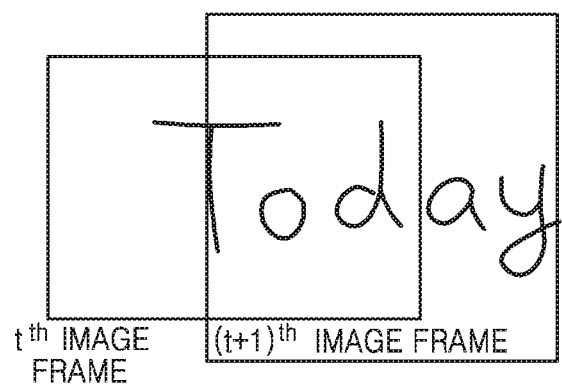
FIGS. 1L and 1M are schematic diagrams illustrating changed handwriting according to some embodiments.
Figure 1M:
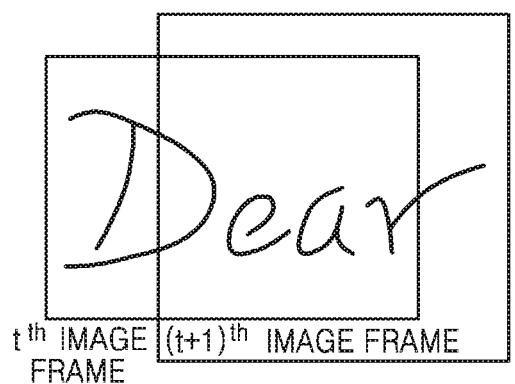

For example, FIGS. 1L and 1M respectively show changed handwritings. As shown in FIG. 1L, the left rectangle shows a $t_{th}$ image frame and the right rectangle shows a $(t+1)_{th}$ image frame, wherein t is an integer. The two image frames are compared according to the handwriting overlapping part. Added content of the $(t+1)_{th}$ image frame relative to the $t_{th}$ image frame is characters 'ay'. Of course, as shown in FIG. 1M, a portion (line or stroke) of a character may be the added content.

Figure 1N:
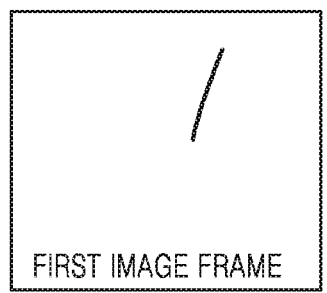
FIG. 1N is a schematic diagram illustrating image frames obtained by consecutively shooting handwritten content, according to some embodiments.
Figure 1N:
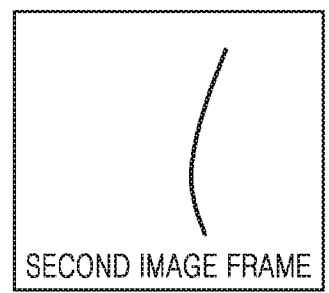
Figure 1N:
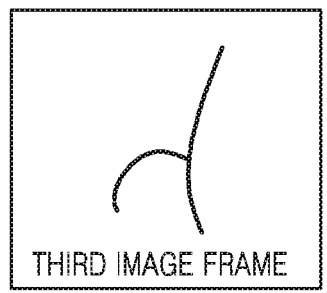
Figure 1N:
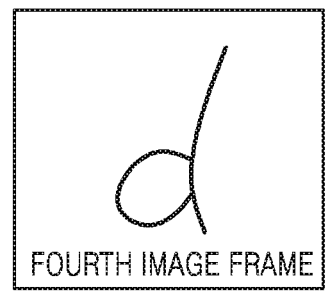

According to another embodiment, the user writes 'Today's weather is very good' on a white paper. During a writing procedure, the intelligent device captures two consecutive image frames, wherein the first image frame shows 'Today's weather is very' written on the white paper and the second image frame shows 'Today's weather is very good'. The local handwritings of the two image frames are respectively 'Today's weather is very' and 'Today's weather is very good'. The two image frames are compared according to a handwriting overlapping part. The second image frame has an additional handwriting 'good' relative to the first image frame. In other words, incremental handwriting of the second image frame is 'good'. Of course, in the above embodiment, an image frame is captured in units of phrases or words. As shown in FIG. 1N, a plurality of image frames may be captured when a single character is written. In other words, the incremental handwriting of each image frame may be relatively short. The added content of a latter image frame relative to a former image frame is changed handwriting of the latter image frame.

According to some embodiments, after changed handwriting of each image frame is obtained, the obtained changed handwritings may be sequentially connected according to a time sequence of the changed handwriting of each image frame to obtain overall handwriting information containing time-sequence information.

For example, when the user writes 'od' on white paper by using a writing tool with black ink, four consecutive image frames may be captured. When being described by using an intuitive line, respective changed handwriting of four consecutive image frames when characters 'od' are written may be 'a left semi-circle', 'a right semi-circle', 'a left semi-circle', and 'a straight line'. All of the changed handwriting is connected together according to a time sequence of the consecutive image frames to obtain the overall handwriting 'od'.

According to some embodiments, an interval between image frames may not be longer than a predetermined length, and the changed handwriting of each image frame may be a single stroke. FIG. 1N shows four consecutive image frames when a character 'd' is written. The intelligent device may combine changed handwritings of the four consecutive image frames according to the time-sequence information of the four consecutive image frames to obtain a handwritten character 'd'.

A time-sequence relationship between the changed handwritings may be obtained via the following method, but embodiments are not limited to the following method.

According to some embodiments, the intelligent device may sequentially process different image frames according to a time sequence to obtain a time-sequence relationship between the changed handwritings of the difference frames. For example, the intelligent device may obtain a timestamp corresponding to changed handwriting of a current image frame and a time-sequence relationship between the changed handwriting of the current image frame and changed handwriting of an adjacent image frame, according to a timestamp recorded in the current image frame and a time sequence relationship between the current frame image and the adjacent image frame.

Figure 1P:
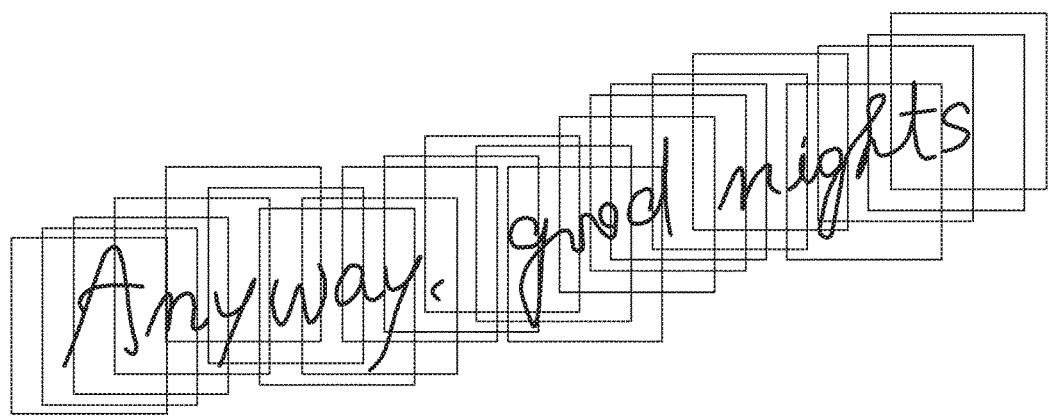

FIGS. 1O and 1P respectively illustrate methods of combining changed handwritings. As shown in FIG. 1O, each rectangle denotes an image frame. The user writes 'Today's weather is very good' from left to right. The intelligent device performs shooting from left to right according to the time sequence to obtain a plurality of image frames, and records time sequence information of each of the plurality of image frames. For example, to obtain timestamps of all image frames, the intelligent device may record a shooting timestamp of a first image frame on the left as Oct. 31, 2014, 14:10:04, and record a shooting timestamp of a second image frame on the left as Oct. 31, 2014, 14:10:15, and so on. Then, the intelligent device may combine changed handwritings of the image frames according to a sequence of the timestamps of the image frames. The combining method of FIG. 1P is similar to that of FIG. 1O.

In addition, the time sequence information may be expressed by relative information. For example, in FIG. 1O, the user writes 'Today's weather is very good' from left to right. The intelligent device performs shooting from left to right according to the time sequence to obtain a plurality of image frames. The intelligent device may record the time sequence information of each image frame by using increasing or decreasing indexes from left to right. For example, the intelligent device may record a frame index of the first image frame on the left as 1, a frame index of the second image frame on the left as 2, and so on, to obtain respective indexes of all of the image frames. Then, the intelligent device may combine the changed handwritings of the image frames according to a time sequence expressed by the frame indexes of the image frames.

In addition, the time sequence of the changed handwritings may further include a time sequence relationship between internal pixels of the changed handwriting of the current image frame. The time sequence relationship between the internal pixels of the changed handwriting of the current image frame may be determined by one of the following methods, and embodiments are not limited to the following methods.

In a first method, if the changed handwriting of the current image frame is connected with handwriting of combined previous frames, the intelligent device may select a connection point between them as a start point of the changed handwriting of the current image frame, and may select the other point of a stroke starting from the connection point as an end point of the changed handwriting of the current image frame. Pixels between the start point and the end point may be sequentially indexed.

Figure 1Q:
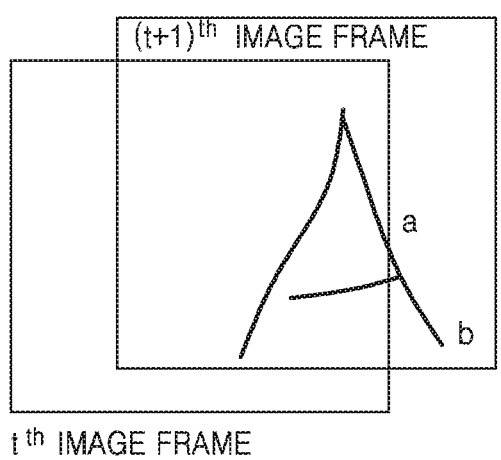
FIGS. 1Q-1S are schematic diagrams illustrating processes of obtaining time sequence information of internal pixels of changed handwriting, according to some embodiments.

As shown in FIG. 1Q, the left rectangle shows a $t_{th}$ image frame and the right rectangle shows a $(t+1)_{th}$ image frame. The handwriting between points a and b is changed handwriting of the $(t+1)_{th}$ image frame. The changed handwriting of the $(t+1)_{th}$ image frame is connected with handwriting of combined previous image frames at the point a. The intelligent device may select the point a as the start point of the changed handwriting of the $(t+1)_{th}$ image frame and the point b as the end point thereof. Pixels between the points a and b may be sequentially indexed to obtain time sequence information inside the changed handwriting of the $(t+1)_{th}$ image frame.

In a second method, if the changed handwriting of the current image frame is not connected with the handwriting of the combined previous frames, the intelligent device may calculate a shortest distance between the handwriting of the combined previous frames and each end of a stroke corresponding to the changed handwriting of the current image frame, select an end of the stroke having the shortest distance from the handwriting of the combined previous frames as the start point of the changed handwriting of the current image frame, and select the other end of the stroke as the end point thereof. Pixels between the start point and the end point may be sequentially indexed.

Figure 1R:
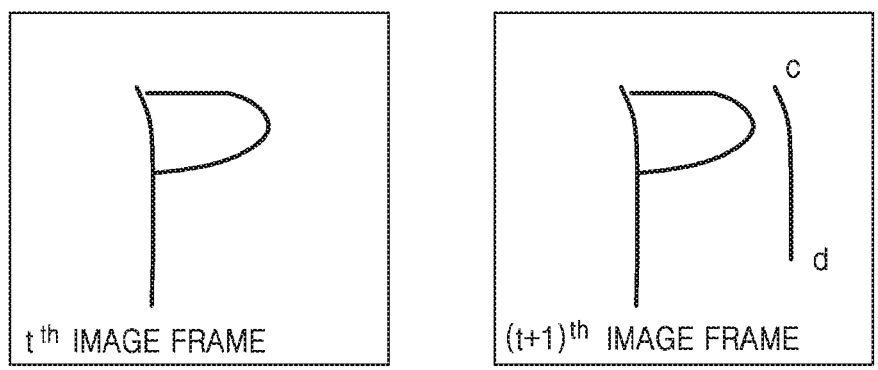

As shown in FIG. 1R, handwriting between points c and d is changed handwriting of a $(t+1)_{th}$ image frame. The changed handwriting of the $(t+1)_{th}$ image frame is not connected with handwriting of combined previous image frames. The intelligent device calculates a shortest distance between the point c and the handwriting of the combined previous image frames and a shortest distance between the point d and the handwriting of the combined previous image frames. The intelligent device may know from a result of the calculation that the distance between the point c and the handwriting of the combined previous image frames is relatively shorter than the distance between the point d and the handwriting of the combined previous image frames. Therefore, the intelligent device may select the point c as the start point of the changed handwriting of the $(t+1)_{th}$ image frame and the point d as the end point thereof. Pixels between the points c and d may be sequentially indexed to obtain time sequence information inside the changed handwriting of the $(t+1)_{th}$ image frame.

In a third method, if the changed handwriting of the current image frame includes at least two strokes, the intelligent device may calculate a shortest distance between the handwriting of the combined previous frames and each end of each stroke in the changed handwriting of the current image frame, select an end of a stroke having the shortest distance from the handwriting of the combined previous frames as the start point of a first stroke of the changed handwriting of the current image frame, and select the other end of the stroke as the end point thereof. Pixels between the start point and the end point may be sequentially indexed. The above-described process may be repeated on all strokes and all pixels identified with a time sequence.

Figure 1S:
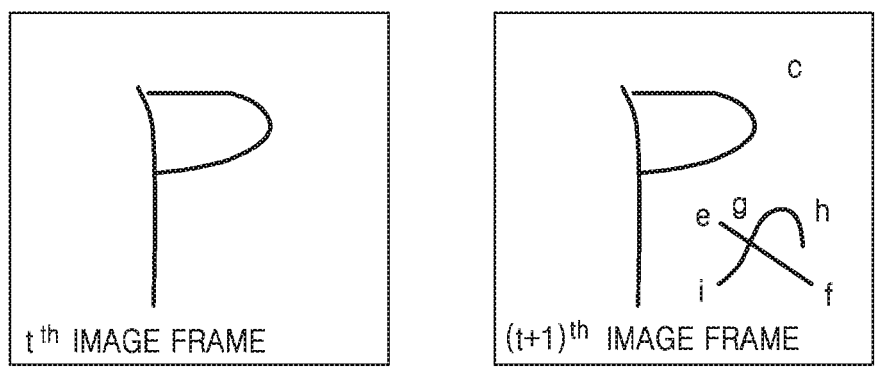

As shown in FIG. 1S, handwriting from a point e to a point f and handwriting from a point h to a point i are changed handwriting of a $(t+1)_{th}$ image frame. The changed handwriting of the $(t+1)_{th}$ image frame is not connected with handwriting of combined previous image frames. The intelligent device may calculate shortest distances between the points e, f, g, and h and the handwriting of the combined previous image frames. The intelligent device may select the point e as a start point and the point f as an end point. The pixels between the points e and f may be sequentially indexed. Thereafter, the intelligent device may calculate shortest distances between points h and i and an identified stroke. The intelligent device may know from a result of the calculation that the distance between the point h and the identified stroke is relatively shorter than the distance between the point i and the identified stroke. Therefore, the intelligent device may select the point h as a start point and the point i as an end point. Pixels between the points h and i may be sequentially indexed to obtain time sequence information inside the changed handwriting of the $(t+1)_{th}$ image frame.

According to some embodiments, a connection situation of the changed handwriting of the current image frame may be analyzed. In other words, the intelligent device may obtain time sequence information of handwriting according to types of strokes. The intelligent device may select disconnected parts as different strokes. The intelligent device may divide crossing strokes within the changed handwriting into several non-crossing sub-strokes, at a crossing point of the crossing strokes.

According to some embodiments, according to a writing direction (e.g., from left to right or from top to bottom) of the user or a corresponding language, the intelligent device connects the sub-strokes in pairs at the crossing point to obtain complete strokes. For example, in FIG. 1S, two strokes e-f and h-i are cut off at a crossing point g to obtain four sub-strokes, and then, according to the principle of from left to right and from top to bottom, the obtained sub-strokes e-g and g-f are connected to form the stroke e-f, and the obtained sub-strokes i-g and i-h are connected to form the stroke h-i.

According to some embodiments, when the changed handwriting is a circular stroke, the circular stroke may be cut off at any point which acts as the start point and the end point. Since the sampling frequency of the camera is far higher than the writing speed of the user, two adjacent image frames generally have a large amount of overlapping handwriting and a situation where the changed handwriting includes a plurality of strokes may not exist.

When start points and end points of changed handwritings of a current image frame are determined according to the above-described illustration, the changed handwritings may be combined. In other words, the intelligent device may determine a combining start point and a combining end point of local handwritings of the current image frame, and may combine the changed handwritings with each other, based on the determined combining start point and the determined combining end point. For example, the start point of a first stroke in changed handwriting of a current image frame may be selected as a combining start point of local handwritings of the current image frame, and the end point of a last stroke in the changed handwriting of the current image frame may be selected as a combining end point of the local handwritings of the current image frame.

According to some embodiments, after changed handwriting is obtained, the intelligent device may perform a confidence evaluation on the strokes of the changed handwriting. According to some embodiments, confidence evaluation values of the strokes in local handwriting may be determined according to at least one of: a length of a stroke, a width of the stroke, a curvature of the stroke, a color of the stroke, a relative position or continuity of the stroke with respect to previous or later strokes, and a matching degree between the stroke and a moving trajectory of the tip of the writing tool.

For example, the intelligent device may set a reasonable stroke length range. If the length of the stroke is too short, e.g., the stroke is merely a point, the too short stroke may be an unwanted action of the user, and thus may not be used to form handwriting. In other words, a too short stroke may have a decreased confidence evaluation value.

According to another embodiment, the higher the continuity between the stroke and the previous or later strokes is, the higher the confidence evaluation value is, and vice versa. For example, when the user writes 'Today's weather is very good', 'go' within 'good' may have high continuity with previous or later strokes. Therefore, 'go' may have a relatively high confidence evaluation value. The intelligent device may obtain information for determining continuity from a user input, a server, or an external device, but embodiments are not limited thereto.

According to another embodiment, the higher the matching degree between the stroke and the moving trajectory of the tip of the writing tool is, the higher the confidence evaluation value is, and vice versa. For example, when the user writes 'Today's weather is very good', 'o' within 'good' may have a light color, but, because the moving trajectory of the tip of the writing tool matches with 'o', 'o' may have a relatively high confidence evaluation value.

According to some embodiments, the moving trajectory of the writing tool may be obtained by any one of the following methods, but embodiments are not limited to the following methods.

According to some embodiments, to obtain the moving trajectory of the tip of the writing tool, the intelligent device may trace the tip of a registered writing tool according to the shape and position of the tip of the writing tool, during shooting of the handwriting of the user by the camera. When the user registers the writing tool, the shape of the tip of the writing tool may be registered and stored in the intelligent device. A method of tracing an object, such as, a writing tool, is obvious to one of ordinary skill in the art, and thus detailed descriptions thereof will be omitted. For matching between a stroke and a corresponding moving trajectory of the tip of a writing tool, any algorithm or model which is able to compare two moving trajectories may be used, e.g., including, but is not limited to, a dynamic time wrapping (DTW) algorithm, a hidden Markov model (HMM), and an artificial neural network.

According to some embodiments, before the confidence evaluation value of the stroke is determined according to the matching degree between the stroke and the moving trajectory of the tip of the writing tool, an enhancement process may be performed on the stroke according to the matching degree between the stroke and the moving trajectory of the tip of the writing tool. For example, if the stroke is on the moving trajectory of the tip of the writing tool, the intelligent device may capture the stroke even if the stroke has a confidence evaluation value that is lower than a threshold. In other words, the intelligent device may capture the stroke with a lower confidence evaluation value than the threshold by comparing the stroke with the moving trajectory of the tip of the writing tool even if the stroke has a lower confidence evaluation value than the threshold.

In a second method, changed handwritings of all image frames earlier than a current image frame may be combined to obtain an anterior combined handwriting of the current image frame. In other words, the intelligent device may combine the changed handwritings of all image frames earlier than the current image frame, except for the current image frame, to obtain the anterior combined handwriting of the current image frame.

The intelligent device may combine the changed handwriting of the current image frame with the anterior combined handwriting of the current image frame to obtain an anterior combined handwriting of a next image frame. The intelligent device may repeat the above-described method until the overall handwriting is obtained.

For example, the intelligent device may combine changed handwritings of all image frames earlier than the current image frame (i.e., image frames captured earlier than the current image frame) according to time sequence information of the changed handwriting of the current image frame and may select a result of the combination of handwritings as the anterior combined handwriting of the current image frame. Thereafter, the intelligent device may combine the changed handwriting of the current image frame with the anterior combined handwriting of the current image frame to obtain the anterior combined handwriting of the next image frame. For example, the intelligent device may connect a start point of the changed handwriting of the current image frame to an end point of the anterior combined handwriting of the current image frame to obtain the anterior combined handwriting of the next image frame.

For example, when the user writes 'very' on a white paper by using a writing tool with black ink, four image frames may be captured. Changed handwritings of the four image frames may be 'v', 'e', 'r', and 'y', respectively. A first image frame is combined with the changed handwriting of a second image frame to obtain an anterior combined handwriting 've' of a third image frame. The changed handwriting of the third image frame is combined with the anterior combined handwriting 've' (a result of the combination between the first and second image frames) to obtain an anterior combined handwriting 'ver' of a fourth image frame. The anterior combined handwriting and the changed handwriting of the fourth image frame may be combined with each other to obtain an anterior combined handwriting 'very' of a next image frame (e.g., a fifth image frame captured after the fourth image frame is captured). This method may be repeated until the overall handwriting is obtained.

This embodiment illustrates a method of combining changed handwriting, based on each character. However, according to another embodiment, the interval between two image frames may be short and changed handwriting of each image frame may be merely a part of a stroke. FIG. 1N shows four image frames when a character 'd' is written. Changed handwriting of each image frame is not a single character but a part of the single character, and thus may be relatively small compared with the above-described illustration. As shown in a third image frame, changed handwritings of first through third image frames may be combined to obtain an anterior combined handwriting of a fourth image frame. The anterior combined handwriting and the changed handwriting of the fourth image frame may be combined with each other to obtain an anterior combined handwriting 'd' of a next image frame.

A second method may include the above-described first method of obtaining changed handwriting and the above-described first method of obtaining time sequence information. A method of obtaining changed handwriting and a method of obtaining time sequence information have been described above, and thus those are not repeated herein.

In a third method, combination is performed directly based on local handwriting of each image frame. The intelligent device may combine handwriting of each image frame with an overlapping part between the handwriting of each image frame and an anterior combined handwriting thereof to obtain an anterior combined handwriting of a next image frame.

For example, when the user writes 'good' on a white paper by using a writing tool with black ink, four consecutive image frames may be captured. Local handwritings of the four consecutive image frames may be 'g', 'go', 'goo', and 'good', respectively. An overlapping part 'g' between the respective local handwritings of the first and second image frames may be combined with changed handwriting of the second image frame to thereby obtain combined handwriting 'go'. An overlapping part 'go' between the combined handwriting between the first and second image frames and the local handwriting of the third image frame may be combined with changed handwriting of the third image frame to thereby obtain combined handwriting 'goo'. An overlapping part 'goo' between the combined handwriting between the first, second, and third image frames and the local handwriting of the fourth image frame may be combined with changed handwriting of the fourth image frame to thereby obtain combined handwriting 'good'. This embodiment illustrates a method of combining local handwritings. However, according to some embodiments, an interval between two image frames may not be long, and many portions of the local handwriting may be overlapped with each other.

Figure 1T:
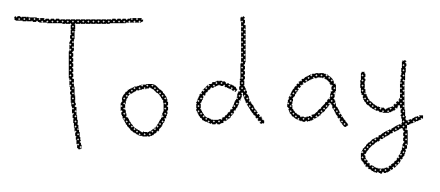
Figure 1V:
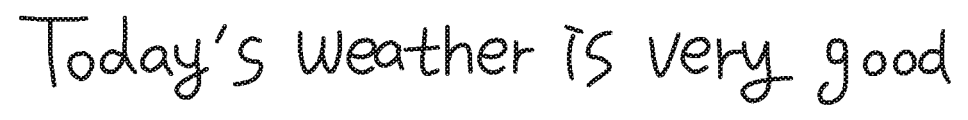
Figure 1W:
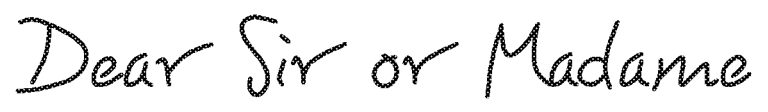

According to some embodiments, the intelligent device may obtain overall handwriting by combining a character shown in FIG. 1T or a word shown in FIG. 1U. As shown in FIGS. 1V and 1W, overall handwriting obtained by combination may also be a sentence. The overall handwriting obtained by combination may also include a plurality of lines of characters and include layout information.

In operation S106, the intelligent device may recognize content handwritten by the user, according to overall handwriting.

In other words, the intelligent device may recognize content and generate handwriting information, by recognizing obtained overall handwriting.

For example, the intelligent device may perform content recognition by using an online handwriting recognizing method. The online handwriting recognizing method implements content recognition according to time sequence information, writing sequence, and/or pen-up and pen-down information of handwriting, but embodiments are not limited thereto.

According to some embodiments, the intelligent device may perform content recognition by using an offline handwriting recognizing method. The offline handwriting recognizing method does not know the writing sequence, but may perform content recognition according to only the information displayed on an image, and embodiments are not limited thereto.

According to some embodiments, when overall handwriting is recognized, pre-processing may be performed on a captured image. If the image is distorted or slants, a calibration may be performed on the image. If the quality of the image is poor, an enhancement process may be performed on the image. Then, the intelligent device may perform a layout analysis on the captured image and obtain layout information via processing including binarization, block-division, line-division, character-division, etc. The layout information may include coordinates of paragraphs, lines of a text area, a sequence of paragraphs, lines and coordinates of each character, and coordinates of a graph area, a text which surrounds the graph area, a background. Based on the obtained layout information, the intelligent device may perform character recognition to obtain character information which includes a font, a size and a corresponding code of each character.

According to some embodiments, the intelligent device may perform content recognition on the obtained overall handwriting by using a handwriting recognizing engine, and may select a result of the content recognition as handwriting of the user. The handwriting recognition by a handwriting recognizing engine is obvious to one of ordinary skill in the art, and thus detailed descriptions thereof will be omitted.

In Embodiment 1, handwriting is recognized by directly retrieving the handwriting, and thus difficulties due to pen up/pen down determination according to a conventional method of tracing the tip of a writing tool may be addressed, and the accuracy of the handwriting recognition may increase. In addition, in Embodiment 1, the method of obtaining handwriting by shooting a local writing area may ensure the clarity of shot strokes. After the shot strokes are combined, a clear global stroke may be obtained. Thus, a conventional problem that the strokes obtained via global shooting are unclear may be addressed. In addition, only a single camera already included in the intelligent device is utilized to record handwriting, which requires no additional hardware and thus reduces costs.

Embodiment 2

Figure 2A:
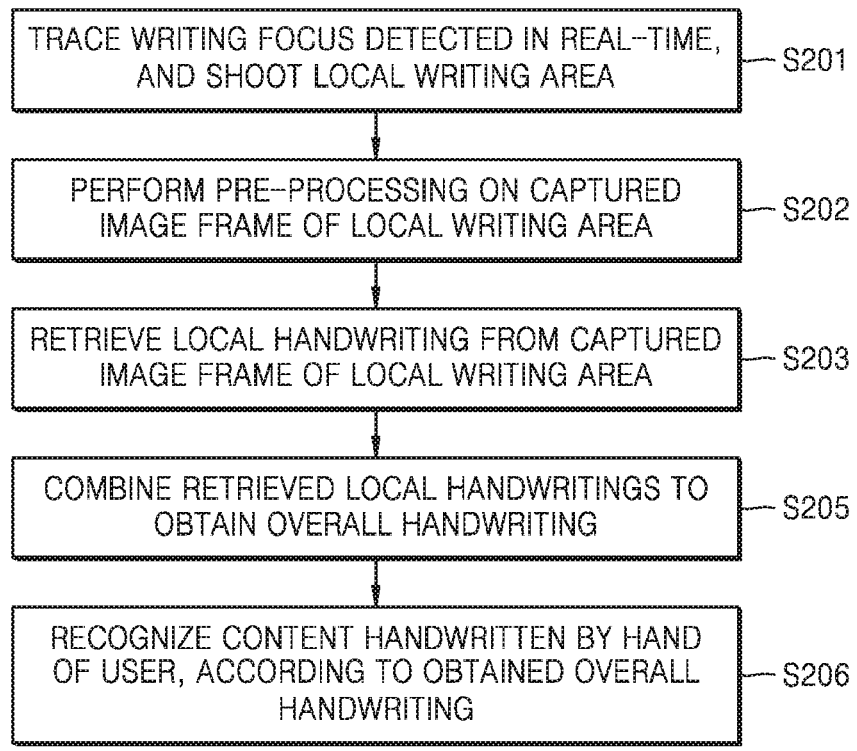
FIG. 2A is a flowchart of a method of recognizing handwriting, according to some embodiments.

According to some embodiments, there is provided a method in which an intelligent device recognizes handwriting. FIG. 2A illustrates a method of recognizing handwriting.

In operation S201, the intelligent device may trace a writing focus detected in real-time, and may shoot a local writing area. This corresponds to the above-description, and thus a detailed description thereof will be omitted.

In operation S202, the intelligent device may perform pre-processing on a captured image frame of the local writing area.

According to some embodiments, the captured image frame of the local writing area may include not only handwriting of a user displayed on a writing surface but also a writing tool and a hand of the user. In this case, pre-processing may need to be performed, removing the user's hand and the writing tool from the writing surface in the captured image.

For example, after an image frame of the local writing area is captured, the intelligent device may determine the shape and position of the tip of the writing tool in the captured image frame according to the shape of the tip of the writing tool registered in advance, and remove the writing tool from the captured image frame. The intelligent device may remove the user's hand from the captured image frame according to a user's gripping posture and a shape of the hand when gripping the writing tool.

Figure 2B:
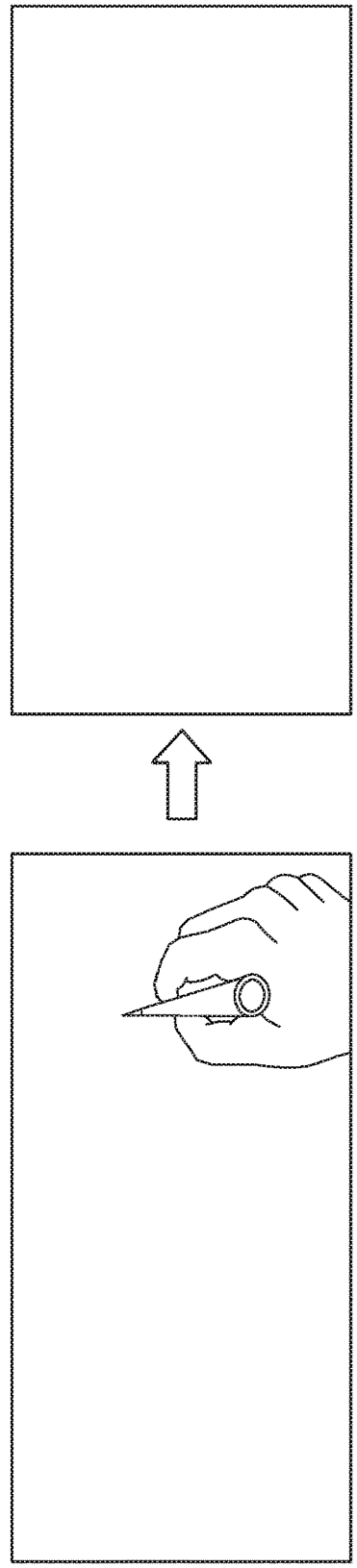
FIGS. 2B and 2C are schematic diagrams illustrating image pre-processing according to some embodiments.
Figure 2C:
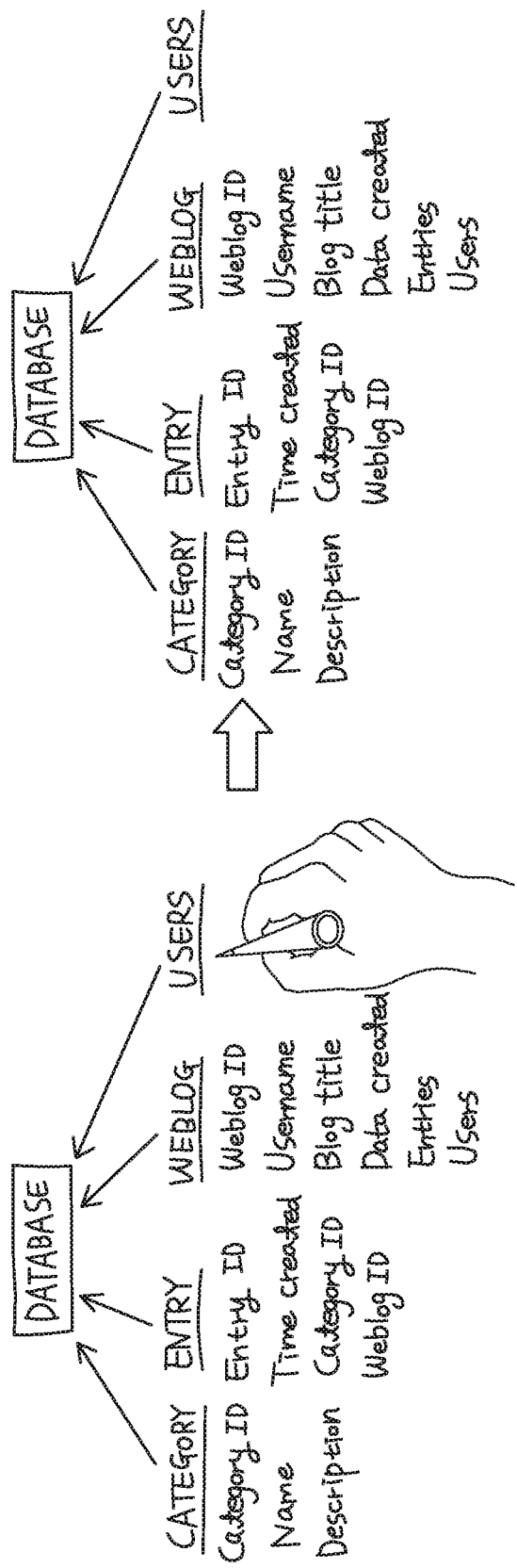

FIGS. 2B and 2C illustrate a method of performing pre-processing on content. As shown in FIG. 2B, during a writing procedure of the user, the intelligent device captures an image frame corresponding to the left image of FIG. 2B, including the user's hand and the writing tool. Then, the intelligent device performs pre-processing on the left image of FIG. 2B to separate the user's hand and the writing tool from the left image, and obtains the right image in FIG. 2B. The process in FIG. 2C is similar to that of FIG. 2B.

To facilitate a subsequent retrieval of handwriting, the pre-processing may further include an operation of normalizing each image frame. The normalization operation may include the operations of: adjusting the size of each image frame to make each image frame have the same geometric size; performing slant and/or rotation calibration on each image frame to make each image frame have the same direction; and performing brightness and/or contrast correction on each image frame.

Via the above-described pre-processing, the image frame may be adjusted to have a predetermined format so as to be suitable for the handwriting recognition.

In operation S203, the intelligent device may retrieve local handwriting from the captured image frame of the local writing area. This corresponds to the above-description, and thus a detailed description thereof will be omitted.

In operation S205, the intelligent device may combine retrieved local handwritings to obtain overall handwriting. This corresponds to the above-description, and thus a detailed description thereof will be omitted.

In operation S206, the intelligent device may recognize content handwritten by the hand of the user, according to the obtained overall handwriting. This corresponds to the above-description, and thus a detailed description thereof will be omitted.

According to some embodiments, the image of the local writing area in operation S202 may be an image after pre-processing is performed. Since the colors in the image frame after the pre-processing mainly include the color of the handwriting of the user and the color of the writing surface, the accuracy of handwriting recognition using a pre-processed image frame is higher than that when the image frame is not pre-processed.

Embodiment 3

Figure 3A:
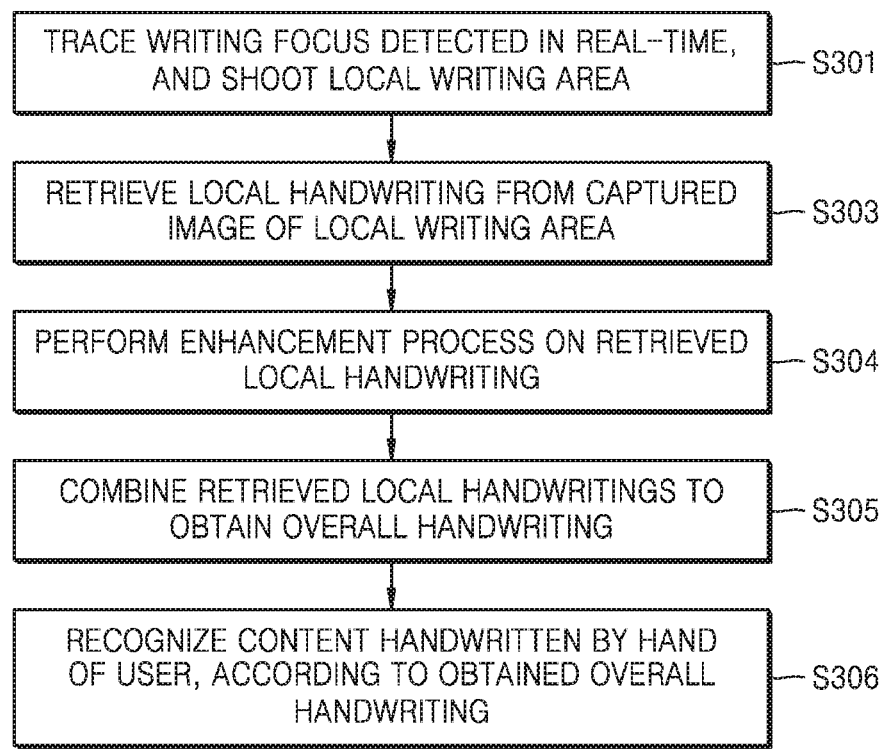
FIG. 3A is a flowchart of a method of recognizing handwriting, according to some embodiments of the present disclosure.

According to some embodiments, there is provided a method in which an intelligent device recognizes handwriting. FIG. 3A illustrates a method of recognizing handwriting.

In operation S301, the intelligent device may trace a writing focus detected in real-time, and may shoot a local writing area. This corresponds to the above-description, and thus a detailed description thereof will be omitted.

In operation S302, the intelligent device may perform pre-processing on a captured image of the local writing area. This corresponds to the above-description, and thus a detailed description thereof will be omitted.

In operation S303, the intelligent device may retrieve local handwriting from the captured image of the local writing area. This corresponds to the above-description, and thus a detailed description thereof will be omitted.

In operation S304, the intelligent device may perform an enhancement process on the retrieved local handwriting.

In order to increase the accuracy of handwriting recognition, an enhancement process may be performed on the local handwriting in at least one of the following situations: light brightness or definition during the shooting process does not meet a pre-defined requirement; a thickness of the handwriting in a captured image frame is smaller than a pre-defined value; and a difference between the color of the handwriting in the captured image frame (i.e., the color of the pixels of the retrieved local handwriting) and the color of a background (i.e., the color of the writing surface) is smaller than a predefined value.

According to some embodiments, the enhancement process may include, but is not limited to, the operations of: adjusting an aperture or focus of the camera according to the light brightness or definition during the shooting process; adjusting the magnification of the camera according to the thickness of the handwriting in the captured image; performing a slant and/or rotation calibration on the captured image; performing a brightness and/or contrast correction on each image frame; and correcting the retrieved local handwriting.

According to some embodiments, the correcting of the retrieved local handwriting may include performing smoothing processing on the retrieved local handwriting. When noise points generated during a binarization process are detected, the intelligent device may filter the noise points so as to perform a slide operation on the retrieved local handwriting and obtain handwriting data available for recognition.

Figure 3B:
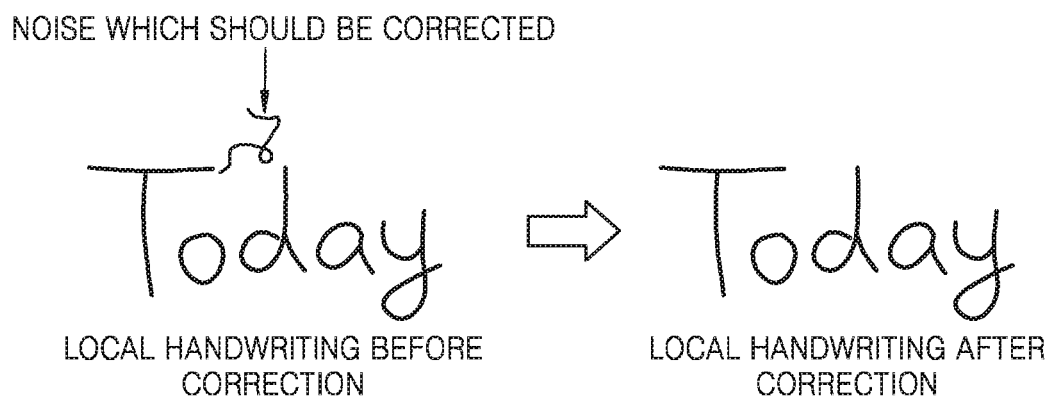
FIGS. 3B and 3C are schematic diagrams illustrating an enhancement processor for local handwriting.
Figure 3C:
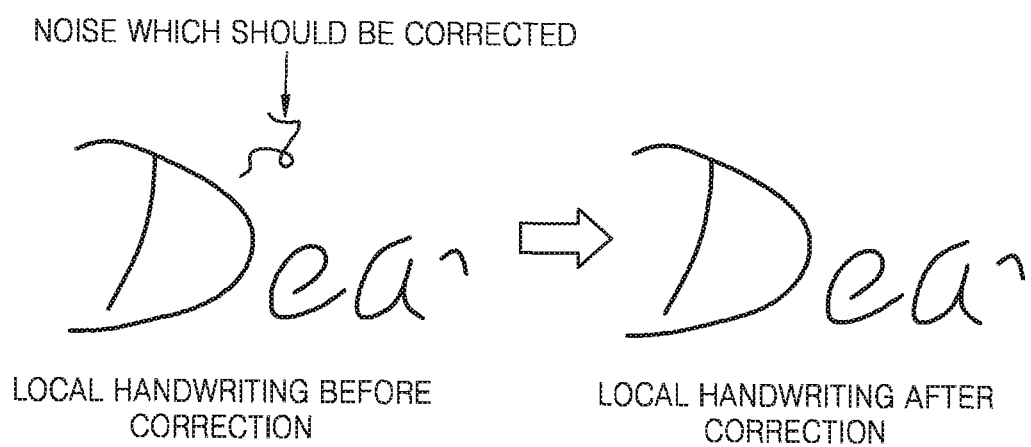

FIGS. 3B and 3C illustrate a method of correcting handwritten content. As shown in the left figure of FIG. 3B, there are some noise points in the captured image of the local writing area. The intelligent device may filter the noise points after detecting the noise points, and obtain the handwriting data available for recognition as shown in the right figure in FIG. 3B. The process in FIG. 3C is similar to that of FIG. 3B.

In addition, the enhancement process may further include an operation of processing the local handwriting according to confidence evaluation values of strokes in the local handwriting. For example, if the local handwriting includes a stroke with a confidence evaluation value that is lower than a threshold, the stroke whose confidence evaluation value is lower than the threshold may be removed, and only the strokes with confidence evaluation values that are higher than the threshold may remain.

In operation S305, the intelligent device may combine retrieved local handwritings to obtain overall handwriting. This corresponds to the above-description, and thus a detailed description thereof will be omitted.

In operation S306, the intelligent device may recognize content handwritten by the hand of the user, according to the obtained overall handwriting. This corresponds to the above-description, and thus a detailed description thereof will be omitted.

Embodiment 4

Before recognizing the handwriting, the intelligent device may register writing tools and select an appropriate writing tool for the recognition of the handwriting. The registration and selection of a writing tool will now be described.

According to some embodiments, the writing tool may include an object capable of writing on a writing surface and generating handwriting (e.g., a pencil, a fountain pen, a ball pen, or a chalk). The writing surface may be any surface on which the writing tool can write, (e.g., a paper or a blackboard). Handwriting represents lines or a group of lines representing a certain length, a certain area, and a certain color created by a writing tool when writing is performed on the writing surface. The lines may be straight lines or curved lines. The handwriting between adjacent pen-up point and pen-down point may be referred to as a stroke.

According to some embodiments, the intelligent device may register the writing tool before recognizing information handwritten by a hand of the user. The registration of the writing tool may include registration of the handwriting color of the writing tool, and/or registration of the tip shape of the writing tool.

When registering the writing tool, the user may input a registration instruction to the intelligent device, such as a wearable device (e.g., intelligent glasses) or a mobile device with a camera (e.g., a cellular phone or a tablet computer). The registration instruction may be generated by using at least one of: a voice, a button, a gesture, a human-computer interaction interface (e.g., augmented reality), and an external controller (e.g., a device with a remote control function, such as a cellular phone, associated with the intelligent device).

If the registration instruction of the writing tool is triggered by a voice, when the user emits a voice instruction "Start handwriting recognition.", the intelligent device receives the voice instruction, starts voice recognition according to the voice instruction in order to determine whether the voice instruction is a registration instruction, and starts registering the writing tool. The intelligent device may store a correspondence between the voice instruction and the registration instruction. For example, the voice instruction may correspond to the registration instruction via a correspondence table. The voice instruction may include "start to register", "registration starts", "register a writing tool", and instructions in Korean, English, Chinese, or other languages. Examples of the voice instruction are not limited thereto. The user and the intelligent device may use other methods to associate the voice instruction with the handwriting registration instruction.

The registration trigger instruction may be triggered via a button. The button may be, but is not limited to, a hardware button on the intelligent device, e.g., a home button, a sound adjustment button, a power button, a program adjustment button, a newly-added button, or a button as shown in FIG. 1B, or a software button implemented by software, or may be a user interface (UI) of the intelligent device. If the user presses the button according to a predefined manner, the intelligent device may determine that the registration instruction has been received. The predefined manner may include, but is not limited to, short pressing, long pressing, short pressing for a predefined number of times, and alternate short and long presses.

If the registration trigger instruction is triggered by a gesture, the gesture may be implemented by one hand or by two hands. The gesture may include hand waving, drawing of a circle, drawing of a rectangle, drawing of a triangle, drawing of a star, etc. The intelligent device may detect and recognize the gesture using an existing gesture detecting device. The intelligent device may determine that the registration instruction has been received, according to the recognized gesture.

If the registration trigger instruction is received from the external controller (e.g., from a cellular phone connected with the intelligent device), the intelligent device starts to register the writing tool. The connection between the intelligent device and the external controller may be a physical connection or may be a wireless connection via at least one of a macro network, a WiFi network, and a LAN, and embodiments are not limited thereto. An instruction of the external controller may be an infrared instruction, or a message transmitted by the cellular phone, and embodiments are not limited thereto.

According to some embodiments, if the registration of the writing tool includes registration of the handwriting color of the writing tool, after receiving the registration instruction, the intelligent device may shoot the handwriting generated on the writing surface by the writing tool by using a camera (mounted on the intelligent device or a mobile device), and may register the color of the retrieved handwriting as handwriting color information of the writing tool.

Figure 4A:
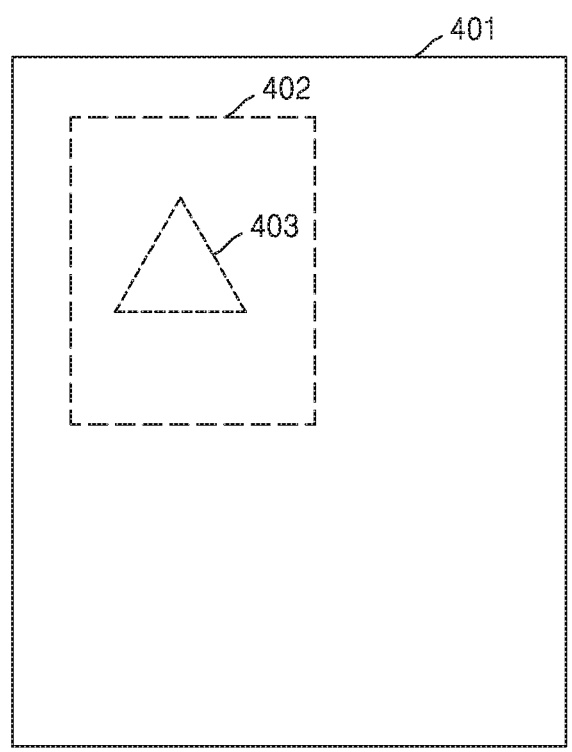
FIG. 4A is a schematic diagram illustrating registration of a writing tool, according to some embodiments.

FIG. 4A illustrates a writing surface 401, a virtual writing frame 402, and a handwriting 403 of the user. The virtual writing frame 402 may include a frame projected on the writing surface by the intelligent device. The intelligent device may project or display a writing frame (writing area) on the writing surface within the view of the user in order to guide the user to write within the writing frame. When registering the writing tool, the camera may capture a registering process of the user and perform a normalization process on all image frames. Then, the handwriting color information of the writing tool may be retrieved from normalized image frames.

According to some embodiments, the handwriting color of the writing tool may be obtained via any one of the following three methods, but embodiments are not limited to the following methods.

In a first method, the intelligent device separates the user's hand and the writing tool from the writing surface in each normalized image frame, compare the writing surfaces of two adjacent image frames, retrieve distinguishing pixels, and select the color of the distinguishing pixels as the handwriting color of the writing tool.

For example, when the user writes a character 'go' by using the registered writing tool, two adjacent image frames may include 'g' and 'go', respectively. A difference between the two image frames is the area where 'o' is located. If the pixels of 'o' are red, the intelligent device may determine that the handwriting color of the writing tool is red.

In a second method, the intelligent device may compare an image frame before the user registers the writing tool with an image frame after the user completes writing, retrieve distinguishing pixels of the two image frames, and select the color of the distinguishing pixels as the handwriting color of the writing tool. The image frame after the user completes the writing may be an image captured after the user's hand and the writing tool move out of the writing frame. Because the image frame after the user completes the writing does not contain interference factors such as the hand and the writing tool, it is easy to accurately recognize the color of the writing tool. A determination on whether the user's hand and the writing tool have moved out of the writing frame may be implemented via a moving object detecting method.

For example, if the writing surface is white and the user has not yet registered the writing tool, the image frame may contain only white pixels. If the user writes in red during the registration, the image frame after the user completes the writing may contain both white pixels and red pixels. Because the red pixels are newly added pixels (e.g., the distinguishing pixels), the intelligent device may determine that the handwriting color of the registered writing tool is red.

In a third method, during the registration of the writing tool, a virtual pattern for facilitating the registration may be set in the intelligent device in advance. The user may draw the virtual pattern by using the writing tool to be registered. The intelligent device may shoot the virtual pattern drawn by the user, retrieve the color of pixels corresponding to the virtual pattern, and select the retrieved color as the handwriting color of the writing tool.

According to some embodiments, the virtual pattern may be a straight line, a curved line, a circle, a triangle, a square, a rectangle, a diamond, a pound sign, a star sign, a colon, double quotes, or the like.

For example, the intelligent device may display on the screen that the virtual pattern is a triangle, or may directly project the triangle on the writing surface. The user may draw a triangle on the writing surface by using the writing tool to be registered. The intelligent device may perform shooting to obtain an image containing the triangle. The intelligent device may retrieve a color of the triangle and select the retrieved color as the color of the writing tool.

According to some embodiments, the intelligent device may project a triangle on the writing surface and instruct the user to draw a triangle at the projected position. When the user draws a triangle at the projected position by using the registered writing tool, the intelligent device may retrieve the triangle from a predefined position (i.e., the projected position) of the image, and select the color of the triangle as the color of the writing tool.

According to some embodiments, during the registration of the writing tool, the intelligent device may perform some operations to guide the user to correctly draw the virtual pattern by using the writing tool. For example, the intelligent device may display a description text to prompt the user to write according to displayed content or projected content, display an arrow indicating a drawing direction of each stroke, display an animation illustrating how to draw the virtual pattern, and prompt the user when and where to draw a pattern and what pattern is to be drawn via sound.

In addition, the intelligent device may directly receive handwriting color information inputted by the user and associate the received handwriting color information with the writing tool. The inputted handwriting color information may be, but is not limited to, an RGB value of the handwriting color, or the name of a color, such as red, yellow, blue, or black.

For example, the user may know that the handwriting color of the writing tool is red. The user may directly input the color red to the intelligent device. The intelligent device may associate the color red input by the user with the writing tool and may select the handwriting color of the writing tool as a red color. The user may also input an RGB value (255, 0, 0) of the color red to the intelligent device. The intelligent device may associate the RGB value input by the user with the writing tool and may select the handwriting color of the writing tool as a red color.

According to some embodiments, the registration of the writing tool may include the registration of the tip shape of the writing tool. The intelligent device may determine a position of the user's hand and a position of the writing tool by detecting a maximum moving object in a video captured by the camera, and then retrieve the shape of the writing tool. The maximum moving object may include an object that moved the most.

According to some embodiments, the intelligent device may perform endpoint detection on the tip of the writing tool. The intelligent device may select an end point which is sharpest or has the largest curvature, as the position of the tip of the writing tool. A model for the shape of the tip of the writing tool may be set to facilitate subsequent tracing of the tip of the writing tool. The detection of the moving object in the video is widely studied and applied in relevant fields, and the model for the tip shape may be expressed by a model frequently used in the field of model recognition, and thus detailed descriptions thereof will be omitted herein.

Figure 4B:
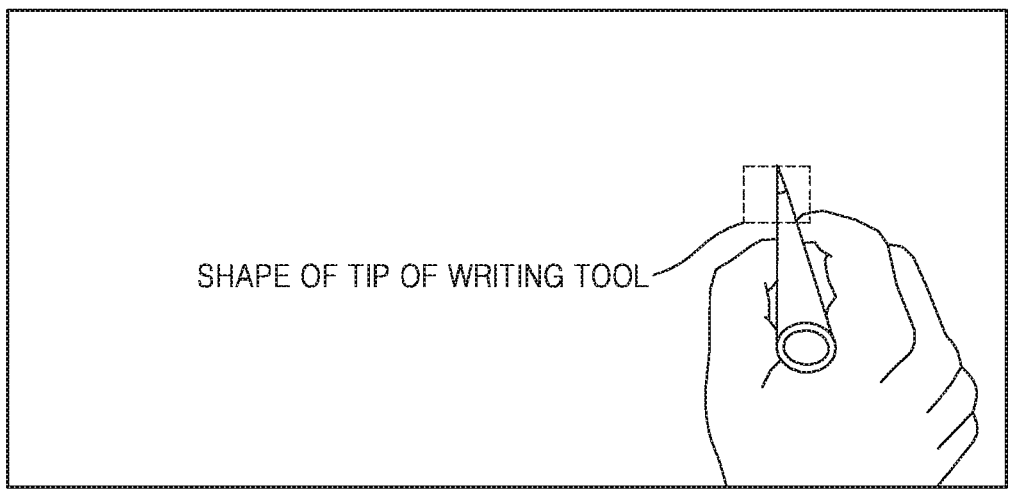
FIGS. 4B and 4C are schematic diagrams illustrating registration of the shape of the tip of the writing tool, according to some embodiments.
Figure 4C:
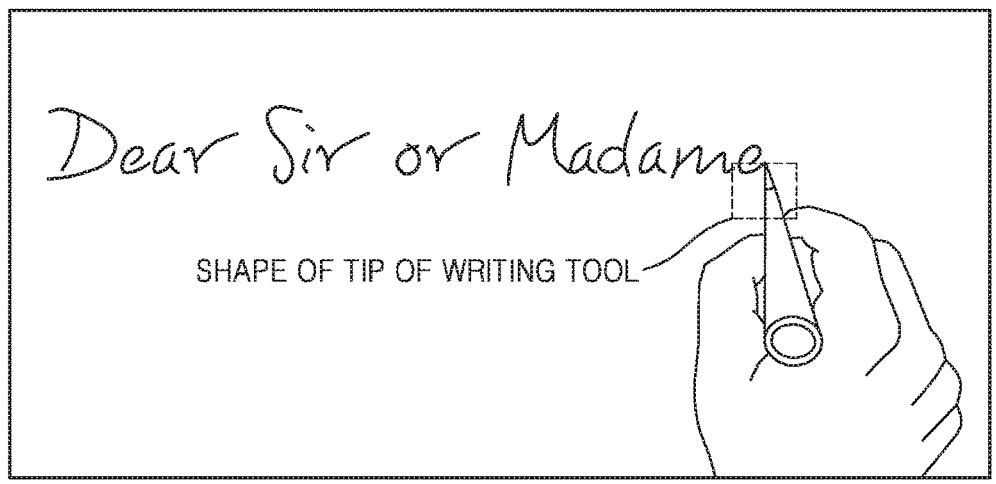

For example, when registering the tip shape of the writing tool as shown in FIGS. 4B and 4C, the intelligent device may capture a video of a writing procedure in which the user writes by using the writing tool. The intelligent device may determine that maximum moving objects in the video are the writing tool and the hand of the user. Because a sharpest tip of the writing tool may be, for example, the tip of a pen, the intelligent device may perform endpoint detection on the tip of the writing tool and may select a sharpest portion of the writing tool (i.e., a portion shown in a dashed line in FIG. 4B) as the tip of the writing tool.

In addition, the intelligent device may obtain the shape of the tip of the writing tool to be registered, according to an input of the user. Two methods of obtaining the shape of the tip according to the user's input will now be described. Of course, embodiments are not limited to the two methods.

In a first method, because different kinds of writing tools generally have different tip shapes and the same kind of writing tools generally have a uniform tip shape, when registering the writing tool, the user may input the name of the writing tool to the intelligent device. The intelligent device may determine a tip shape of the writing tool according to the input name. For example, assuming that a writing tool A registered by the user is a pencil, the user inputs "pencil" as the name of the writing tool to the intelligent device. The intelligent device may determine the tip shape of the writing tool A according to correspondences between writing tools and tip shapes. The correspondence between the writing tools and the tip shapes may be stored in the intelligent device, or stored in another device connected with the intelligent device by wires or wirelessly, and embodiments are not limited thereto.

In a second method, the intelligent device may store pictures of tip shapes of various kinds of writing tools. When the user registers the tip shape of the writing tool, the intelligent device may display the pictures for a user's selection and store a tip shape selected by the user as the tip shape of the writing tool to be registered.

For example, the intelligent device may store pictures for the tip shape of a pencil, the tip shape of a fountain pen, the tip shape of a ball pen, the tip shape of a signature pen, etc. Examples of the tip shapes of writing tools are not limited thereto. Assuming that the user desires to register the tip shape of the writing tool A, such as a pencil, after the registration of the tip shape is triggered, the intelligent device may display pictures of various tip shapes, and receive an instruction of the user selecting a picture corresponding to the tip shape of a pencil. The intelligent device may store the tip shape of the pencil as the tip shape of the writing tool A.

According to some embodiments, the intelligent device may compare the handwriting color of the registered writing tool with the background color of the writing surface. If a color difference between the handwriting color and the background color is larger than a predefined threshold, the intelligent device may determine that the two colors are different. Otherwise, the intelligent device may determine that the two colors are not different. When it is determined that the two colors are not different, the intelligent device may prompt the user to change the writing tool or the writing surface. The background color of the writing surface may be obtained via shooting of the writing surface before the user starts writing.

For example, if the handwriting color of the writing tool is black and the background color of the writing surface is white, the intelligent device may determine that the two colors are different. Thus, the user may use the black writing tool to write on the white writing surface.

On the other hand, if the handwriting color of the writing tool is yellow and the background color of the writing surface is also yellow, the intelligent device may determine that if the handwriting color of the writing tool and the background color of the writing surface are not different. The intelligent device may prompt the user to change the writing tool or the writing surface. The user may be prompted to change the writing tool or the writing surface via popping out a dialogue box which displays "Please, change the currently-used writing tool or writing surface.", or via an alarm sound indicating that the currently-used writing tool or writing surface is inappropriate, or via a voice "Please, change the currently-used writing tool or writing surface".

According to some embodiments, the intelligent device may prompt the user to select, from the registered writing tools, a writing tool whose handwriting color information is different from the background color of the writing surface, and the user may write using the selected writing tool on the writing surface so that the intelligent device may recognize the handwriting.

Embodiment 5

During handwriting recognition, some special situations to be considered may occur. Special situations that may occur when the intelligent device recognizes handwriting will now be described.

1. Line Break

During a writing procedure, the user may perform handwriting on a plurality of lines. An image frame before writing on a new line starts and an image frame after writing on the new line starts may have no handwriting overlap.

For example, the user may write 'Today's weather is very good' on a first line and 'I walk to my office' on a second line. A last image frame of the first line may show 'good', whereas a first image frame of the second line may show only 'I'. In this case, it may be improper to combine the last image frame of the first line with the first image frame of the second line.

With respect to the above case, in order to improve the completeness and accuracy of handwriting recognition by the intelligent device, when combining the local handwritings of image frames with each other, the intelligent device may detect whether there is line break information. If a line was broken, the intelligent device may perform the combination of the local handwritings according to the line break information.

According to some embodiments, the intelligent device may determine whether there is a handwriting overlap between respective local handwritings of adjacent image frames. If it is determined that there is no handwriting overlaps between the respective local handwritings of the adjacent image frames, the intelligent device may determine that the line break information was detected. As in the previous example, the last image frame of the first line may show only 'good', and the first image frame of the second line may show only 'I'. Because the intelligent device may determine that there is no handwriting overlaps between the last image frame of the first line and the first image frame of the second line, the intelligent device may determine that line break information was detected between the last image frame of the first line and the first image frame of the second line. In other words, when it is determined that there is no handwriting overlaps between the adjacent image frames, the intelligent device may determine that a line was broken.

According to some embodiments, the intelligent device may determine whether there is a line break identifier in the local handwriting of each image frame. If the line break identifier is detected, the intelligent device may determine that the line break information was detected. The line break identifier may be defined in advance.

According to some embodiments, the line break identifier may be implemented via symbols including at least one of a background color, an underline, a dotted line, a wavy line, a rectangle frame, an emphasis sign, a bracket, a triangle sign, a star, an asterisk, and a pound sign, and embodiments are not limited thereto.

According to some embodiments, the line break information may also be identified by audio or video data indicating a line break. When the audio data indicating a line break is received, the intelligent device may determine that the line break information was detected. For example, if the user emits a voice instruction "line break", the intelligent device starts voice recognition in order to determine whether the voice instruction is a line break instruction. The intelligent device may store a relationship between the voice instruction and the line break instruction in the form of, e.g., a correspondence table. The line break instruction may include a voice instruction such as "line break", "new line", "next line", or other instructions in Korean, English, Chinese, or other languages. Examples of the voice instruction are not limited thereto. The user and the intelligent device may use other methods to associate the voice instruction with the line break instruction.

After the line break information is determined, the intelligent device may perform a local handwriting combination according to the line break information. According to some embodiments, the intelligent device may determine a combing start point or combining end point of the local handwritings according to the line break information and then perform the local handwriting combination.

When the line break information is detected, the intelligent device may select anterior combined handwriting of a current image frame as handwriting information of a first line and may select the current image frame as a first image of a second line. In other words, the intelligent device may select the local handwriting of the current image frame as the combining start point of the combined handwriting of the second line.

To obtain the combined handwriting information of the second line, the intelligent device may combine the local handwriting of the current image frame with the local handwritings of all image frames before the line break information is detected. The intelligent device may combine respective combined handwritings of lines with each other according to a time sequence, in order to obtain overall handwriting including layout information (e.g. line break information) inputted by the user.

For example, the user may write 'Today's weather is very good' on an exercise book, then write a triangle sign as a line break identifier, and then write 'I walk to my office'. The intelligent device may select the last changed handwriting 'good' before the triangle sign as the combining end point and obtain handwriting before a line break. The intelligent device may select a first changed handwriting 'I' after the triangle sign as the combining start point and combine handwritings after a line break with each other.

2. Pause

During a writing procedure, the user may temporarily pause handwriting. For example, when taking notes in class, the user may look at the blackboard and then continue to take the notes. Since no new handwriting is generated during the pause period, the intelligent device may temporarily stop retrieving local handwriting after a pause signal is detected, and may monitor a global area.

According to some embodiments, the global area is the entire writing area, and thus may include the local writing area. In other words, the global area may include the writing surface, the entire background, or an area that is equal to or wider than the local writing area.

The intelligent device may stop retrieving local handwriting when there is no new handwriting, thereby reducing redundancy data, increasing the efficiency for recognizing handwriting, reducing load of a processor, and saving computing resources.

The intelligent device may determine that the pause signal was detected, in at least one of the following situations. Obviously, embodiments are not limited to the following situations.

The intelligent device may retrieve new handwriting from a captured image frame. For example, the user may write 'Today's weather is very good' on a white paper and may no longer write new content (handwriting). The intelligent device may continuously capture image frames all of which are "good". When no new handwriting is retrieved, the intelligent device may determine that the user has temporarily stopped writing.

During the writing procedure of the user, the visual focus of the user may always fall within the writing surface. When the user's visual focus leaves the writing surface and watches other information (e.g., when the user looks at the blackboard or a computer screen), the user generally pauses the writing. Therefore, when it is detected that the user's visual focus leaves the writing surface, the intelligent device may determine that the pause signal was detected.

According to some embodiments, when the intelligent device is unable to detect the location of the tip of the writing tool, the intelligent device may determine that the pause signal was detected. Because the intelligent device is used to recognize the handwriting of the writing tool, if the location of the tip of the writing tool is not detected from images captured by the intelligent device for a period of time (e.g., 5 seconds), the intelligent device may determine that the user paused writing during this period of time.

According to some embodiments, the intelligent device may detect a pause identifier. The pause identifier may be implemented via symbols including at least one of a background color, an underline, a dotted line, a wavy line, a rectangle frame, an emphasis sign, a bracket, a triangle sign, a star, an asterisk, and a pound sign, and embodiments are not limited thereto.

According to some embodiments, the intelligent device may detect audio data indicating a pause. When the audio data is used to indicate pause, if the user emits a voice instruction "pause", the intelligent device starts voice recognition in order to determine whether the voice instruction is a pause instruction. The intelligent device may store a relationship between the voice instruction and the pause instruction in the form of, e.g., a correspondence table. The pause instruction may include a voice instruction such as "pause", "wait a moment", "rest a while", or other instructions in Korean, English, Chinese, or other languages. Examples of the voice instruction are not limited thereto. The user and the intelligent device may use other methods to associate the voice instruction with the pause instruction.

To facilitate complete retrieving of the handwriting of the user, when the pause signal is detected, the intelligent device may determine a last image frame before the pause signal is detected, and may store or cache the determined last image frame.

The intelligent device may obtain overall handwriting before the pause signal is detected, by combining the changed handwriting of the last image frame with the anterior combined handwriting of the last image frame, and may cache the obtained overall handwriting. The intelligent device may also cache an image frame of the writing surface obtained by shooting. According to some embodiments, the intelligent device may recognize the handwriting of the user according to the overall handwriting and may cache the changed handwriting of each image frame and time sequence information thereof.

For example, after the user writes 'Today's weather is very good' on the white paper, the intelligent device may detect the pause identifier. The intelligent device may cache anterior combined handwriting 'Today's weather is very good', the image frame of the writing surface obtained by shooting, and the changed handwriting and time sequence information of each image frame, which are used when a restore signal is received later.

3. Restore

After pausing, the retrieving of the local handwriting may be restored. Because the intelligent device monitors the global area and the shooting of the writing procedure of the global area is not stopped, after the pause signal is detected, the intelligent device may detect a restore signal in the global area. If the restore signal is detected, the intelligent device may restore the retrieving of the local handwriting.

The intelligent device may determine that the restore signal was received, in at least one of the following situations. Of course, embodiments are not limited to the following situations.

According to some embodiments, the intelligent device may determine whether the restore signal is received, according to whether a captured image frame of the global area matches with the cached image frame of the writing surface. When the writing is paused, the user may move the focus of the intelligent device out of the writing surface. Thus, an image captured by the intelligent device may not contain the writing surface. If the writing is restored, the user may move the focus of the intelligent device back into the writing surface. Thus, the image captured by the intelligent device may contain the writing surface again. Thus, the intelligent device may determine whether the restore signal was detected, by determining whether the captured image frame of the global area matches with the cached image frame of the writing surface.

According to some embodiments, when the visual focus of the user is back to the writing surface, the intelligent device may determine that the restore signal has been received. When the writing is paused, the visual focus of the user may move out of the writing surface. If the writing is restored, the visual focus of the user may move back to the writing surface. Therefore, the intelligent device may determine whether the restore signal was detected, by determining whether the user's visual focus is back to the writing surface. For example, if the user takes notes while listening to lesson, when the user looks at the blackboard, the writing is paused and the visual focus of the user may leave the notebook, which is the writing surface. After the user looks at the blackboard, when the user restores writing, the visual focus of the user is back to the notebook, which is the writing surface.

According to some embodiments, when the writing tool generates new handwriting on the writing surface, the intelligent device may determine that the restore signal was received. When the writing is paused, the user does not write on the writing surface any more. Therefore, no new handwriting is generated on the writing surface. If the writing is restored, the user writes on the writing surface by using the writing tool. In other words, new handwriting is generated. Therefore, the intelligent device may determine whether the restore signal was detected, by determining whether new handwriting is generated on the writing surface by the writing tool. For example, after the user writes 'Today's weather is very good', the writing is paused. If the user continues to write by writing 'I walk to my office', the intelligent device may determine that new handwriting was generated on the writing surface, and accordingly also determine that the restore signal was detected.

According to some embodiments, the intelligent device may detect a restore identifier. The restore identifier may be implemented via symbols including at least one of a background color, an underline, a dotted line, a wavy line, a rectangle frame, an emphasis sign, a bracket, a triangle sign, a star, an asterisk, and a pound sign, and embodiments are not limited thereto.

According to some embodiments, the intelligent device may detect audio data indicating a restoration. If the user emits a voice instruction "restore", the intelligent device starts voice recognition in order to determine whether the voice instruction is a restore instruction. The intelligent device may store a relationship between the voice instruction and the restore instruction in the form of, e.g., a correspondence table. The voice instruction indicating a restoration may include a voice instruction such as "restore", "start again", "continue to recognize", or other instructions in Korean, English, Chinese, or other languages. Examples of the voice instruction are not limited thereto. The user and the intelligent device may use other methods to associate the voice instruction with the restore instruction.

According to some embodiments, the intelligent device may retrieve local handwriting from an image frame captured after the restore signal is detected, and may continue the combination of handwritings according to cached information when the pause signal was detected last time.

For example, when the user writes 'very' on the white paper, four image frames may be captured. Respective changed handwritings of the four image frames may be 'v', 'e', 'r', and 'y', respectively. If the intelligent device detects a pause signal after the user writes 'v', 'e', and 'r', the intelligent device may cache local handwritings 'v', 'e', and 'r' and time sequence information of the local handwritings. Thereafter, the intelligent device may detect a restore signal and may detect changed handwriting 'y' made after the restore signal is detected. The intelligent device combines the changed handwriting 'y' of the image frame after the restoration with a cached image frame (the local handwritings 'v', 'e', and 'r' and the time sequence information of the local handwritings) to obtain the handwriting 'very'.

Of course, in the above embodiment, an image frame is captured in units of phrases or words. As shown in FIG. 1N, a plurality of image frames may be captured when a single character is written. In other words, the incremental handwriting of each image frame may be relatively short. FIG. 1N shows four image frames when a character 'd' is written. The changed handwriting of each image frame is relatively small. The intelligent device may cache the respective changed handwritings of the first, second, and third image frames and a time sequence relationship between the changed handwritings. Thereafter, when the intelligent device receives the restore signal, the intelligent device may continue to shoot and obtain the fourth image frame. The intelligent device may combine respective changed handwritings of the four image frames (the first, second, third, and fourth image frames) with each other to obtain 'd'.

4. Ending

According to some embodiments, when no new handwriting can be detected, the intelligent device may end the handwriting recognition. For example, the intelligent device may determine whether an ending signal was detected. If the ending signal is detected, the intelligent device may end the recognition and detection of the handwriting and store the obtained handwriting.

The intelligent device may determine that the ending signal was received, in at least one of the following situations. Of course, embodiments are not limited to the following situations.

According to some embodiments, when the visual focus of the user has left the writing surface for a predefined time period or more, the intelligent device may determine that the ending signal has been received. During a writing procedure of the user, the visual focus of the user may always fall within the writing surface. If the intelligent device detects that the visual focus of the user is not on the writing surface for a long time, the intelligent device may determine that the user ended the writing. If a predefined time period or more has lapsed after the pause signal is received, the intelligent device may determine that the user ended the writing.

According to some embodiments, when no new handwriting is detected within a predefined time period, the intelligent device may determine that the ending signal has been received. During the writing procedure, the user may generate new handwriting on the writing surface. If the intelligent device does not detect new handwriting for a long time, the intelligent device may determine that the user ended the writing.

According to some embodiments, the intelligent device may detect an ending identifier. The ending identifier may be implemented via symbols including at least one of a background color, an underline, a dotted line, a wavy line, a rectangle frame, an emphasis sign, a bracket, a triangle sign, a star, an asterisk, and a pound sign, and embodiments are not limited thereto.

According to some embodiments, the intelligent device may detect audio data indicating the ending. If the user emits a voice instruction "end", the intelligent device starts voice recognition in order to determine whether the voice instruction is an ending instruction. The intelligent device may store a relationship between the voice instruction and the ending instruction in the form of, e.g., a correspondence table. The ending instruction may include a voice instruction such as "end", "stop", or other instructions in Korean, English, Chinese, or other languages. Examples of the voice instruction are not limited thereto. The user and the intelligent device may use other methods to associate the voice instruction with the ending instruction.

According to some embodiments, when symbols are used to denote line break, pause, restoration, and ending, the symbols corresponding to the line break, the pause, the restoration, and the ending may be different.

Embodiment 6

Figure 5:
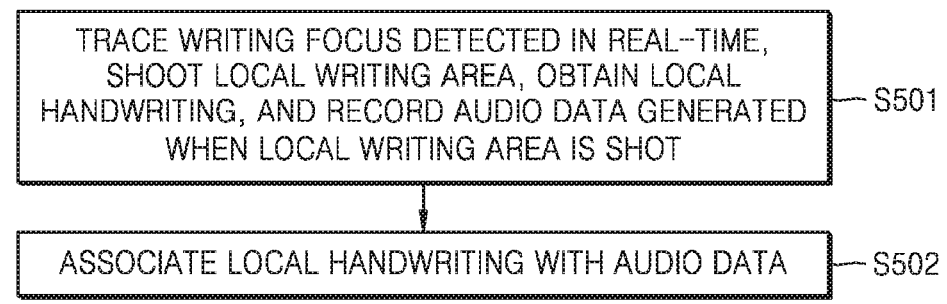
FIG. 5 is a flowchart of a method of recognizing handwriting, according to some embodiments.

According to some embodiments, there is provided a method in which an intelligent device recognizes handwriting. As shown in FIG. 5, the method of recognizing handwriting may include the following operations.

In operation S501, the intelligent device may trace a writing focus detected in real-time, shoot a local writing area, obtain local handwriting, and record audio data generated when the local writing area is shot.

According to some embodiments, a device that shoots the local writing area and a device that records the audio data may be the same device or different devices.

For example, user A may capture an image of the local writing area by using uses a smartphone, and receive the audio data by using the smartphone.

According to some embodiments, the user A has both a pair of intelligent glasses and a smartphone. The user may shoot the local writing area using the intelligent glasses and receive the audio data using the smart phone. Data related with the local writing area (e.g., an image frame or handwriting) and the audio data may be transmitted to the same device to be associated with each other. The same device may be the intelligent glasses which shoot the local writing area, or the smart phone which receives the audio data, or another device.

According to some embodiments, the user A and a plurality of other users may hold a meeting. The meeting room may be relatively large, and the definition may be low if audio data of the other users is collected using the device of user A. At this time, the intelligent device of user A may shoot the local writing area, and the intelligent device of at least one of the other users may record audio data. Then, at least one image frame or handwriting information obtained by shooting the local writing area, and the audio data may be transmitted to the same device and may be associated with each other. The same device that obtains the image frame or handwriting information obtained by shooting the local writing area and the audio data may be, but is not limited to, the intelligent glasses which shoot the local writing area, or the smartphone which records the audio data, or another device.

The method of shooting the local writing area and the method of obtaining local handwriting have been described above, and thus those are not repeated herein. A method of recording or receiving the audio data will now be described.

While shooting the local writing area, the intelligent device may record audio data received while the local writing area is being shot, by using an internal or external associated sound collecting apparatus according to a received sound recording trigger instruction.

According to some embodiments, the sound recording trigger instruction may be generated by using at least one of: a voice, a button, a gesture, a human-computer interaction interface (e.g., augmented reality), and an external controller (e.g., a device with a remote control function, such as a cellular phone, associated with the intelligent device).

For example, when the user emits a voice instruction "Start sound recording.", the intelligent device receives the voice instruction, starts voice recognition according to the voice instruction in order to determine whether the voice instruction is a sound recording trigger instruction, and starts a sound recording operation. The intelligent device may store a correspondence between the voice instruction and the sound recording trigger instruction. For example, the voice instruction may correspond to the sound recording trigger instruction via a correspondence table. The voice instruction may include "start sound recording", "sound recording starts", "record voice", and instructions in Korean, English, Chinese, or other languages. Examples of the voice instruction are not limited thereto. The user and the intelligent device may use other methods to associate the voice instruction with the sound recording trigger instruction.

If the sound recording trigger instruction is triggered by a button, the button may be a hardware button on the intelligent device, e.g., a home button, a sound adjustment button, a power button, a program adjustment button, a newly-added button, or a button as shown in FIG. 1B, or a software button implemented by software. Alternatively, the button may be a UI of the intelligent device. If the user presses the button according to a predefined manner, the intelligent device may determine that the sound recording trigger instruction has been received. The predefined manner may include, but is not limited to, short pressing, long pressing, short pressing for a predefined number of times, and alternate short and long presses.

If the sound recording trigger instruction is triggered by a gesture, the gesture may be implemented by one hand or by two hands. The gesture may include hand waving, drawing of a circle, drawing of a rectangle, drawing of a triangle, drawing of a star, etc. The intelligent device may detect and recognize the gesture using an existing gesture detecting device. The intelligent device may determine that the sound recording trigger instruction has been received, according to the recognized gesture.

If the sound recording trigger instruction is received from the external controller (e.g., from a cellular phone connected with the intelligent device that shoots the local writing area), the intelligent device starts to record sound, when receiving from the cellular phone an instruction instructing to record sound. The connection between the intelligent device and the external controller may be a physical connection or may be a wireless connection via at least one of a macro network, a WiFi network, and a LAN, and embodiments are not limited thereto. An instruction of the external controller may be an infrared instruction, or a message transmitted by the cellular phone, and embodiments are not limited thereto.

According to some embodiments, the sound recording trigger instruction may not be used. In other words, the intelligent device may always record the sound, without sound recording trigger instructions.

According to some embodiments, the sound collecting apparatus may be a microphone, or a microphone array including a plurality of microphones. The microphone array may be a single device or multiple devices. For example, many smartphones may include two or more microphones, which may be a microphone array. If the microphone array is located in multiple devices, clock synchronization among the microphones may be necessary before the audio data is received using the microphone array.

According to some embodiments, the recorded audio data includes, but is not limited to, human voices and music. The recorded audio data may include sound emitted by a person who is writing, or sound emitted by other persons or objects.

If there is nothing around the person who is writing, the recorded audio data may include sound emitted by the person himself or herself. If the user who is writing is in a meeting, the recorded audio data may include sound emitted by anyone in the meeting. If the user who is writing records the meeting minutes, the meeting minutes may be corrected and complemented according to the recorded audio data.

For example, when user A records the meeting minutes, a meeting member B introduces several methods for increasing working efficiency. However, user A may write only a keyword "increase working efficiency". The meeting minutes may be complemented according to the recorded audio data.

According to some embodiments, a sampling time of each audio sampling point in the recorded audio data needs to be recorded as a time attribute of the audio data. According to some embodiments, in a familiar audio data storage format (such as, way or mp3), the sampling time of each audio sampling point may be calculated according to the index of the audio sampling point and the sampling frequency.

According to some embodiments, the shooting time of the local writing area and the sampling time of each audio sampling point of the audio data may be generated by one clock or two different clocks. In the case that two different clocks are used, the two clocks need to be synchronized to realize synchronization between an audio and handwriting.

According to some embodiments, the user A may shoot the local writing area and receive audio data, by using the intelligent glasses. At this time, the shooting time of the local writing area and the sampling time of each sampling point of the audio data may be generated by the same clock of the intelligent glasses. Therefore, no synchronization is necessary.

According to some embodiments, the user A may has at least two intelligent devices. The user A may shoot the local writing area by using intelligent glasses and receive audio data by using a smartphone. At this time, the shooting time of the local writing area may be generated by the clock of the intelligent glasses, whereas the sampling time of each sampling point of the audio data may be generated by the clock of the smartphone. In order to realize synchronization between the audio and the handwriting, synchronization is required between the two clocks.

According to some embodiments, the user A may shoot the local writing area by using the intelligent glasses, and user B may receive audio data by using the smartphone. At this time, the shooting time of the local writing area and the sampling time of an audio sampling point of the audio data may be generated by different clocks, respectively. In order to realize synchronization between the audio and the handwriting, synchronization is required between the two clocks.

According to some embodiments, if the microphone array is utilized to receive the audio data, a plurality of receiving paths via which the audio data is received may be stored separately. For example, the audio data may be stored in a multi-path audio format, or audio data obtained via each path may be stored separately. Alternatively, audio data in a combined path after a sound enhancement process may be stored. If each path of audio data is stored separately, synchronization of each path of audio data on the time axis needs to be ensured.

In operation S502, the local handwriting and the audio data are associated with each other.

According to some embodiments, the association of the content in the local writing area with the content in the audio data may be implemented via at least one of the following methods, but embodiments are not limited thereto.

In a first method, the audio data and a file containing the local handwriting are stored associatively.

For example, an audio file may be generated according to the audio data. The intelligent device may generate data or a file containing the local handwriting, that is, at least one of a text file not including layout information, a document file including the layout information, an image file, and a video file. The intelligent device may store the audio file and at least one of the text file, the document file, the image file, and the video file containing the local handwriting, in one folder or in two associated folders.

According to some embodiments, the intelligent device may first obtain a correspondence between the audio data and the file containing the local handwriting. The correspondence between the audio data and the local handwriting may be obtained via the following operations. Of course, embodiments are not limited thereto. The intelligent device may determine the changed handwriting of the current image frame, and determine the audio data recorded between a shooting time of the current frame and that of its adjacent frame according to the sampling time of each audio sampling point in the audio data.

According to some embodiments, the intelligent device may obtain the correspondence between the audio data and the local handwriting, and then may store the changed handwriting determined according to the audio data recorded between the shooting time of the current frame and that of its adjacent frame.

In a second method, the correspondence between the audio data and the local handwriting is stored.

According to some embodiments, the intelligent device may store the correspondence between the audio data and the local handwriting by using a table or by using a file containing the local handwriting, or by using a video file.

If the correspondence is stored in a table, a frame index of the local handwriting may correspond to a timestamp of the audio data, in the table. The frame index of the local handwriting may represent a shooting time during which the local handwriting is shot. The timestamp of the audio data represents a sampling time of the audio sampling point of the audio data.

Figure 6:
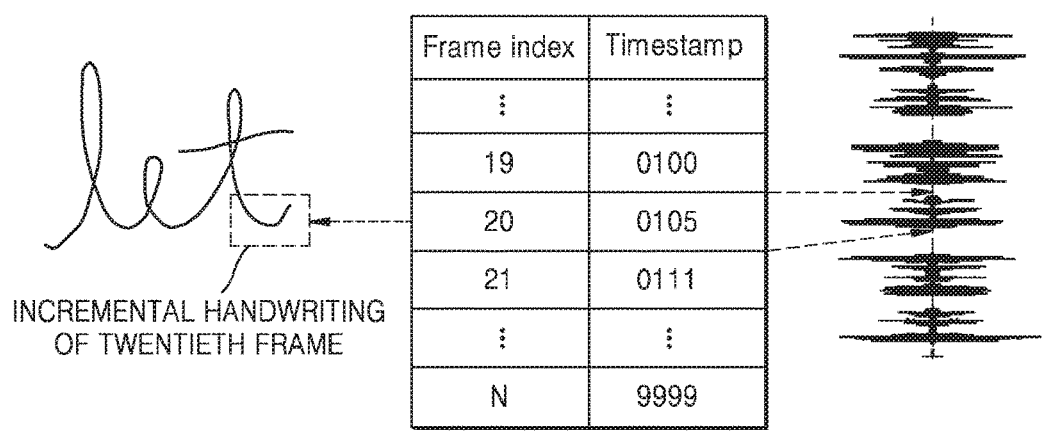
FIG. 6 is a schematic diagram illustrating a method of storing overall handwriting and audio data such that the overall handwriting is associated with the audio data, according to some embodiments.

As shown in FIG. 6, the intelligent device may determine the changed handwriting of the current image frame by comparing the current image frame with the previous image frame. The intelligent device also determines audio data corresponding to the current image frame. The corresponding audio data may be audio data received when the changed handwriting is written. To realize a correspondence between the local handwriting and the audio data, the intelligent device may store the frame index of the current image and the timestamp of the audio data corresponding to the current image in the table such that the frame index of the current image corresponds to the timestamp of the audio data corresponding to the current image.

According to some embodiments, before storing the retrieved changed handwriting and the collected audio data, the intelligent device may synchronize them according to a timestamp. A timestamp associated with the changed handwriting of the current image frame may be selected as a start point, and a timestamp associated with the changed handwriting of the next image frame may be selected as an end point. The intelligent device may retrieve audio data collected during a time period corresponding to a time period between the start point and the end point. The audio data collected during the time period corresponding to the time period between the start point and the end point, and the changed handwriting of the current image frame may be associated with each other to establish a one-to-one correspondence and may be stored together.

If the correspondence is stored in the file containing the local handwriting, an identifier may be set at the local handwriting in the file. The identifier may provide a link to the corresponding audio data. For example, the intelligent device may first compare the current image frame with the previous image frame to determine the changed handwriting of the current image frame. The intelligent device also determines audio data corresponding to the current image frame. The corresponding audio data may be the audio data received when the changed handwriting is written. The intelligent device may set an identifier at a position corresponding to the changed handwriting in the file. The identifier may provide a link to the corresponding audio data in order to realize the correspondence between the local handwriting and the audio data.

In order to enable the user to listen to recorded audio information while reading a text document (or an image document), when the document is displayed, an audio playing identifier may be displayed around characters, words, sentences, paragraphs, chapters, and graphs (or corresponding pixels) having corresponding audio data. The user may listen to the recorded sound by triggering the audio playing identifier via a certain manner.

According to some embodiments, the user may trigger a plurality of audio playing identifiers at a time. For example, the intelligent device may receive a user input of selecting a plurality of audio playing identifiers (for example, a user input of sliding a plurality of audio playing identifiers by using the user's fingers). At this time, the intelligent device may play the audio according to time sequence information representing a time sequence in which the audio playing identifiers are triggered. If the user triggers a plurality of audio playing identifiers at the same time (e.g., the user draws a circle using a gesture to select a plurality of audio playing identifiers in the document), the audio may be played according to the sequence of the timestamps of audios corresponding to the audio playing identifiers.

According to some embodiments, the correspondence between the local handwriting and the audio data may be stored via a video file. The video file may include both a writing trajectory and the audio data, and the writing trajectory may be synchronized with the audio data. For example, after the handwriting of the user is recognized according to the overall handwriting, the intelligent device may generate a video file containing the changed handwriting and time sequence information of each image frame of the overall handwriting and audio data corresponding to the changed handwriting of each image frame, so that the audio data is played while the writing procedure of the changed handwriting is played through the video file. If it is ensured that the audio file and the video file are synchronized on the time axis, the intelligent device may respectively store the audio file and the video file.

A method of storing the audio file and the video file may be selected by the user. For example, before the handwriting is recognized or the audio data is received, the intelligent device may receive a user input of selecting whether to generate video data including the audio data or to separately store the audio data and the handwriting. Alternatively, before storing the video file, the intelligent device may pop out a dialogue box to induce the user's selection. If the user does not perform selection, the intelligent device may generate a video file containing an audio file or generate a video file not containing the audio file.

According to some embodiments, a timestamp corresponding to the changed handwriting of the current image frame may be selected as a start point, and a timestamp corresponding to the changed handwriting of the next image frame may be selected as an end point. Alternatively, a timestamp corresponding to the changed handwriting of the current image frame may be selected as an end point, and a timestamp corresponding to the changed handwriting of the last image frame may be selected as a start point. Then, the intelligent device may retrieve all audio sampling points between the start point and the end point from the recorded audio data according to the sampling time of each audio sampling point in the audio data, in order to form the audio data corresponding to the changed handwriting of the current image frame.

According to some embodiments, before the audio data and the changed handwriting are associated with each other, an enhancement process may be performed on the recorded audio data.

The intelligent device may receive noises when receiving the sound to be recorded. For example, when the intelligent device receives a voice of the user in a noisy environment, surrounding noises may also be recorded. Therefore, the intelligent device may remove the noises in the recorded voice by enhancing the voice in response to a request of the user and filtering background noises.

In addition, if the intelligent device receives both the sound to be recorded and the noises at the same time, the intelligent device may enhance and modify the sound to be recorded (i.e., foreground sound). For example, when the intelligent device receives a voice of the user in a noisy environment, surrounding noises may also be recorded. Thus, the intelligent device may enhance and modify the voice of the user so that the voice of the user is more recognizable compared to the noises.

The sound received by the intelligent device may come from various directions, whereas the sound to be recorded may come from a particular source. In this case, the intelligent device may select a particular direction to receive the sound from the particular source.

The above sound enhancement may be set in advance before receiving the audio data, or may be adjusted during the receiving procedure, or may be implemented during post-processing on the audio data after the audio data is recorded.

According to some embodiments, if the pause signal is detected during the combining of respective the local handwritings of image frames, the receiving of the audio data may also be paused while the local handwriting is being paused, and the received audio data may be stored. Accordingly, after a restore signal is detected later, the receiving of the audio data may continue while the retrieving of the local handwriting is restored.

For example, the user may write content while reading the content. The intelligent device may shoot a local writing area on which content is written by the user, and record a read-out voice. When the user reads and writes 'Today's weather is very good', the intelligent device may receive the pause signal. The intelligent device may temporarily stop the handwriting retrieving and the recording and may cache the local handwriting and audio data of 'Today's weather is very good'. After the intelligent device receives a restore signal, the user may write and read 'I walk to my office'. The intelligent device may continue to retrieve the local handwriting 'I walk to my office' and continue to store read-out content.

According to some embodiments, after receiving the pause signal, the intelligent device may continue receiving the audio data, and may associate the audio data during the pausing period with the local handwriting or changed handwriting of the last image frame before the pause signal is received.

For example, when user A records the meeting minutes, a meeting member B introduces several methods for increasing working efficiency. However, user A may record only a keyword "increase working efficiency". After the user records "increase working efficiency", the intelligent device may receive a pause signal. In this case, the intelligent device may temporarily stop retrieving the local handwriting but may continue to record a voice "increase working efficiency" emitted by the meeting member B, such that user A may complement the meeting minutes according to the recorded audio data after the meeting.

According to some embodiments, in order to realize synchronization between the writing and the audio data, after an ending signal is detected, the intelligent device may stop the receiving of the audio data while the recognition of the handwriting of the user is stopped.

According to some embodiments, when the local writing area is shot, audio data received during the shooting of the local writing area may be recorded, which facilitates subsequent verification of the retrieved handwriting according to the recorded audio data and improves user's experience.

Embodiment 7

After the handwriting of the user is recognized, the intelligent device may generate handwriting information. The handwriting information may include files in different formats. In other words, the intelligent device may generate files in different formats including the handwriting information. The file generation will now be described.

After the intelligent device recognizes the handwriting of the user according to the overall handwriting, at least one of the following files may be generated according to the handwriting of the user: a document file without layout information, a document file with layout information, an image file, and a video file. The intelligent device may store the generated files in storage of the intelligent device, or may transmit and store the generated files to and in another device. The intelligent device may transmit the generated files via a wireless or wired network connection. The intelligent device may edit and modify the generated files by using software (e.g., word processing software) or an application in a computer.

Generation of four types of files will now be described. Of course, the generated files are not limited to the following examples.

Document file without layout information: the handwriting of the user may be recognized using a handwriting recognizing engine, and a result of the recognition may be stored as the document file. The document file may be a text file in txt format or a word format, or other formats.

For example, it is assumed that the user writes two lines of information on an exercise book. If the user wrote 'Today's weather is very good' on a first line and 'I walk to my office' on a second line, the intelligent device may recognize the handwriting, and may generate a file without layout information. The file without layout information does not store line information. In other words, in the file without layout information, ' Today's weather is very good, I walk to my office.' may be recorded as if 'Today's weather is very good' and 'I walk to my office' were written on the same line.

Document file with layout information: according to some embodiments, the document file with layout information may be generated according to the recognized handwriting. The intelligent device may analyze the handwriting of the user by using a layout analyzer. If there is line break information in the handwriting of the user, the line break information may be analyzed by the layout analyzer. During the analyzing, the intelligent device may obtain a layout of the handwriting of the user according to relative positions of strokes in the overall handwriting. The handwriting of the user may be divided into a text part and a drawing part according to the characteristic of each stroke in the overall handwriting. Then, the handwriting of the user may be recognized using the handwriting recognizing engine. The result of the recognition may be arranged according to the layout obtained via the analyzing. The arranged text and the retrieved drawing may be combined and stored as a document file containing text and drawings. The analyzing of the layout using the layout analyzer and the dividing of the text part and the drawing part are well-known to one of ordinary skill in the art, and thus descriptions thereof will not be given herein.

For example, it is assumed that the user writes two lines of information on an exercise book. If the user wrote 'Today's weather is very good' on a first line and 'I walk to my office' on a second line, the intelligent device may recognize the handwriting, and may generate a file with layout information. When the document file with layout information is generated, a first line of the document file is 'Today's weather is very good', and a second line thereof is 'I walk to my office'.

Figure 7A:
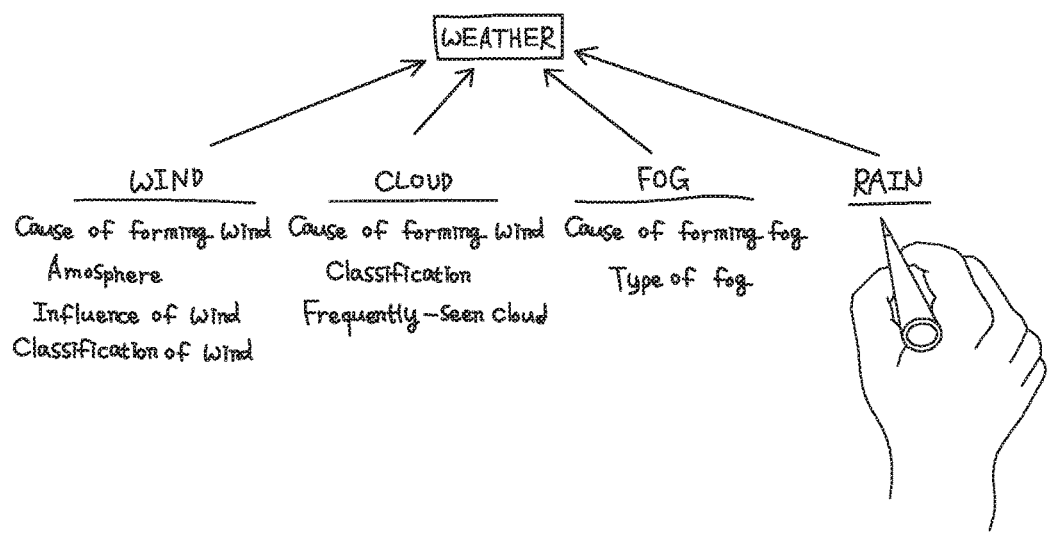
FIG. 7A is a schematic diagram illustrating handwriting of a user, according to some embodiments.
Figure 7B:
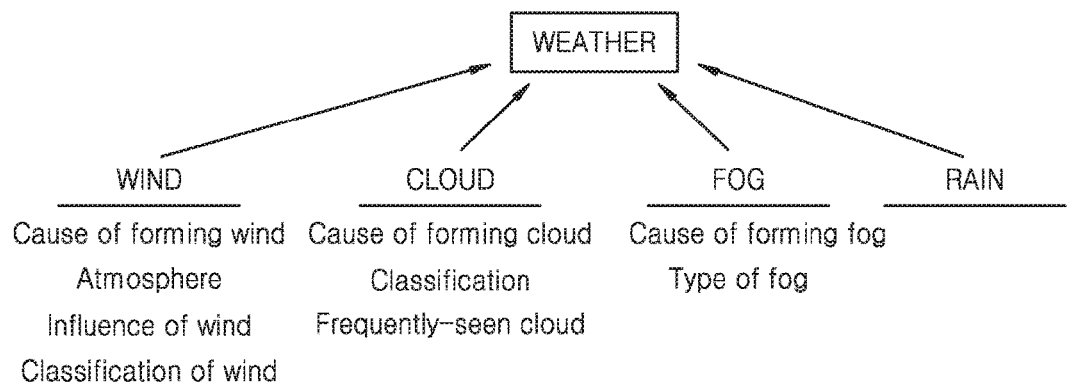
FIG. 7B is a schematic diagram illustrating handwriting information including layout information generated according to FIG. 7A, according to some embodiments.

According to some embodiments, the user may perform handwriting on a writing surface as shown in FIG. 7A. The intelligent device may remove a hand of the user and a writing tool from a captured image frame and may obtain local handwriting. The local handwritings may be combined into overall handwriting. Thus, the intelligent device may obtain a document file with the layout information as shown in FIG. 7B. The content displayed in FIG. 7B is printed content, which facilitates recognition of the handwriting performed by the user.

Figure 7C:
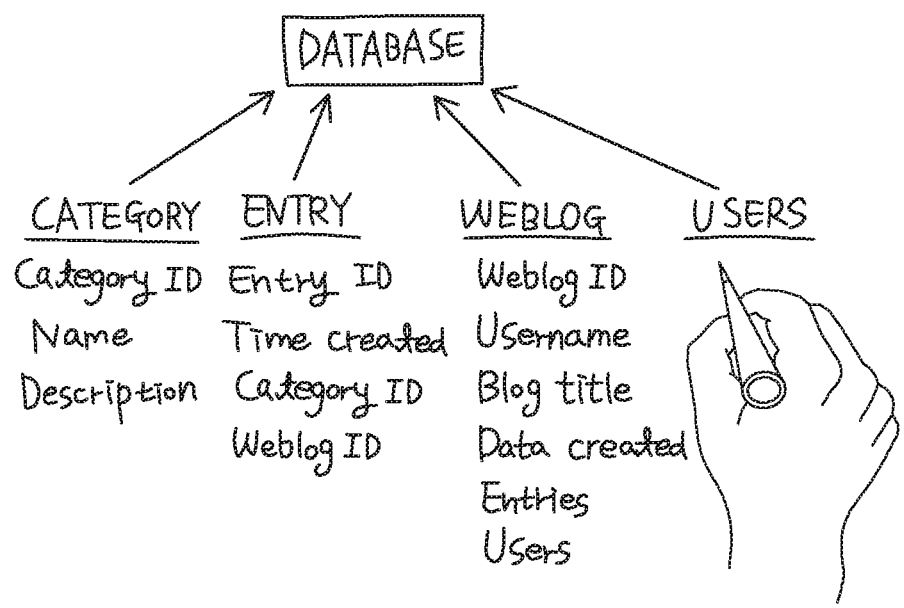
FIG. 7C is a schematic diagram illustrating handwriting of a user, according to some embodiments.
Figure 7D:
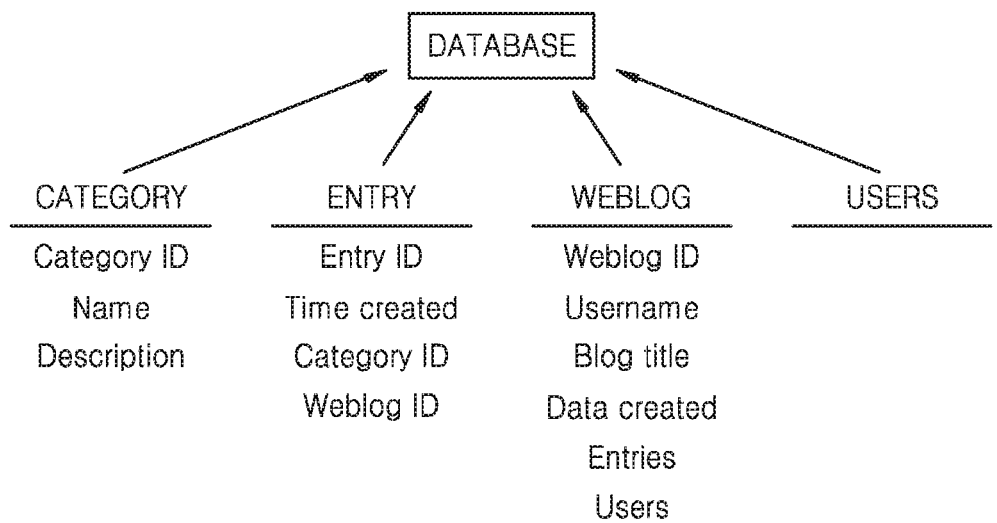
FIG. 7D is a schematic diagram illustrating handwriting information including layout information generated according to FIG. 7C, according to some embodiments.

FIG. 7C is a schematic diagram showing English content written by the user. FIG. 7D is a schematic diagram showing a document file with layout information generated according to FIG. 7C. The document file is generated in a similar manner to that of FIGS. 7A and 7B.

According to some embodiments, the document file with the layout information may be generated according to line break information, a deleting identifier, a replacement identifier, a repeat characteristic identifier, inserted content, an insertion identifier, a position adjusting identifier, an emphasis identifier, and content description. In other words, the layout information may include line break information and information about a deleting identifier, a replacement identifier, a repeat characteristic identifier, inserted content, an insertion identifier, a position adjusting identifier, and an emphasis identifier.

According to some embodiments, each of the deleting identifier, the replacement identifier, the repeat characteristic identifier, the insertion identifier, the position adjusting identifier, and the emphasis identifier may include, but is not limited to, at least one of a background color, an underline, a dotted line, a wavy line, a rectangle frame, an emphasis sign, a bracket, a triangle sign, a star, an asterisk, and a pound sign.

According to some embodiments, during a writing procedure, it may be considered that the user repeatedly writes some pieces of content. For example, the user may write same characters, same words, same sentences, same paragraphs, same graphs, etc. The repeat characteristic identifier may be used to avoid repetitive writing of the same content by the user, thereby increasing writing efficiency.

For example, during the writing procedure of the user, the user may first write 'writing information', and the repeat characteristic identifier may be added to 'writing information'. In a subsequent writing procedure, the repeat characteristic identifier may be used to replace 'writing information'.

Before the document file with the layout information is generated, the intelligent device may detect the repeat characteristic identifier and determine a position where the repeat characteristic identifier firstly appears. The intelligent device may copy the content identified by the firstly-appearing repeat characteristic identifier to positions of subsequent repeat characteristic identifiers in order to generate the document file with the layout information.

The content identified by the repeat characteristic identifier may be information recognized according to the repeat characteristic identifier. For example, the content identified by the repeat characteristic identifier may include, but is not limited to, a character, a word, a sentence, a paragraph, a graph, etc.

Figure 7E:
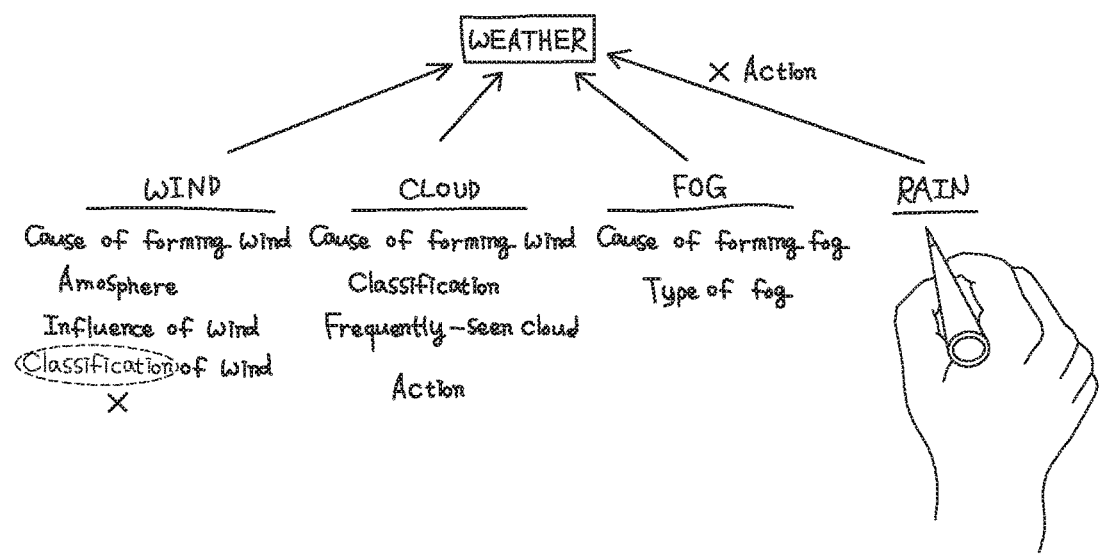
FIG. 7E is a schematic diagram illustrating a method of using a replacement identifier, according to some embodiments.
Figure 7F:
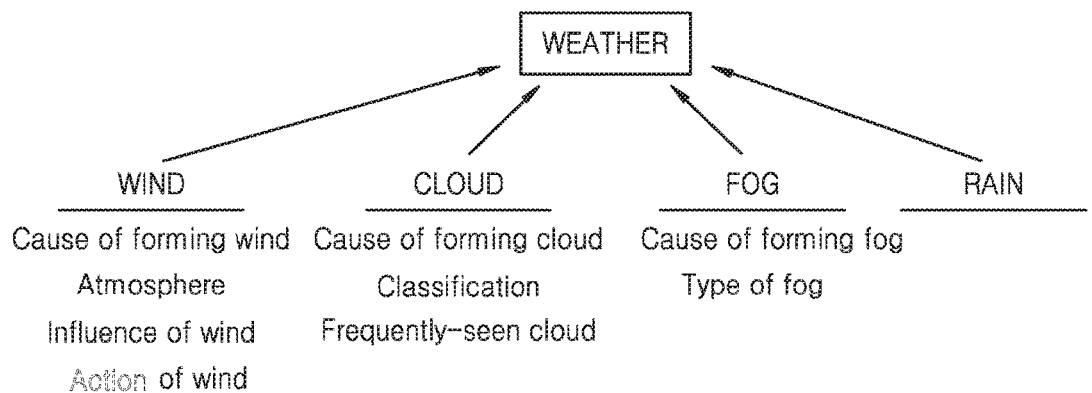
FIG. 7F is a schematic diagram illustrating handwriting information including layout information generated according to FIG. 7E, according to some embodiments.

During the writing procedure of the user, the written content may be replaced. As shown in FIG. 7E, assuming that x denotes a replacement identifier and the user desires to replace 'classification' with 'action', the method of FIG. 3C may be utilized to realize the replacement. The intelligent device may detecting the replacement identifier x, replace the content, and generate a document file with layout information shown in FIG. 7F.

Figure 7G:
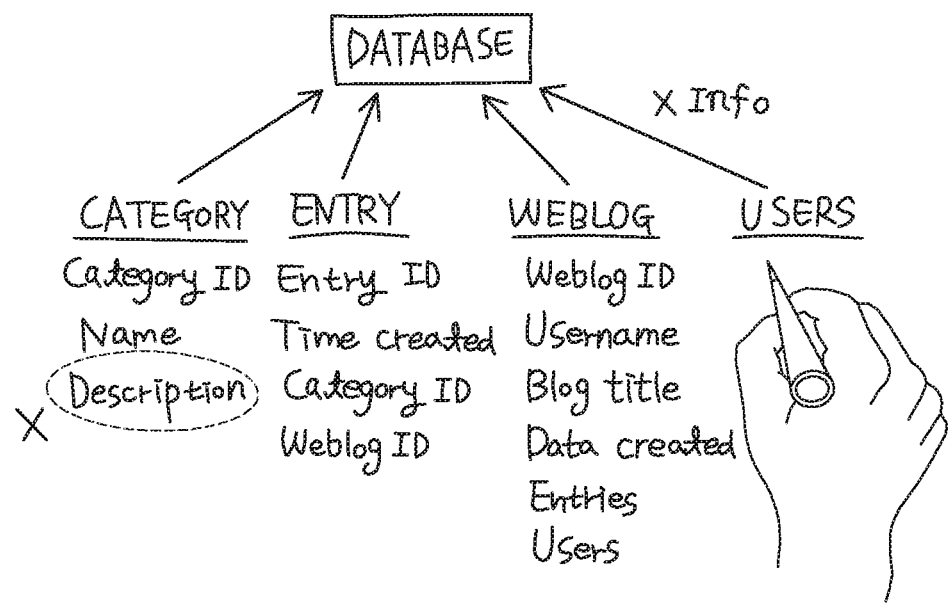
FIG. 7G is a schematic diagram illustrating a method of using a replacement identifier, according to some embodiments.
Figure 7H:
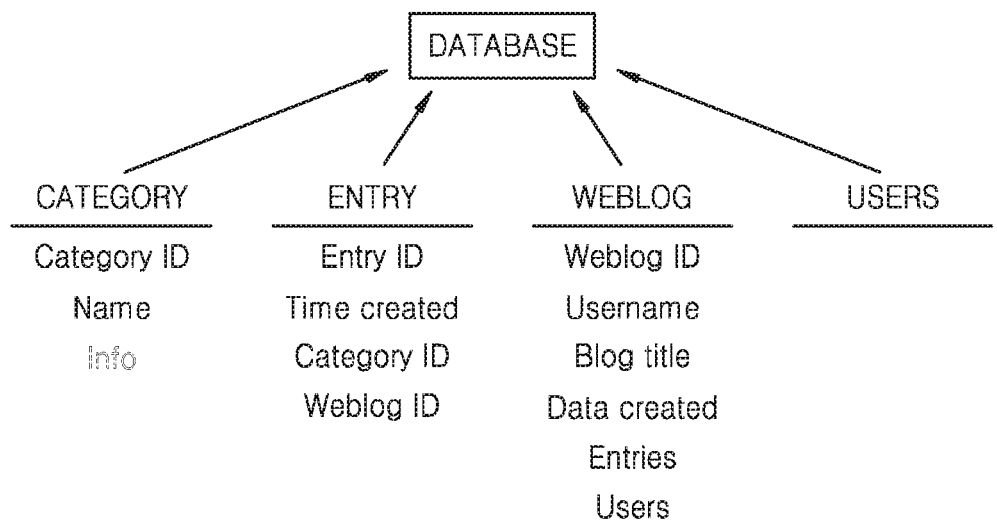
FIG. 7H is a schematic diagram illustrating handwriting information including layout information generated according to FIG. 7G, according to some embodiments.

FIG. 7G is a schematic diagram showing English content written by the user and including a replacement identifier. FIG. 7H is a schematic diagram showing a document file with layout information generated according to FIG. 7G. The document file is generated in a similar manner to that of FIGS. 7E and 7F.

Figure 7I:
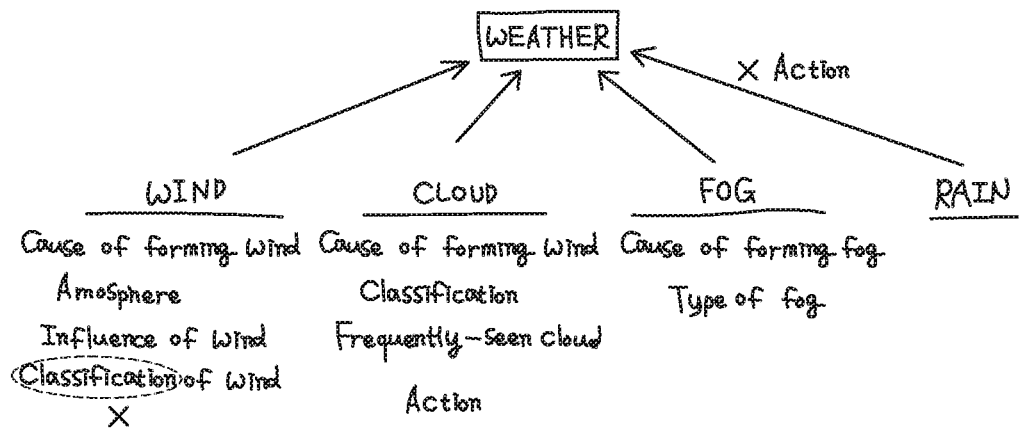
FIG. 7I is a schematic diagram illustrating handwriting information in the format of an image file generated according to FIG. 7E, according to some embodiments.
Figure 7J:
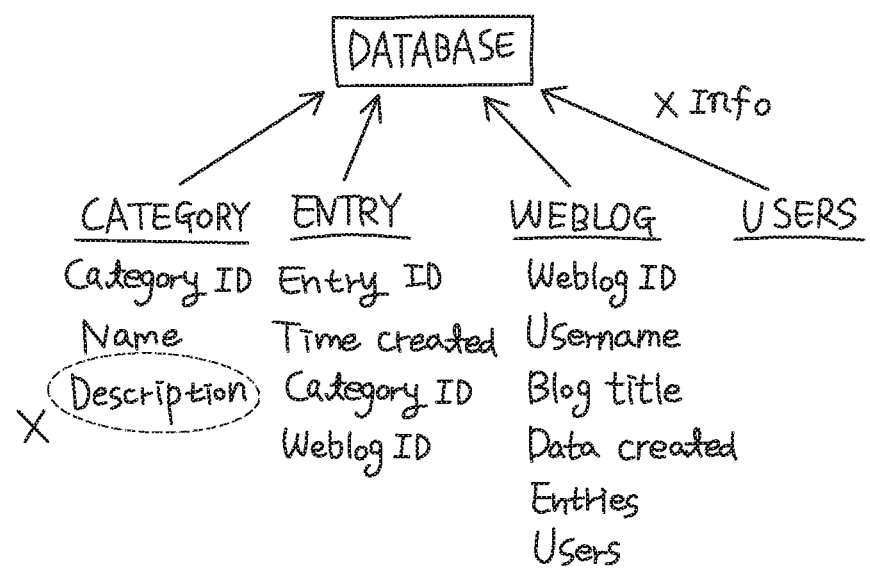
FIG. 7J is a schematic diagram illustrating handwriting information in the format of an image file generated according to FIG. 7C, according to some embodiments.

Image file: the retrieved handwriting of the user may be directly stored as an image file. For example, the intelligent device may store overall handwriting in the image file. FIG. 7I shows an image file with the written content shown in FIG. 7E. FIG. 7J also shows an image file with the written content shown in FIG. 7C. The image file may record the original handwriting of the user.

Video file: the retrieved handwriting of the user may be directly stored in a video file according to a time sequence of pixels in the retrieved handwriting of the user. For example, the video file may be generated and stored according to changed handwriting and time sequence information of each image frame. The video file may record a complete writing procedure of the user.

According to some embodiments, the document file with layout information, the document file without layout information, the image file, and the video file may be associated with each other. If the audio data is recorded while the local writing area is being shot, the audio file may be generated according to the audio data associated with at least one of the document file with layout information, the document file without layout information, the image file, and the video file.

According to some embodiments, the association may include the meaning of an association between two pieces of data. The association may include two types of associations, such as a file-layer association and a content-layer association. Association between two layers will now be described.

According to some embodiments, the file-layer association may refer to a correspondence established between various kinds of files generated with respect to the same writing procedure. The file-layer association enables the other files to be rapidly found and retrieved based on one of a plurality of files.

For example, the intelligent device may identify a file via a file name. The file-layer association may include the following correspondences: "name of generated document file← →name of generated image file", "name of generated image file← →name of generated video file", and "name of generated document file← →name of generated video file", wherein ← → denotes a correspondence. In other words, the intelligent device may associate at least one file with each other on a file layer so that associated data may be identified based on a file name.

If the audio file is stored, the file-layer association may further include the following correspondences: "name of generated document file← →name of generated audio file", "name of generated image file← →name of generated audio file", and "name of generated audio file← →name of generated video file".

According to some embodiments, the above correspondences related with the file-layer association may be stored in the form of a mapping table, or may be implemented by setting the same prefix in the file names. Of course, embodiments are not limited thereto.

According to some embodiments, the content-layer association may include, for example, a correspondence between the characters in the document file and the pixels in the image file, and a correspondence between the characters in the document file and the image frames in the video file.

For example, the correspondence between the characters in the document file and the pixels in the image file may be determined according to a correspondence between a character and a changed handwriting during generation of the document file and a correspondence between a pixel and a changed handwriting during generation of the image file.

According to some embodiments, the above correspondences related with the content-layer association may be stored in the form of a mapping table. When a character of a document file is viewed, an actual writing procedure and handwriting of the character may be found through searching the mapping table.

If the corresponding audio data is recorded while the local writing area is being shot, the content-layer association may further include a correspondence between the characters in the document file and the audio sampling points in the audio file. Thus, when the character in the document file is viewed, audio data recorded when the character is written may be found.

According to some embodiments, the correspondences among the text file (document file without layout information), the document file with layout information, the image file, and the video file may be stored in the intelligent device (such as, intelligent glasses), or may be stored in other storage devices, and may be transmitted via a wireless or wired network connection for a subsequent use.

According to some embodiments, performing an operation of associating data may include performing a predetermined operation to know that first data and second data are associated with each other. For example, to associate the first data with the second data, the intelligent device may include, but is not limited to, all of operations of displaying or controlling to inform that the second data associated with the first data exists, such as inserting the same tag information, classifying into the same category, or storing in the same storage.

According to some embodiments, the intelligent device may perform a method of recognizing handwriting, the method including the operations of: tracing a writing focus detected in real time; shooting a local writing area; retrieving local handwriting from a captured image frame of the local writing area; combining local handwritings to obtain overall handwriting; and recognizing handwriting of the user according to the overall handwriting.

The writing focus may be determined according to a visual focus or according to a detected position of the tip of a writing tool.

The position of the tip of the writing tool may be determined based on the tip of the writing tool recognized from the captured image frame according to the shape of the tip of the writing tool registered in advance.

The operation of retrieving the local handwriting from the captured image frame of the local writing area may include obtaining the local handwriting from the captured image frame based on a handwriting color.

The operation of obtaining the local handwriting from the captured image frame based on a handwriting color may include retrieving the local handwriting from the captured image frame, based on a handwriting color registered in advance, or retrieving the local handwriting from the captured image frame, based on a color difference between the handwriting color and the color of a wiring background.

The operation of retrieving the local handwriting from the captured image frame, based on the color difference between the handwriting color and the color of the wiring background, may include performing binarization on the captured image frame, based on the color difference between the handwriting color and the color of the wiring background, to obtain a binarized image; determining a line-shaped image area within the binarized image; and retrieving the line-shaped image area as the local handwriting.

The operation of combining the local handwritings to obtain the overall handwriting may include combining local handwriting retrieved from a current image frame with local handwriting retrieved from a previous image frame; determining changed handwriting of the current image frame; and combining respective changed handwritings of image frames with each other to obtain the overall handwriting.

The operation of combining the local handwritings to obtain the overall handwriting may include combining respective changed handwritings of all of previous image frames earlier than the current image frame to obtain an anterior combined handwriting of the current image frame and combining the changed handwriting of the current image frame with the anterior combined handwriting of the current image frame to obtain an anterior combined handwriting of a next image frame; and repeating the combination of the changed handwriting of the image frame with the anterior combined handwriting of the image frame to obtain the overall handwriting.

The method of recognizing the handwriting may further include, after recognizing the overall handwriting, an operation of generating a document file without layout information, a document file with layout information, or an image file according to the recognized handwriting, or generating a video file based on time sequence information and changed handwriting of each image frame.

The document file with the layout information may be generated according to line break information, a deleting identifier, a replacement identifier, a repeat characteristic identifier, inserted content, an insertion identifier, a position adjusting identifier, an emphasis identifier, and content description.

When the document file with the layout information is generated based on the repeat characteristic identifier, the document file with the layout information may be generated by determining a position where the repeat characteristic identifier first appears and copying the content identified by the firstly-appearing repeat characteristic identifier to positions of subsequent repeat characteristic identifiers.

The method of recognizing the handwriting may further include the operations of: receiving audio data generated while the local writing area is being shot; and associating the local handwriting with the received audio data.

The operation of associating the local handwriting with the received audio data may include storing the audio data and a file including the local handwriting such that the audio data is associated with a file including the local handwriting, or storing a correspondence between the audio data and the local handwriting.

If the correspondence between the audio data and the local handwriting is stored and audio data corresponding to identified content exists, the operation of associating the local handwriting with the received audio data may include identifying content corresponding to the local handwriting.

The operation of associating the local handwriting with the received audio data may further include generating a video file including the audio data and the local handwriting, based on the correspondence between the audio data and the local handwriting, after associating the local handwriting with the received audio data.

The operation of associating the local handwriting with the received audio data may further include audio data received between a shooting time for the current image frame and a shooting time for an image frame adjacent to the current image frame with respective changed handwritings of the current image frame and the adjacent image frame.

The method of recognizing the handwriting may further include the operations of: determining whether line break information was detected, after the local handwriting is detected; and combining the local handwritings based on the line break information.

The operation of determining whether line break information was detected may be determined based on at least one of whether respective local handwritings of adjacent image frames have no handwriting overlap, whether a line break identifier was detected, and whether audio data indicating a line break was received.

The operation of combining the local handwritings based on the line break information may include determining a combining start point and a combining end point of local handwritings, based on the line break information; and combining the local handwritings with each other.

The method of recognizing the handwriting may include the operations of: determining whether a pause signal is detected; and stopping the retrieving of the local handwriting and monitoring a global area.

The operation of determining whether a pause signal is detected may include performing the determination based on at least one of whether the visual focus of the user left from a writing surface, whether a changing angle of the head posture of the user exceeds a predetermined value, whether the position of the tip of the writing tool is detected, and whether audio data indicating the pause signal is received, if new handwriting is not detected from a captured image frame.

The operation of determining whether a pause signal is detected may further include, after the pause signal is detected, caching the overall handwriting and a captured image of the writing surface.

The method of recognizing the handwriting may further include, after the pause signal is detected, the operations of: determining whether a restore signal is detected from the global area; restoring the retrieval of the local handwriting, based on a result of the determination; and continuing to combine the local handwritings, based on cached information.

The operation of determining whether the restore signal is detected may be performed based on at least one of whether a captured image of the global area matches with the cached image of the writing surface, whether the visual focus of the user is back to the writing surface, whether information newly written on the writing surface by the writing tool is generated, and whether audio data indicating restoration is received.

The method of recognizing the handwriting may further include the operations of: determining whether an ending signal is detected; and ending the recognition of the handwriting of the user, based on a result of the determination.

The operation of determining whether the ending signal is detected may be performed based on at least one of whether the visual focus of the user has left the writing surface for a predetermined time period, whether new handwriting was detected for a predetermined time period, whether an ending instruction was received, and whether audio data indicating ending was received.

The method of recognizing the handwriting may further include the operation of determining whether to perform an enhancement process on the local handwriting, before the local handwritings are combined.

The operation of determining whether to perform the enhancement process may be performed based on at least one of whether light brightness or definition during image capturing does not meet a pre-defined requirement, whether a thickness of the handwriting in a captured image is smaller than a pre-defined value, and whether a difference between the color of the handwriting in the captured image and the color of a background is smaller than a predefined value.

The enhancement process may include adjusting a focus or aperture of the camera according to the light brightness and definition during image capturing, adjusting magnification of the camera according to the thickness of the handwriting of the captured image frame, performing a slant and/or rotation calibration on the captured image frame; performing a brightness and/or contrast correction on the captured image frame; and smoothing the retrieved local handwriting.

An operation of performing the enhancement process may further include an operation of removing a stroke with a confidence evaluation value lower than a threshold from the local handwriting.

The confidence evaluation value of a stroke may be determined according to a length of the stroke, a width of the stroke, a curvature of the stroke, a color of the stroke, a relative position or continuity of the stroke with respect to previous or later strokes, and a matching degree between the stroke and a moving trajectory of the tip of the writing tool.

In a technical solution of the present invention, the writing focus of the writing tool may be traced to shoot the local writing area. The handwriting written on the local writing area by the user is retrieved from a captured image frame of the local writing area and combined to obtain overall handwriting written on the global area by the user. Since the retrieved handwriting is the handwriting of the user already written on the writing surface and thus is irrelevant to pen-up and pen-down movements of the user, the problem that handwriting retrieving according to the moving trajectory of the tip of a writing tool is inaccurate can be avoided, and the accuracy of recognizing the handwriting of the user increases.

In addition, audio data received during shooting of the local writing area may be recorded. The recorded audio data may be used when the user corrects the recognized handwriting later, and increase the accuracy of retrieved handwriting.

In another technical solution of the present invention, a correspondence between the audio data and local handwriting input simultaneously with the audio data may be stored. The corresponding audio data may be played when written content is displayed later, may improve the user's experience, may be used when the user corrects the recognized handwriting later, and may increase the accuracy of retrieved handwriting.

Embodiment 8

Figure 8:
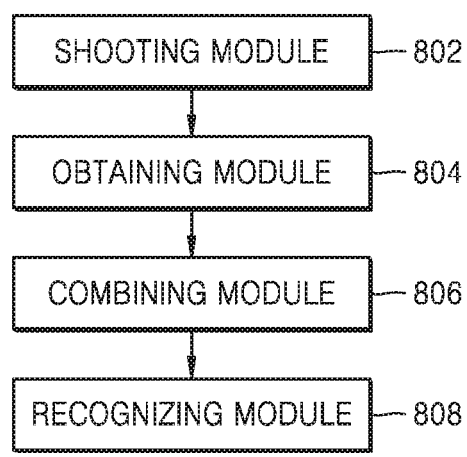
FIG. 8 is a block diagram of a structure of an apparatus for recognizing handwriting, according to some embodiments.

According to some embodiments, there is provided an apparatus for recognizing handwriting, wherein the apparatus implements at least one of the above-described methods. The apparatus for recognizing handwriting may be an intelligent device. FIG. 8 illustrates an internal structure of the apparatus for recognizing handwriting.

According to some embodiments, the apparatus shown in FIG. 8 may include a shooting module 402, an obtaining module 404, a combining module 406, and a recognizing module 408.

According to some embodiments, the shooting module 402 may trace a writing focus detected in real-time, and may shoot a local writing area.

According to some embodiments, the obtaining module 404 may obtain local handwriting from an image obtained by shooting the local writing area.

According to some embodiments, the combining module 406 may combine obtained local handwritings with each other to obtain overall handwriting.

According to some embodiments, the recognizing module 408 may recognize handwriting of a user according to the overall handwriting.

According to some embodiments, the writing focus may be determined according to a visual focus or according to a detected position of the tip of a writing tool. Of course, embodiments are not limited thereto.

According to some embodiments, the position of the tip of the writing tool may be determined by recognizing the tip of the writing tool from the captured image frame according to the shape of the tip of the writing tool registered in advance or determining the position of the tip of the writing tool according to the recognized tip of the writing tool. Of course, embodiments are not limited thereto.

According to some embodiments, the obtaining module 404 may retrieve the local handwriting from the image according to a handwriting color.

According to some embodiments, the obtaining module 404 may retrieve the local handwriting from the image according to the handwriting color by retrieving the local handwriting from the image according to a handwriting color of the writing tool registered in advance or retrieving the local handwriting from the image according to a difference between the handwriting color and the color of a writing background.

According to some embodiments, the obtaining module 404 may perform binarization processing on the image according to the difference between the handwriting color and the color of the writing surface to obtain a binarized image, determine a line-shaped image area in the binarized image, and retrieve the line-shaped image area as the local handwriting from the image according to the difference between the handwriting color and the color of the writing background.

According to some embodiments, the apparatus may further include a generating module (not shown). The generating module may generate and store as, a document file, the handwriting of the user recognized according to the overall handwriting. For example, the generating module may generate a document file with layout information according to the recognized handwriting, store the overall handwriting as an image file, and generate a video file according to changed handwriting and time sequence information of each image frame.

According to some embodiments, the document file with the layout information may be generated according to line break information, a deleting identifier, a replacement identifier, a repeat characteristic identifier, inserted content, an insertion identifier, a position adjusting identifier, an emphasis identifier, and content description. Of course, embodiments are not limited thereto.

According to some embodiments, the generating module may detect a repeat characteristic identifier and determine a position where the repeat characteristic identifier firstly appears. The intelligent device may copy the content identified by the firstly-appearing repeat characteristic identifier to positions of subsequent repeat characteristic identifiers in order to generate the document file with the layout information.

According to some embodiments, the apparatus may further include a receiving module (not shown). The receiving module may receive audio data generated while the local writing area is being shot.

According to some embodiments, the apparatus may further include an associating module (not shown). The associating module may associate the audio data with the local handwriting.

According to some embodiments, the associating module may associate the audio data with the local handwriting. For example, the associating module may associatively store the audio data and a file containing the local handwriting and store a correspondence between the audio data and the local handwriting. Of course, embodiments are not limited thereto.

According to some embodiments, the generating module may generate a video file containing the audio data and the local handwriting according to the correspondence between the audio data and the local handwriting, after associating the audio data with the local handwriting.

According to some embodiments, the associating module may associate audio data received between a shooting time of a current image frame and a shooting time of an adjacent image frame with changed handwriting determined according to the current image frame and the adjacent image frame.

According to some embodiments, the apparatus may further include a line break information determining module (not shown). The line break information determining module may determine line information. The combining module 406 may combine the local handwritings according to the line break information.

According to some embodiments, the line break information determining module may determine whether the line break information was detected. For example, the line break information determining module may determine whether the line break information was detected, by determining whether respective local handwritings of adjacent image frames have no handwriting overlap, whether a line break identifier was detected, and whether audio data indicating a line break was received. Of course, embodiments are not limited thereto.

According to some embodiments, the apparatus may further include a pause signal detecting module (not shown). When a pause signal is detected, the pause signal detecting module may perform a global monitoring.

According to some embodiments, the pause signal detecting module may determine that the pause signal was detected, when new handwriting is not detected from the captured image, when the visual focus of the user left from the writing surface, when a changing angle of the head posture of the user exceeds a predetermined value, when the position of the tip of the writing tool is not detected, and when audio data indicating the pause signal is received. Of course, embodiments are not limited thereto.

According to some embodiments, the apparatus may further include a caching module (not shown). The caching module may cache the overall handwriting and the captured image of the writing surface, after the pause signal is detected.

According to some embodiments, the apparatus may further include a restore signal detecting module (not shown). The restore signal detecting module may determine whether a restore signal was detected from in the global area after the pause signal is detected. If the restore signal is detected, the obtaining module 404 may restore the retrieving of the local handwriting. The combining module 406 may restore the combination of the local handwritings according to the cached information.

According to some embodiments, the restore signal detecting module may determine that the restore signal was detected, when a captured image of the global area matches with the cached image of the writing surface, when the visual focus of the user is back to the writing surface, when information newly written on the writing surface by the writing tool is generated, and when audio data indicating restoration is received. Of course, embodiments are not limited thereto.

According to some embodiments, the apparatus may further include an ending signal detecting module (not shown). If an ending signal is detected, the recognizing module 408 may end the recognition of the handwriting of the user.

According to some embodiments, the ending signal detecting module may determine that the ending signal was detected, when the visual focus of the user has left the writing surface for a predetermined time period, when new handwriting was not detected for a predetermined time period, when an ending instruction was received, and when audio data indicating ending was received. Of course, embodiments are not limited thereto.

According to some embodiments, the apparatus may further include an enhancement processing module (not shown). The enhancement processing module may perform an enhancement processing on the local handwritings before the local handwritings are combined.

According to some embodiments, the enhancement processing module may perform the enhancement processing on the local handwriting when light intensity or definition during image capturing does not meet a predefined requirement, when a thickness of the handwriting of the captured image is lower than a predefined value, and when a difference between the handwriting color in the captured image and the background color is smaller than a predefined value.

According to some embodiments, the enhancement processing may include at least one of the operations of adjusting a focus or aperture of the camera according to the light brightness and definition during image capturing, adjusting magnification of the camera according to the thickness of the handwriting of the captured image, performing a slant and/or rotation calibration on the captured image, performing a brightness and/or contrast correction on the captured image; and smoothing the retrieved local handwriting. Of course, embodiments are not limited thereto.

According to some embodiments, the enhancement processing module may remove a stroke with a confidence evaluation value lower than a threshold from the local handwriting.

According to some embodiments, the confidence evaluation value of a stroke may be determined according to a length of the stroke, a width of the stroke, a curvature of the stroke, a color of the stroke, a relative position or continuity of the stroke with respect to previous or later strokes, and a matching degree between the stroke and a moving trajectory of the tip of the writing tool. Of course, embodiments are not limited thereto.

Figure 9:
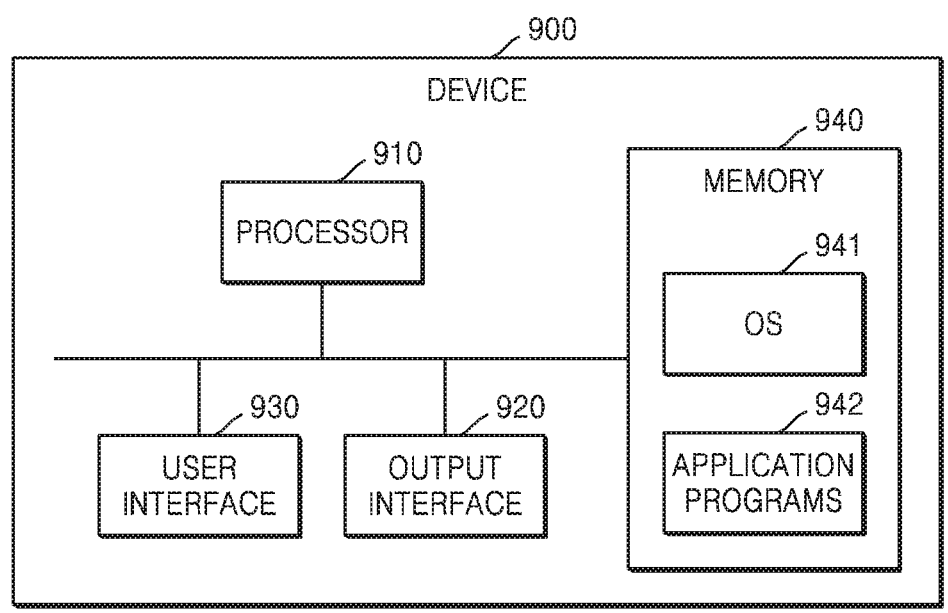
FIG. 9 is a block diagram of a structure of an electronic device for recognizing handwriting, according to some embodiments.
Figure 10:
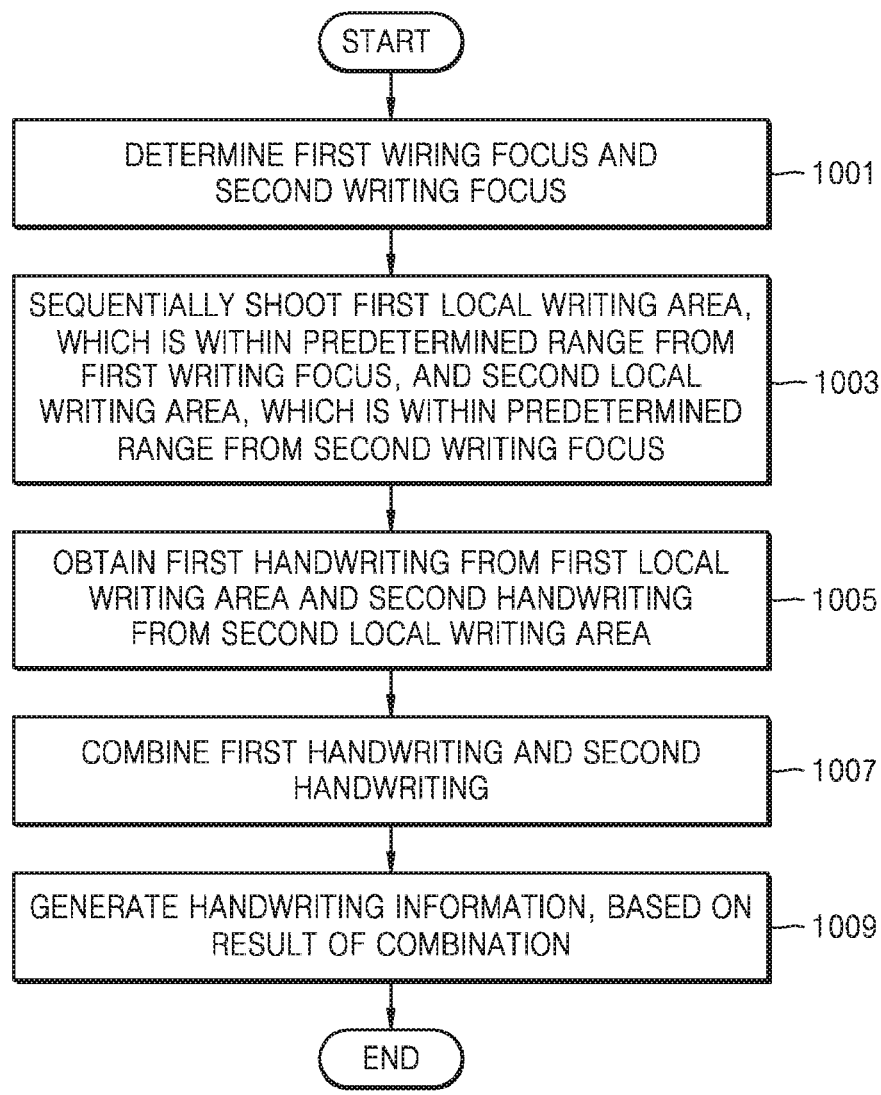

FIG. 9 is a schematic diagram illustrating a structure of an electronic device for recognizing handwritten content, according to some embodiments.

As shown in FIG. 9, an electronic device 900 may include a central processing unit (CPU) and a processor 910, an output interface 920 or a user interface 930, a memory 940, and a communication bus 950. At least one processor 910, at least one output interface 920, at least one memory 940, and at least one communication bus 950 may be included according to embodiments.

The communication bus 950 may be used to implement communication between the above components of the electronic device 900. The electronic device 900 may selectively include the user interface 930. The user interface 930 may include a display, a keyboard, or a clicking device (such as, a mouse, a trackball, a touch board, or a touch screen). The memory 940 may include a random access memory (RAM) or as at least one disk memory such as a non-volatile memory. According to some embodiments, the memory 940 may optionally include at least one storage device that is remotely controlled by the processor 910.

According to some embodiments, the memory may store executable modules and data structures, or a set and subset of them, or an extended set of them.

According to some embodiments, an operating system (OS) 941 includes various system programs for implementing various basic services and processing hardware-based tasks.

According to some embodiments, application programs 942 may include various application programs used for implementing various application services.

According to some embodiments, the application programs 942 may include programs used for executing the above methods. For example, the application programs may include a shooting unit to trace a writing focus detected in real time and shoot a local writing area, an obtaining unit to obtain local handwriting from a captured image of the local writing area, a combining unit to combine the obtained local handwritings to obtain overall handwriting, and a recognizing unit to recognize handwriting of a user according to the overall handwriting.

Reference may be made to the above-described embodiments to describe the other application programs, and thus descriptions thereof are not repeated herein.

According to an example embodiment, the processor 910 may execute corresponding blocks through instructions stored in the memory 940 or calling programs. For example, the processor 910 may trace the writing focus detected in real time, shoot the local writing area, obtain local handwriting from the captured image of the local writing area, combine the obtained local handwritings to obtain the overall handwriting, and recognize information handwritten by the user according to the overall handwriting.

According to some embodiments, the processor 910 may be used to implement the above-described embodiments. Reference may be made to the above-described embodiments to describe the other operations of the processor 910, and thus descriptions thereof are not repeated herein.

According to some embodiments, there is provided a computer readable medium used to store a computer program that executes the above-described methods. Reference may be made to the above-described embodiments to describe the methods executed by the computer program, and thus descriptions thereof are not repeated herein.

Figure 10:
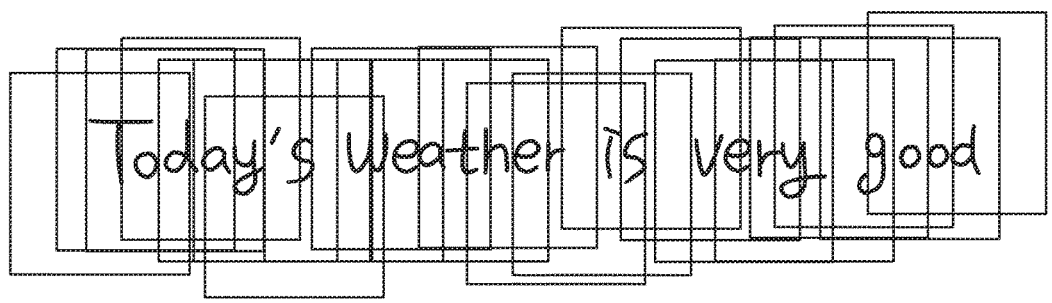
FIG. 10 is a flowchart of a method of generating handwriting information about handwriting of a user, according to some embodiments.

FIG. 10 is a flowchart of a method of generating handwriting information about handwriting of a user, according to some embodiments.

In operation 1001, an intelligent device may determine a first wiring focus and a second writing focus.

According to some embodiments, the intelligent device may trace a visual focus of the user and may determine the first writing focus and the second writing focus based on the traced visual focus. The intelligent device may trace a tip of a writing tool, determine a position of the tip of the writing tool, and determine the first writing focus and the second writing focus based on the position of the tip of the writing tool.

The intelligent device may obtain information about a shape of the tip of the writing tool from the user, detect a tip of the writing tool from at least one image captured by shooting a first local writing area and a second local writing area, and determine the position of the tip of the writing tool, based on a result of the detection.

The operation of tracing or determining a writing focus corresponds to the above-description, and thus a detailed description thereof will be omitted.

In operation 1003, the intelligent device may sequentially shoot the first local writing area, which is within a predetermined range from the first writing focus, and the second local writing area, which is within a predetermined range from the second writing focus.

The shooting of the local writing area corresponds to the above-description, and thus a detailed description thereof will be omitted.

In operation 1005, the intelligent device may obtain first handwriting from the first local writing area and second handwriting from the second local writing area.

According to some embodiments, the intelligent device may obtain the first handwriting from the first local writing area and the second handwriting from the second local writing area, based on handwriting color information input by the user.

According to some embodiments, the intelligent device may obtain the first handwriting from the first local writing area and the second handwriting from the second local writing area, based on a color difference between the handwriting color and the color of a writing background.

The method of obtaining handwriting corresponds to the above-description, and thus a detailed description thereof will be omitted.

In operation 1007, the intelligent device may combine the first handwriting and the second handwriting.

According to some embodiments, the intelligent device may compare the first handwriting with the second handwriting, determine changed handwriting between a captured image frame of the first local writing area and a captured image frame of the second local writing area, based on a result of the comparison, and combine the changed handwriting, based on a result of the determination.

The handwriting combination corresponds to the above-description, and thus a detailed description thereof will be omitted.

In operation 1009, the intelligent device may generate handwriting information, based on a result of the combination.

According to some embodiments, the handwriting information may include at least one of time sequence information of the local handwriting and layout information. The handwriting information may be stored in at least one format from among a document format, an image format, and a video format. The intelligent device may generate the handwriting information by generating a document file format with a layout, an image file format, and a video file format.

According to some embodiments, the layout information may include line break information and identifier information of at least one of a deleting identifier, a replacement identifier, a repeat characteristic identifier, an insertion identifier, a position adjusting identifier, and an emphasis identifier. The layout information corresponds to the above-description, and thus a detailed description thereof will be omitted.

According to some embodiments, the intelligent device may obtain audio data generated while the first local writing area and the second local writing area are being sequentially shot. The audio data may be received from another device or may be directly recorded by the intelligent device. The intelligent device may generate the handwriting information such that the obtained audio data correspond to the first handwriting and the second handwriting.

According to some embodiments, the intelligent device may generate the handwriting information such that audio data received between a shooting time of the first local area and a shooting time of the second local area corresponds to the changed handwriting between the captured image frame of the first local writing area and the captured image frame of the second local writing area. In other words, the intelligent device may associate the handwriting information such that the audio data received between the shooting time of the first local area and the shooting time of the second local area corresponds to the changed handwriting between the captured image frame of the first local writing area and the captured image frame of the second local writing area.

Description of the audio data corresponds to the above-description, and thus will be omitted.

According to some embodiments, the intelligent device may determine whether a pause signal is detected, stop the handwriting obtainment and the handwriting combination, based on a result of the determination, and perform monitoring. The intelligent device may monitor a local writing area or a global writing area.

The intelligent device may determine whether a pause signal is detected, based on whether the changed handwriting between the captured image frame of the first local writing area and the captured image frame of the second local writing area or the tip of the writing tool is detected, whether a changing angle of the head posture of the user exceeds a predetermined value, whether a distance between the visual focus of the user and the writing focus exceeds a predetermined value, and whether a pause instruction was received. According to some embodiments, the intelligent device may determine whether a restore signal is detected as a result of the monitoring, and restore the handwriting obtainment and the handwriting combination, based on a result of the determination. Descriptions of the pause signal and the restore signal correspond to the above descriptions.

According to some embodiments, the intelligent device may determine whether an ending signal is detected, and end the handwriting obtainment, the handwriting combination, and the generation of the handwriting information, based on a result of the determination. The intelligent device may determine whether the ending signal is detected, based on whether a predetermined time has lapsed after the pause signal is detected or whether an ending instruction was received. Description of the ending signal corresponds to the above description.

According to some embodiments, the intelligent device may apply an enhancement process to the obtained first handwriting and the obtained second handwriting. The enhancement process is applicable when light brightness or definition during shooting does not meet a pre-defined requirement, when a thickness of the obtained first or second handwriting is smaller than a pre-defined value, or when a difference between the color of the handwriting in a captured image and the color of a background is smaller than a predefined value. The enhancement process may include an operation of removing a stroke whose confidence evaluation value is lower than a threshold from among at least one stroke included in the first handwriting and the second handwriting.

The confidence evaluation value of a stroke included in the first or second handwriting may be determined according to a length of the stroke, a width of the stroke, a curvature of the stroke, a color of the stroke, a relative position and continuity of the stroke with respect to other strokes, and a matching degree between the stroke and a moving trajectory of the tip of the writing tool. Descriptions of the enhancement process and the confidence evaluation value correspond to the above-descriptions, and thus will be omitted.

Figure 11:
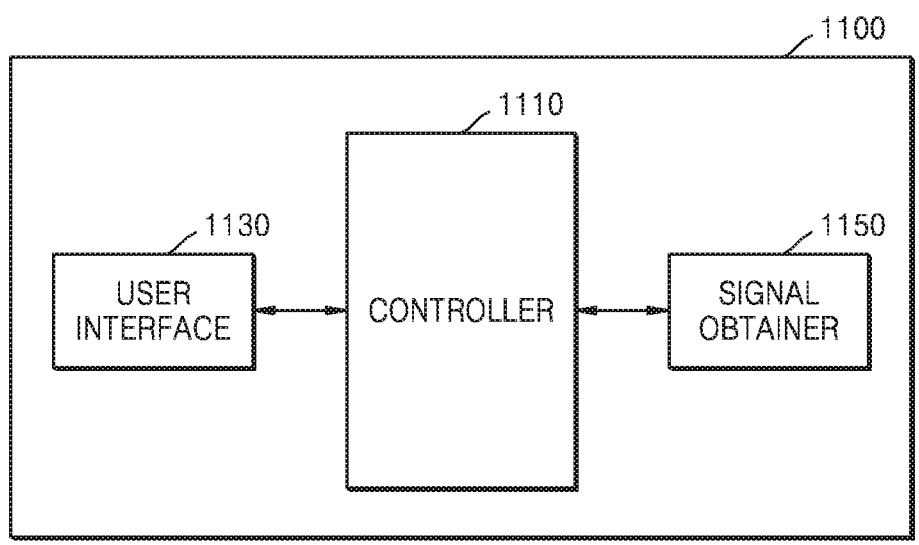
FIG. 11 is a block diagram of a structure of a device for generating handwriting information about handwriting of a user, according to some embodiments.

FIG. 11 is a block diagram of a structure of a device for generating handwriting information about handwriting of a user, according to some embodiments.

A device 1100 of FIG. 11 for generating handwriting information may the same as the handwriting recognizing apparatus of FIG. 8 and the electronic device of FIG. 9. The device 1100 of FIG. 11 for generating handwriting information may the same as the above-described intelligent device.

All of the components illustrated in FIG. 11 are not essential components of the device 1100. More or less components than those illustrated in FIG. 11 may constitute the device 1100. Each of the components of the device 110 may include a controller, such as a processor.

Referring to FIG. 11, the device 1100 may include a controller 1110, a user interface 1130, and a signal obtainer 1150.

According to some embodiments, the controller 1110 typically controls all operations of the device 1100. For example, the controller 1110 may control all of the components included in the device 1100 by executing the programs stored in the device 1100. The controller 1100 may include at least one of a calculation unit, such as a central control apparatus, and a processor, and may be included in any of the other components. However, embodiments are not limited thereto.

According to some embodiments, the controller 1110 may determine a first writing focus and a second writing focus, obtain first handwriting from the first local writing area, obtain second handwriting from the second local writing area, combine the first handwriting with the second handwriting, and generate handwriting information, based on a result of the combination.

According to some embodiments, the controller 1110 may determine the first writing focus and the second writing focus, based on a traced visual focus.

According to some embodiments, the controller 1110 may determine a position of a tip of a writing tool, and determine the first writing focus and the second writing focus, based on the determined position of the tip of the writing tool.

According to some embodiments, the controller 1110 may detect a tip of the writing tool from at least one image captured by shooting the first local writing area and the second local writing area, based on a user input, and may determine the position of the tip of the writing tool, based on a result of the detection.

According to some embodiments, the controller 1110 may obtain the first handwriting from the first local writing area and the second handwriting from the second local writing area, based on information about a handwriting color.

According to some embodiments, the controller 1110 may obtain the first handwriting from the first local writing area and the second handwriting from the second local writing area, based on a color difference between the handwriting color and the color of a writing background.

According to some embodiments, the controller 1110 may compare the first handwriting with the second handwriting, determine changed handwriting between a captured image frame of the first local writing area and a captured image frame of the second local writing area, based on a result of the comparison, and combine the changed handwriting, based on a result of the determination.

According to some embodiments, the controller 1110 may generate handwriting information such that obtained audio data correspond to the first handwriting and the second handwriting.

According to some embodiments, the controller 1110 may generate the handwriting information such that audio data received between a shooting time of the first local area and a shooting time of the second local area corresponds to the changed handwriting between the captured image frame of the first local writing area and the captured image frame of the second local writing area.

According to some embodiments, the controller 1110 may control the signal obtainer 1150 to determine whether a pause signal is detected, stop the handwriting obtainment and the handwriting combination, based on a result of the determination, and perform monitoring.

According to some embodiments, the controller 1110 may determine whether the pause signal is received, based on whether the changed handwriting between the captured image frame of the first local writing area and the captured image frame of the second local writing area or the tip of the writing tool is detected, whether a changing angle of the head posture of the user exceeds a predetermined value, whether a distance between the visual focus of the user and the writing focus exceeds a predetermined value, and whether a pause instruction was received.

According to some embodiments, the controller 1110 may determine whether a restore signal is detected as a result of the monitoring, and restore the handwriting obtainment and the handwriting combination, based on a result of the determination.

According to some embodiments, the controller 1110 may determine whether an ending signal is detected, and end the handwriting obtainment, the handwriting combination, and the generation of the handwriting information, based on a result of the determination.

According to some embodiments, the controller 1110 may determine whether the ending signal is detected, based on whether a predetermined time has lapsed after the pause signal is detected or whether an ending instruction was received.

According to some embodiments, the controller 1110 may apply an enhancement process to the obtained first handwriting and the obtained second handwriting.

According to some embodiments, the controller 1110 may determine whether the ending signal is detected, based on whether a predetermined time has lapsed after the pause signal is detected or whether an ending instruction was received. The operations of the controller 1110 correspond to the above-description, and thus a detailed description thereof will be omitted.

The user interface 1130 may receive a user input.

According to some embodiments, the user interface 1130 may receive information about the shape of the tip of the writing tool from the user.

According to some embodiments, the user interface 1130 may receive information about the handwriting color from the user. The operations of the user interface 1130 correspond to the above-description, and thus a detailed description thereof will be omitted.

According to some embodiments, the signal obtainer 1150 may sequentially shoot the first local writing area, which is within a predetermined range from the first writing focus, and the second local writing area, which is within a predetermined range from the second writing focus.

According to some embodiments, the signal obtainer 1150 may trace the visual focus of the user and trace the tip of the writing tool.

According to some embodiments, the signal obtainer 1150 may detect various signals, such as, the pause signal, the restore signal, and the ending signal. The operations of the signal obtainer 1150 correspond to the above-description, and thus a detailed description thereof will be omitted.

According to some embodiments, the signal obtainer 1150 may include a camera and a microphone. The camera may obtain an image frame via an image sensor in a video call mode or a shooting mode. The image frame captured via the image sensor may be processed by the controller 1110 or a separate image processor (not shown). An image frame processed by the camera may be stored in a storage or may be transmitted to a communicator (not shown).

The microphone receives an external audio signal and converts the external audio signal into electrical audio data. For example, the microphone may receive an audio signal from the user or another device.

The signal obtainer 1150 may further include a sensor unit (not shown). The sensor unit may include, but is not limited to, at least one selected from a magnetic sensor, an acceleration sensor, a temperature/humidity sensor, an infrared sensor, a gyroscope sensor, a position sensor (e.g., a GPS), a pressure sensor, a proximity sensor, and an RGB sensor (i.e., an illuminance sensor). Functions of most of the sensors would be instinctively understood by one of ordinary skill in the art in view of their names and thus detailed descriptions thereof will be omitted herein.

The device 1100 may further include an output unit (not shown). The output unit may output an audio signal, a video signal, or a vibration signal, and may include at least one of a display, an audio output unit, and a vibration motor.

The audio output unit outputs audio data. The audio output unit may also output an audio signal (for example, a call signal receiving sound, a message receiving sound, a notification sound, or a user inducing sound) related with a function of the device 1100. The audio output unit may include, for example, a speaker and a buzzer.

The vibration motor may output a vibration signal. For example, the vibration motor may output a vibration signal corresponding to an output of audio data or video data (for example, a call signal receiving sound or a message receiving sound).

An apparatus according to the present invention may include a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable recording medium. Computer programs installed in the devices may be selectively activated or reconstructed. Examples of the computer-readable recording medium include magnetic storage media (e.g., read-only memory (ROM), random-access memory (RAM), floppy disks, hard disks, etc.), and optical recording media (e.g., CD-ROMs, or Digital Versatile Discs (DVDs)). Of course, embodiments are not limited thereto. The computer readable recording medium can also be distributed over network coupled computer systems so that the computer readable code is stored and executed in a distributive manner. This media can be read by the computer, stored in the memory, and executed by the processor.

One of ordinary skill in the art would understand that, the computer program instructions may be utilized to realize each block and combinations in the block diagrams and/or schematic diagrams and/or flowcharts. One of ordinary skill in the art would know that, the computer program instructions may be provided to general-purpose computers, professional computers, or processors for other programmable data processing methods, so as to realize each block and combinations in the block diagrams and/or schematic diagrams and/or flowcharts of the present disclosure.

All references, including publications, patent applications, and patents, cited herein are hereby incorporated by reference to the same extent as if each reference were individually and specifically indicated to be incorporated by reference and were set forth in its entirety herein.

To promote understanding of one or more exemplary embodiments, reference has been made to the exemplary embodiments illustrated in the drawings, and specific language has been used to describe these embodiments. However, no limitation of the scope of the inventive concept is intended by this specific language, and exemplary embodiments should be construed to encompass all exemplary embodiments that would normally occur to one of ordinary skill in the art.

Embodiments may be described in terms of functional block components and various processing steps. Such functional blocks may be realized by any number of hardware and/or software components configured to perform the specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the embodiments described herein may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus. Moreover, no item or component is essential to the practice of the inventive concept unless the element is specifically described as "essential" or "critical".

The use of the terms "a" and "an" and "the" and similar referents in the context of describing the present invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Embodiments of the present invention are not limited to the described order of the operations. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

The invention claimed is:

1. An apparatus for providing handwriting information about handwriting of a user, the apparatus comprising:
   a camera; and
   at least one processor configured to:
   obtain a user input,
   obtain sequentially, using the camera, a first local writing area which is within a predetermined range from a first writing focus, and a second local writing area which is within a predetermined range from a second writing focus, identify the first writing focus and the second writing focus, obtain first handwriting from the first local writing area, obtain second handwriting from the second local writing area, combine the first handwriting with the second handwriting, and provide handwriting information, based on a result of the combining.

2. The apparatus of claim 1, wherein the processor is further configured to:

trace a visual focus of the user, and identify the first writing focus and the second writing focus, based on the traced visual focus.

3. The apparatus of claim 1, wherein the processor is further configured to:

obtain information about a color of handwriting from the user, and obtain the first handwriting from the first local writing area and the second handwriting from the second local writing area, based on information about the color of the handwriting.

4. The apparatus of claim 1, wherein the processor is further configured to:

compare the first handwriting with the second handwriting, identify changed handwriting between a captured image frame of the first local writing area and a captured image frame of the second local writing area, based on a result of the comparing, and combine the changed handwriting, based on a result of the determining.

5. The apparatus of claim 4, wherein the processor is further configured to:

determine whether a pause signal is detected, stop the handwriting obtaining and the handwriting combining, based on a result of the determining, and perform monitoring.

6. The apparatus of claim 5, wherein the processor is further configured to:

determine whether a pause signal is received, based on whether the changed handwriting between the captured image frame of the first local writing area and the captured image frame of the second local writing area or the tip of the writing tool is detected, whether a changing angle of the head posture of the user exceeds a predetermined value, whether a distance between the visual focus of the user and the writing focus exceeds a predetermined value, and whether a pause instruction was received.

7. The apparatus of claim 1, wherein the handwriting information comprises at least one of time sequence information of local handwriting and layout information, the handwriting information is stored in at least one format from among a document format, an image format, and a video format, and the layout information comprises line break information and identifier information of at least one of a deleting identifier, a replacement identifier, a repeat characteristic identifier, an insertion identifier, a position adjusting identifier, and an emphasis identifier.

8. The apparatus of claim 1, wherein the processor is further configured to:

obtain audio data generated while the first local writing area and the second local writing area are being sequentially obtained, and provide the handwriting information such that the obtained audio data corresponds to the first handwriting and the second handwriting.

9. The apparatus of claim 8, wherein the processor is further configured to:

provide the handwriting information such that audio data received between a shooting time of the first local area and a shooting time of the second local area corresponds to changed handwriting between a captured image frame of the first local writing area and a captured image frame of the second local writing area.

10. The apparatus of claim 1, wherein the processor is further configured to:

apply an enhancement process to the obtained first handwriting and the obtained second handwriting, the enhancement process is applicable when light brightness or definition during shooting does not meet a pre-defined requirement, when a thickness of the obtained first or second handwriting is smaller than a pre-defined value, or when a difference between a color of handwriting in a captured image and a background color is smaller than a predefined value, and the enhancement process removes a stroke whose confidence evaluation value is lower than a threshold from among at least one stroke included in the first handwriting and the second handwriting.

11. A method of providing handwriting information about handwriting of a user, the method comprising:

identifying, by at least one processor of an apparatus, a first writing focus and a second writing focus;

obtaining sequentially, by the at least one processor, by using a camera of the apparatus, a first local writing area which is within a predetermined range from a first writing focus, and a second local writing area which is within a predetermined range from a second writing focus;

obtaining, by the at least one processor, first handwriting from the first local writing area and second handwriting from the second local writing area;

combining, by the at least one processor, the first handwriting with the second handwriting; and providing, by the at least one processor, the handwriting information, based on a result of the combining.

12. The method of claim 11, wherein identifying the first writing focus and the second writing focus comprises:

tracing a tip of a writing tool;

identifying a position of the tip of the writing tool; and identifying the first writing focus and the second writing focus, based on the identified position of the tip of the writing tool.

13. The method of claim 11, wherein obtaining the first handwriting from the first local writing area and the second handwriting from the second local writing area comprises obtaining the first handwriting from the first local writing area and the second handwriting from the second local writing area, based on a difference between a handwriting color and a color of a writing background.

14. The method of claim 11, further comprising:

determining whether an ending signal is detected; and ending the handwriting obtaining, the handwriting combining, and the providing of the handwriting information, based on a result of the determining.

15. A computer program product comprising a non-transitory computer readable storage medium comprising instructions to cause a computing device to perform a method of providing handwriting information about handwriting of a user, the method comprising:

identifying a first writing focus and a second writing focus;

obtaining sequentially a first local writing area which is within a predetermined range from a first writing focus, and a second local writing area which is within a predetermined range from a second writing focus;

obtaining first handwriting from the first local writing area and second handwriting from the second local writing area;

combining the first handwriting with the second handwriting; and providing the handwriting information, based on a result of the combining.

16. The method of claim 15, wherein obtaining the first handwriting from the first local writing area and the second handwriting from the second local writing area comprises obtaining the first handwriting from the first local writing area and the second handwriting from the second local writing area, based on a difference between a handwriting color and a color of a writing background.

17. The method of claim 15, wherein identifying the first writing focus and the second writing focus comprises:

tracing a tip of a writing tool;

identifying a position of the tip of the writing tool; and identifying the first writing focus and the second writing focus, based on the identified position of the tip of the writing tool.

18. The method of claim 15, further comprising:

determining whether an ending signal is detected; and ending the handwriting obtaining, the handwriting combining, and the providing of the handwriting information, based on a result of the determining.

* * * * *